US012762459B2

(12) United States Patent
Aharonov et al.

(10) Patent No.: US 12,762,459 B2
(45) Date of Patent: Oct. 13, 2026

(54) METHODS FOR MITIGATION AND FOR CHARACTERIZATION OF LOGICAL ERRORS IN ERROR CORRECTED QUANTUM PROCESSORS

(71) Applicant: QEDMA Quantum Computing LTD., Tel-Aviv (IL)

(72) Inventors: Dorit Aharonov, Jerusalem (IL); Yosi Atia, Herzliya (IL); Zvika Brakerski, Tel Aviv (IL); Omri Golan, Rehovot (IL); Netanel Hanan Lindner, Aviel (IL); Maor Shutman, Tel-Aviv (IL)

( * ) Notice: Subject to any disclaimer, the term of this patent is extended or adjusted under 35 U.S.C. 154(b) by 0 days.

(21) Appl. No.: 19/343,333

(22) Filed: Sep. 29, 2025

(65) Prior Publication Data

US 2026/0094044 A1 Apr. 2, 2026

Related U.S. Application Data

(60) Provisional application No. 63/701,037, filed on Sep. 30, 2024.

(51) Int. Cl.

*G06N 10/70* (2022.01)
*G06N 10/00* (2022.01)
*G06N 10/20* (2022.01)

(52) U.S. Cl.

CPC ............. *G06N 10/70* (2022.01); *G06N 10/00* (2019.01); *G06N 10/20* (2022.01)

(58) Field of Classification Search

CPC ......... G06N 10/00; G06N 10/20; G06N 10/70
See application file for complete search history.

(56) References Cited

U.S. PATENT DOCUMENTS 11,288,121 B2 * 3/2022 Katabarwa ............ H03M 13/47
11,308,252 B1 4/2022 Piveteau et al.
(Continued)

FOREIGN PATENT DOCUMENTS

WO 2023057679 A1 4/2023
WO 2023181019 A1 9/2023

OTHER PUBLICATIONS

Smith, et al., "Error Mitigation in Quantum Computers Through INstruction Scheduling", Nov. 10, 2021, 26 pages, arXiv:2105.01760v2.
(Continued)

*Primary Examiner* — Justin R Knapp
(74) *Attorney, Agent, or Firm* — Ballard Spahr LLP

(57) ABSTRACT

In a first aspect, a method for mitigating errors in a quantum circuit that includes at least one error-corrected quantum logic operation. The method includes providing a set of quantum error mitigation protocols that includes at least two quantum error mitigation protocols. The at least one error-corrected quantum logic operation and is executed and an associated at least one syndrome thereof is measured, to obtain a syndrome measurement. Execution is according to at least one selected quantum error mitigation protocol from the set, based on the syndrome measurement. In a second aspect, a method for computing mitigatable errors of an error-corrected quantum operation. The method includes characterizing physical errors of at least one physical quantum gate included in the quantum operation, to obtain physical characterization. The method includes simulating the quantum operation according to the physical characterization to obtain simulated output errors and syndromes, to obtain the mitigatable errors.

20 Claims, 12 Drawing Sheets

(56) References Cited

U.S. PATENT DOCUMENTS

| | | | | |
|---|---|---|---|---|
| 11,901,915 | B1 * | 2/2024 | Campbell | G06N 10/70 |
| 11,954,563 | B2 * | 4/2024 | Sawaya | G06N 10/70 |
| 12,301,251 | B2 * | 5/2025 | Zhang | H03M 13/1134 |
| 12,340,278 | B2 * | 6/2025 | Naveh | G06N 10/70 |
| 2019/0044543 | A1 | 2/2019 | Chamberland et al. | |
| 2020/0310908 | A1 | 10/2020 | Hogaboam | |
| 2024/0193451 | A1 * | 6/2024 | Matsuura | G06N 10/20 |
| 2025/0028990 | A1 * | 1/2025 | Weimer | G06N 10/60 |

OTHER PUBLICATIONS

Weaving, et al., "Benchmarking Noisy Intermediate Scale Quantum Error Mitigation Strategies for Ground State Preparation of the HCl Molecule", arXiv:2303.00445v2, Mar. 2, 2023, pp. 1-18.
Flammia, et al., "Efficient Estimation of Pauli Channels", ACM Transactions on Quantum Computing, arXiv:1907.12976v3, Feb. 22, 2022, pp. 1-31.
Kaufmann, "A BlockBP Decoder for the Surface Code", arXiv:2402.04834v2, Apr. 16, 2024, pp. 1-13.
Pakes, "On the Convergence of Moments of Geometric and Harmonic Means", Statistica Neerlandica, vol. 53.1, 1999, pp. 96-110.
Postler, et al., "Demonstration of Fault-Tolerant Universal Quantum Gate Operations", Nature 605.7911, Nov. 2, 2022, pp. 1-14, arXiv:2111.12654v3.
Quek, et al., "Exponentially Tighter Bounds On Limitations of Quantum Error Mitigation", Nature Physics, vol. 20, Oct. 2024, pp. 1648-1658; https://doi.org/10.1038/s41567-024-02536-7.
Takagi, et al., "Fundamental Limits of Quantum Error Mitigation", NPJ Quantum Information 8.1, Sep. 22, 2022, pp. 1-24, arXiv:2109.04457v5.
Takagi, et al., "Universal Sampling Lower Bounds for Quantum Error Mitigation", Physical Review Letters 131.21, Nov. 23, 2023, pp. 1-22; arXiv:2208.09178v4.
Tsubouchi, et al., "Universal Cost Bound of Quantum Error Mitigation Based on Quantum Estimation Theory", Physical Review Letters 131.21, Jan. 30, 2024, pp. 1-21; arXiv:2208.09365v6.
Wagner, et al., "Widespread Occurrence of Anomalous C-Band Backscatter Signals in Arid Environments Caused by Subsurface Scattering", Remote sensing of Environment 276, 2022, pp. 1-14.
Acharya, et al., "Quantum Error Correction Below The Surface Code Threshold", Nature vol. 638, No. 8052, Aug. 24, 2024; 27 pages, arXiv:2408.13687v1.
Barber, et al., "A Real-Time, Scalable, Fast and Highly Resource Efficient Decoder For a Quantum Computer", Nature Electronics 8.1, Sep. 24, 2024, pp. 1-13, arXiv:2309.05558v2.
Bluvstein, et al., "Logical Quantum Processor Based on Reconfigurable Atom Arrays", Nature 626.7997, Dec. 7, 2023, pp. 1-32, arXiv:2312.03982v1.
Bravyi, et al., "High-Threshold and Low-Overhead Fault-Tolerant Quantum Memory", Nature 626.7997, Feb. 22, 2024, pp. 1-36, arXiv:2308.07915v2.
Cai, et al., "Quantum Error Mitigation", Reviews of Modern Physics 95.4, Dec. 28, 2023, pp. 1-43, arXiv:2210.00921v3.
Carignan, et al., "The Error Reconstruction and Compiled Calibration of Quantum Computing Cycles", 2023, pp. 1-35, arXiv:2303.17714v1.
Combes, et al., "Logical Randomized Benchmarking", Feb. 2017, pp. 1-17, arXiv:1702.03688v1.
Filippov, et al., "Scalability of Quantum Error Mitigation Techniques: From Utility to Advantage", Mar. 20, 2024, pp. 1-36, arXiv:2403.13542v1.
Lostaglio, et al., "Error Mitigation and Quantum-Assisted Simulation in the Error Corrected Regime", Apr. 11, 2022, pp. 1-11, arXiv:2103.07526v3.
Magesan, et al., "Characterizing Quantum Gates via Randomized Benchmarking", Physical Review A—Atomic, Molecular, and Optical Physics 85.4, Apr. 27, 2012, pp. 1-19, arXiv:1109.6887v2.
Mayer, et al., "Benchmarking Logical Three-Qubit Quantum Fourier Transform Encoded in the Steane Code on a Trapped-Ion Quantum Computer", Apr. 15, 2024, pp. 1-13, arXiv:2404.08616v1.
Nielsen, et al., "Gate Set Tomography", Quantum 5, Jul. 25, 2021, pp. 1-59.
Piveteau, et al., "Error Mitigation for Universal Gates on Encoded Qubits", pp. 1-11, Physical Review Letters 127.20, Oct. 12, 2021, arXiv:2103.04915v2.
Prabhu, et al., "Distance-Four Quantum Codes with Combined Postselection and Error Correction", Physical Review A 110.1, Dec. 7, 2021, arXiv:2112.03785v1, pp. 1-12.
Reichardt, "Fault-Tolerant Quantum Error Correction for Steane's Seven-Qubit Color Code With Few or No Extra Qubits", Quantum Science and Technology 6.1, Apr. 19, 2018, pp. 1-11, arXiv:1804.06995v1.
Smith, et al., "Mitigating Errors in Logical Qubits", Communications Physics 7.1, May 6, 2024, pp. 1-20, arXiv:2405.03766v1.
Suzuki, et al., "Quantum Error Mitigation as a Universal Error Reduction Technique: Applications from the NISQ to the Fault-Tolerant Quantum Computing Eras", PRX Quantum 3, pp. 010345-1-010345-33, Mar. 18, 2022, DOI: 10.1103/PRXQuantum.3.010345.
Suzuki, et al., "Quantum Error Mitigation as a Universal Error-Minimization Technique: Applications from NISQ to FTQC Eras", Oct. 18, 2021, pp. 1-33, arXiv:2010.03887v6.
Tropp, "An Introduction to Matrix Concentration Inequalities", Foundations and Trends in Machine Learning, vol. 8, No. 1-2, 2015, 236 pages, DOI:10.1561/2200000048.
Tsubouchi, et al., "Symmetric Clifford Twirling for Cost-Optimal Quantum Error Mitigation in Early FTQC Regime", NPJ Quantum Information 11.1, Jun. 17, 2025, pp. 1-26, arXiv:2405.07720v4.
Vandenberg, et al., "Probabilistic Error Cancellation With Sparse Pauli-Lindblad Models on Noisy Quantum Processors", Nature Physics 19.8, Jun. 23, 2022, 29 pages, arXiv:2201.09866vs.
Xiong, et al., "Sampling Overhead Analysis of Quantum Error Mitigation: Uncoded vs. Coded Systems", IEEE Access, vol. 8, 2020, pp. 228967-228991.
Xu, et al., "Constant-Overhead Fault-Tolerant Quantum Computation With Reconfigurable Atom Arrays", Nature Physics 20.7, Aug. 16, 2023, 25 pages, arXiv:2308.08648v1.
Endo, et al., "Practical Quantum Error Mitigation for Near-Future Applications", Physical Review X 8, 2018, 10.1103/physrevx.8.031027, pp. 031027-1-031027-21.
Sundaresan, et al., "Demonstrating Multi-Round Subsystem Quantum Error Correction Using Matching And Maximum Likelihood Decoders", Nature Communications, vol. 14:2852, May 18, 2023, pp. 2-13.

* cited by examiner

METHODS FOR MITIGATION AND FOR CHARACTERIZATION OF LOGICAL ERRORS IN ERROR CORRECTED QUANTUM PROCESSORS

CROSS REFERENCE TO RELATED APPLICATIONS

This application claims priority from U.S. Provisional Patent Application No. 63/701,037 filed on the 30 Sep. 2024, which is incorporated herein by reference in its entirety.

TECHNOLOGICAL FIELD

The present disclosure relates to the field of quantum computing, specifically to the subfields of quantum error characterization, quantum error mitigation, and quantum error correction.

BACKGROUND ART

Publications that may provide a technical background to better understand the presently disclosed subject matter, are listed hereinbelow. The listing is alphabetical according to the title of the publication.

An introduction to matrix concentration inequalities, Tropp, 2015
A real-time, scalable, fast and highly resource efficient decoder for a quantum computer, Barber et. al., 2023
Benchmarking logical three-qubit quantum Fourier transform encoded in the Steane code on a trapped-ion quantum computer, Mayer et. al., 2024
Characterizing quantum gates via randomized benchmarking, Magesan et. al., 2012
Constant-overhead fault-tolerant quantum computation with reconfigurable atom arrays, Xu et. al., 2024
Distance-four quantum codes with combined postselection and error correction, Prabhu and Reichardt, 2021
Error mitigation and quantum-assisted simulation in the error corrected regime, Lostaglio and Ciani, 2021
Error mitigation for universal gates on encoded qubits, Piveteau et. al., 2021
Fault-tolerant quantum error correction for Steane's seven-qubit color code with few or no extra qubits, Reichardt, 2018
Gate set tomography, Nielsen et. el., 2021
High-threshold and low-overhead fault-tolerant quantum memory, Bravyi et. al., 2024
Logical quantum processor based on reconfigurable atom arrays, Bluvstein et. al., 2023
Logical Randomized Benchmarking, Combes et. al., 2017
Mitigating errors in logical qubits, Smith et. al., 2024
Probabilistic error cancellation with sparse Pauli-Lindblad models on noisy quantum processors, van den Berg et. al., 2023
Quantum error correction below the surface code threshold, Acharya et. al., 2024
Quantum error mitigation, Cai et. al., 2023
Quantum error mitigation as a universal error-minimization technique: applications from NISQ to FTQC eras, Suzuki et. al., 2020
Quantum error mitigation as a universal error reduction technique: applications from the NISQ to the fault-tolerant quantum computing eras, Suzuki et. al., 2022
Sampling overhead analysis of quantum error mitigation: uncoded vs. coded systems, Xiong et. al., 2020
Scalability of quantum error mitigation techniques: from utility to advantage, Filippov et. al., 2024
Symmetric Clifford twirling for cost-optimal quantum error mitigation in early FTQC regime, Tsubouchi et. al., 2024
The error reconstruction and compiled calibration of quantum computing cycles, Carignan-Dugas et. al., 2023

The indication of the above publications herein is not to be inferred as meaning that these are in any way relevant to the patentability of the presently disclosed subject matter. Especially, indication of the above publications herein is not to be inferred as meaning that these are in any way denying patentability of any presently claimed scope.

BACKGROUND

Quantum computers promise significant algorithmic speedups (sometimes referred to as 'quantum advantages', or QAs), over classical computers, for a variety of applications. Important examples are Shor's factoring algorithm, and efficient simulation of physical and chemical systems. Shor's factoring algorithm is already of concern for the world's cryptographic community, with major implications, inter alia, for e-commerce and digital identity. Efficient simulation of physical and chemical systems has vast implications in areas such as material design and pharmaceuticals.

However, hardware errors, including noise and inaccuracies in quantum logic operations ('gates'), quickly accumulate to render even small quantum computations useless. This detrimental effect of errors on quantum algorithms is commonly agreed to be the most crucial obstacle to obtaining QAs.

The solution considered as the long-term solution for errors in quantum processors is quantum error correction (EC), where quantum information is encoded in a redundant number of qubits, such that errors can be non-destructively measured and corrected during the computation.

Solutions considered for the short term (sometimes referred to as the 'NISQ era', where NISQ stands for 'Noisy Intermediate-Scale Quantum computation') are generally called quantum error mitigation (EM). EM is a standard practice when working with quantum processing units (QPUs). In EM, a single execution of an ideal (error-free) quantum circuit is replaced by multiple noisy circuit executions, the measurement outcomes of which are then post-processed to yield an estimate for the outcome of the given ideal circuit. It is expected that with current and near-term state-of-the-art errors rates ($\sim 10^{-3}$) and qubit numbers (tens to hundreds), EM methods will soon provide the first QAs—providing access to the first quantum circuits and computational problems which cannot be simulated or solved on classical super-computers.

In contrast to EC, in EM errors are eliminated with little or no overhead in qubit number, but at the expense of an overhead in QPU time. The required QPU time for EM is fundamentally known to be exponential in the total error rate in the circuit. I.e., the product of the error rate per operation $\epsilon$, and the total number of operations V. The exponential time requirement limits the applicability of EM to circuit volumes $V \sim (1-10) \times \epsilon^{-1}$. With state-of-the-art $\epsilon \sim 10^{-3}$, this limits EM to circuit volumes $V \sim 10^4$, which is below the minimal volume $V \sim 10^5$-$10^6$ estimated for known or conjectured QAs in industry-relevant problems.

Thus, both EC and EM have severe limitations that strongly limit the range of industry-relevant QAs. To address the challenges of EC and EM, and go beyond their respective limitations, the combination of the two methods was recently proposed. This general approach may be referred to as logical error mitigation (LEM). In terms of quantum resources, LEM can make efficient use of both available QPU time and physical qubit numbers, to maximize accessible circuit volume and output accuracy.

GENERAL DESCRIPTION

Identification of Technical Problems

The LEM methods described in the art may be summarized as follows: apply EC to generate logical operations with a reduced error rate relative to physical operations; Then, apply EM to these logical operations, as if they are physical operations. This approach may be referred to as 'external LEM' (ExtLEM), since it does not make use of the intricate internal structure of logical operations, including the 'syndrome' data they generate via mid-circuit measurements. A particular EM method previously suggested for ExtLEM is the quasi-probability (QP) method, which is characterization based, and un-biased up to characterization errors.

In the art, the characterization step is also 'external', that is, logical operations are characterized as if they are physical operations, while ignoring their internal structure and syndrome data. This approach may be referred to as external logical characterization (ExtLC).

A significant drawback of ExtLC, is that the QPU time it requires scales as $$\epsilon_L^{-1},$$

where $\epsilon_L$ denotes the error rate per logical operation. This follows from the $\epsilon^{-1}$ scaling of the QPU time in state-of-the-art physical characterization protocols, which is usually due to a repetition of the characterized operation $\sim\epsilon^{-1}$ times. Thus, as more elaborate EC schemes become available, and $\epsilon_L$ is decreased by orders of magnitude, the resources required for ExtLC are also expected to increase by orders of magnitude.

A significant drawback of ExtLEM, is that it does not exploit the readily available syndrome data generated during error-corrected quantum computation. A known approach to mitigating logical errors based on syndrome data is known as 'post-selection' (PS), or 'error detection', where these terms are often used synonymously in the literature. The PS approach is based on syndrome decoding algorithms ('decoders') that can either apply a correction (or recovery) operation, or abort the computation and initiate the next circuit run (shot), as a function of the measured syndrome. The selection of syndromes to be 'accepted' or 'rejected' can be done in real time, and need not be performed in post-processing, despite the misleading but now-standard 'post-selection' terminology.

It is noted that the combination of PS and EC requires error-correcting codes. This is in contrast to PS only, that is based on error-detecting codes (i.e., codes that can detect an error, but cannot provide any information on what recovery operation may be taken). The former is a form of LEM, while the latter is a physical, or 'non-logical', EM method.

The combination of PS and EC is commonly considered for even-distance quantum codes, since a code with distance d=2t+2 can correct errors up to weight t, and additionally detect errors with weight t+1. In comparison, codes with odd distance d=2t+1 can correct t errors, without the ability to detect all errors with weight t+1.

The main drawback of PS is that it generally mitigates only part of the logical errors left behind after EC. The mitigated errors are the logical errors accompanied by rejected syndromes. Logical errors accompanied by accepted syndromes are un-mitigated, and can be thought of as a 'false-negative'. Due to these residual logical errors, PS is generally a biased LEM method, which does not produce accurate results at large circuit volumes, and therefore significantly under-performs relative to the ExtLEM.

Additionally, the sampling overhead of PS is not optimal when rejected syndromes do not indicate a logical error with probability 1, leading to a non-zero probability for a 'false-positive'. Further, the false-negative probability is required to be small enough, for the QPU time overhead of PS (as a function of the fraction of logical errors in rejected syndromes) to be significantly lower than that of ExtLEM methods, which post-process data containing shots in which rejected syndromes were measured.

Solution to the Technical Problem

The solution disclosed herein generally includes one or two components. The first component may be referred to as "syndrome-aware logical error mitigation", or SA-LEM for short. The second component may be referred to as "Physical-to-logical characterization" or P2LC for short. These components are described in detail hereinbelow in the detailed-description section.

SUMMARY OF NOTABLE EMBODIMENTS

In accordance with a first aspect of the presently disclosed subject matter, there is provided a quantum-computer implemented method for mitigating errors in a quantum circuit C. The quantum circuit C includes at least one error-corrected quantum logic operation G. The method includes providing a set of quantum error mitigation protocols {EM} that includes at least two quantum error mitigation protocols configured for mitigating errors in the quantum circuit C. The method includes executing a plurality of shots, so as to obtain a plurality of mitigated circuit outcomes {o}. For at least one shot, the method includes executing the at least one error-corrected quantum logic operation G and measuring an associated at least one syndrome thereof, so as to obtain a syndrome measurement results vector $\vec{s}$. At least one shot is executed according to at least one quantum error mitigation protocol EM selected from the set of quantum error mitigation protocols {EM} based on the vector of syndrome measurement results $\vec{s}$. The method includes combining the mitigated circuit outcomes {o} so as to obtain an estimate $\bar{o}$ of an outcome of an ideal version $C_0$ of the quantum circuit C.

In addition to the above features, a quantum-computer implemented method for mitigating errors in a quantum circuit C according to this aspect of the presently disclosed subject matter, can optionally comprise one or more of features (i) to (xxxvii) below, in any technically possible combination or permutation:

i. executing shots according to a quantum error mitigation protocol includes any one of: (a) executing the quantum circuit C with at least one additional quantum logic operation; (b) executing the quantum circuit C with at least one removed quantum logic operation; (c) post-processing a measurement result of the quantum circuit C; (d) executing a quantum circuit having a structure distinct from the quantum circuit C.

ii. executing shots according to a quantum error mitigation protocol includes any one of: mid-shot processing of a syndrome measurement result of the quantum circuit C, and mid-shot modification of the quantum circuit C.

iii. non-overlapping sets of syndrome measurement results vectors $\vec{S}_i$ are associated with distinct quantum error mitigation protocols $EM_i$ included in the set of quantum error mitigation protocols {EM}.

iv. a union set of the non-overlapping sets of syndrome measurement results vectors $\vec{S}_i$ includes all possible syndromes of the at least one quantum logic operation G.

v. each of the quantum error mitigation protocol $EM_i$ is configured to mitigate errors associated with a set of syndrome measurement results vector $\vec{S}_i$.

vi. the set of quantum error mitigation protocols {EM} includes at least two quantum error mitigation protocols $EM_{1,2}$ configured for mitigating errors in the at least one error-corrected quantum logic operation G.

vii. applying to the at least one error-corrected quantum logic operation G at least one quantum error mitigation protocol selected from the at least two quantum error mitigation protocols $EM_{1,2}$ according to the associated at least one syndrome thereof.

viii. executing at least two quantum error mitigation protocols included in the set of quantum error mitigation protocols {EM}.

ix. the combining is performed according to the vector of syndrome measurement results $\vec{s}$.

x. combining mitigated circuit outcomes includes computing a weighted average $\bar{o}=w_{s_1}o_1+\ldots+w_{s_N}o_N$ of the mitigated circuit outcomes {o}, wherein each weight $w_k$ is associated with a set of syndrome measurement results vector $\vec{S}_k$, wherein N is the number of shots.

xi. each of the weights $w_{s_k}$ is proportional to $$\mathbb{V}_{o|k}^{-1},$$

wherein $\mathbb{V}_{o|k}$ being an estimate for a variance of a probability distribution of mitigated circuit outcome o, the distribution being conditioned according to a set of syndrome measurement results vector $\vec{S}_k$.

xii. computing the estimate for variance $\mathbb{V}_{o|k}$.

xiii. he at least two quantum error mitigation protocols are configured to mitigate an error channel $\Lambda_{\vec{s}}$ associated with the syndrome measurement results vector $\vec{s}$.

xiv. the error channel $\Lambda_{\vec{s}}$ is a logical error channel $\Lambda_{L|\vec{s}_i}$, wherein $\vec{s}\in\vec{S}_i$.

xv. estimating the error channel $\Lambda_{\vec{s}}$.

xvi. the combining measurement results includes computing a non-linear function of the mitigated circuit outcomes {o}.

xvii. the set of quantum error mitigation protocols {EM} includes any two of: quasi-probability decomposition, zero-noise extrapolation, and tensor network error mitigation.

xviii. the set of quantum error mitigation protocols {EM} includes quasi-probability decomposition, the method includes sampling quantum circuits according to a distribution based on the error channel $\Lambda_{\vec{s}}$.

xix. The method according to clause 19, wherein the quasi-probability decomposition approximates the ideal version $C_0$ of the quantum circuit C.

xx. The method according to clause 19, wherein the quasi-probability decomposition approximates an execution of the quantum circuit C being subject to an amplified error channel $$\Lambda_{\vec{s}}^{\lambda}$$

being the error channel $\Lambda_{\vec{s}}$ raised to a power $\lambda\neq\pm1$.

xxi. a square of a quasi-probability norm $W^2$ of the quasi-probability decomposition equals the estimate for variance $\mathbb{V}_{o|\vec{s}}$ associated with the error channel $\Lambda\vec{S}$.

xxii. sampling quantum circuits is performed concurrently to an execution of at least one shot.

xxiii. rejection of at least one shot based on a set of rejection syndromes $\vec{S}_{rej}$.

xxiv. the set of rejection syndromes $\vec{S}_{rej}$ being non-overlapping with any set of syndrome measurement results vectors $\vec{S}_i$ associated with a quantum error mitigation protocol $EM_i$.

xxv. the set of rejection syndromes $\{\vec{S}\}_{rej}$ is selected so as to minimize at least one of: a total runtime, and a number of shots N.

xxvi. rejection of at least one shot based on the associated at least one syndrome thereof.

xxvii. the rejection includes abortion of the at least one shot.

xxviii. the at least one error-corrected quantum logic operation G is encoded according to an odd distance error correcting code.

xxix. the quantum circuit C includes at least two quantum logic operations $G_{1,2}$ acting on overlapping sets of qubits.

xxx. he quantum circuit C includes at least two quantum logic operations $G_{1,2}$ acting sequentially.

xxxi. at least one mitigated circuit outcome is associated with at least two syndrome measurement results vectors.

xxxii. The method according to any one of the preceding clauses, wherein at least one syndrome measurement results vector is associated with at least two mitigated circuit outcomes.

xxxiii. at least one quantum error mitigation protocol EM is selected from the set of quantum error mitigation protocols {EM} based on a plurality of vectors of syndrome measurement results.

xxxiv. a plurality of shots are executed according to the at least one quantum error mitigation protocol EM.

xxxv. the at least one shot is selected based on a plurality of vectors of syndrome measurement results.

xxxvi. the quantum circuit C includes a plurality of error-corrected quantum logic operations $G^{(\alpha)}$, and wherein at least one syndrome measurement results vector is associated with at least two error-corrected quantum logic operations $G^{(1,2)}$.

xxxvii. the at least two error-corrected quantum logic operations $G^{(1,2)}$ are distinct quantum logic operations.

In accordance with a second aspect of the presently disclosed subject matter, there is provided a computer implemented method for computing mitigatable errors of an error-corrected logical quantum operation. The method includes characterizing physical errors of at least one physical quantum gate included in the logical quantum operation, so as to obtain physical characterization data. The method includes simulating the logical quantum operation according to the characterization data so as to obtain simulated output errors and syndromes, so as to obtain the mitigatable errors.

In addition to the above features, a computer implemented method for computing mitigatable errors of an error-corrected logical quantum operation, according to this aspect of the presently disclosed subject matter, can optionally comprise one or more of features (i) to (viii) below, in any technically possible combination or permutation:

i. characterizing physical errors includes: (a) applying at least one characterization sequence to a set of qubits included in a quantum processor; (b) measuring the set of qubits using a measurement apparatus of the quantum processor, thereby obtaining a set of measurement values; (c) computing the physical characterization data, by fitting a model to the set of measurement values.
ii. simulating the logical quantum operation includes computing a distribution of any of correctable output errors and non-correctable output errors, according to the simulated output errors and syndromes.
iii. simulating output errors includes computation of logical output errors.
iv. computation of logical output errors is performed according to a fault tolerance level t being a number of faults correctable by an ideal error correction cycle.
v. including computation of correctable errors including at least t+1 faults.
vi. simulating the logical quantum operation includes: (a) providing the logical quantum operation with input channel having no errors, so as to obtain the output error channel; (b) applying an ideal error correction cycle on the output error channel, so as to obtain a correctable part $\Lambda^*$ of the output error channel and a logical error part $\Lambda_l$ of the output error channel.
vii. characterizing physical errors is performed so a ratio of relative accuracy of logical errors $\Lambda\varepsilon_L/\varepsilon_L$ to a relative accuracy of physical errors $\Delta\varepsilon/\varepsilon$ is approximately (t+1).
viii. simulating the logical quantum operation includes performing a simulation using any of a Clifford simulator or a state-vector simulator.

In accordance with a third aspect of the presently disclosed subject matter, there is provided a computer implemented method for characterizing an output error channel in a sequence of error-corrected logical quantum operations $G_k \ldots G_1$. The method includes performing the method according to the second aspect of the presently disclosed subject matter, for each quantum operation $G_n$ included in a subsequence of error-corrected logical quantum operations $G_1, \ldots, G_h$. The method includes for each the quantum operation $G_n$ providing the quantum operation $G_n$ with input channel having errors being a correctable part $$\Lambda_{n-1}^*$$

of an output error channel of a preceeding quantum operation $G_{n-1}$, so as to obtain an output error channel $\Lambda_n$ of the quantum operation $G_n$, wherein a first input channel $\Lambda_0$ provided for a first quantum operation $G_1$ is having no errors. The method includes for each the quantum operation $G_n$ applying an ideal error correction cycle version of a succeeding quantum operation $G_{n+1}$ on the output error channel $\Lambda_n$ of the quantum operation $G_n$, so as to obtain a correctable part of the output error channel $$\Lambda_n^*$$

of the quantum operation $G_n$.

In accordance with a fourth aspect of the presently disclosed subject matter, there is provided a computer implemented method for characterizing an output error channel in a subcircuit of error-corrected logical quantum operations $G_D \ldots G_1$. The method includes performing the method according to the third aspect of the presently disclosed subject matter, for each sequence $G_A \ldots G_H$ wherein H=max(1, A−h) wherein h being n history parameter.

According to some embodiments, h equals the fault tolerance level t or t+1.

In accordance with a fifth aspect of the presently disclosed subject matter, there is provided a computer implemented method for mitigating logical errors in an error-corrected logical quantum operation. The method includes characterizing a logical quantum operation by a method according to any one of the second to fourth aspects of the presently disclosed subject matter, thereby obtaining characterization of an output error channel. The method includes mitigating errors according to the characterization of the output error channel, by a method according to the first aspect of the presently disclosed subject matter.

In accordance with a sixth aspect of the presently disclosed subject matter, there is provided a non-transitory computer readable storage medium tangibly embodying a program of instructions that, when executed by a computer, cause the computer to perform a method according to any one of the first to fifth aspects of the presently disclosed subject matter.

In accordance with a seventh aspect of the presently disclosed subject matter, there is provided a computer system the includes at least one processing circuitry. The computer system is configured to execute a computer implemented method a method according to any one of the first to fifth aspects of the presently disclosed subject matter.

According to some embodiments, the computer system includes a quantum processing unit.

In accordance with an eighth aspect of the presently disclosed subject matter, there is provided a computer implemented method, the method includes simulating the method according to any one of the first to fifth aspects of the presently disclosed subject matter.

In accordance with a nineth aspect of the presently disclosed subject matter, there is provided a non-transitory computer readable storage medium tangibly embodying a program of instructions that, when executed by a computer, cause the computer to perform a method according to the eighth aspect of the presently disclosed subject matter.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Described herein are some examples of systems and methods useful for mitigating and characterizing logical errors in error-corrected quantum processors.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrases "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "computing", "determining", "running", "implementing", "using", "performing", or the like, may refer to the action(s) and/or process(es) of any combination of software, hardware and/or firmware. For example, these terms may refer in some cases to the action(s) and/or process (cs) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

Figure 2A:
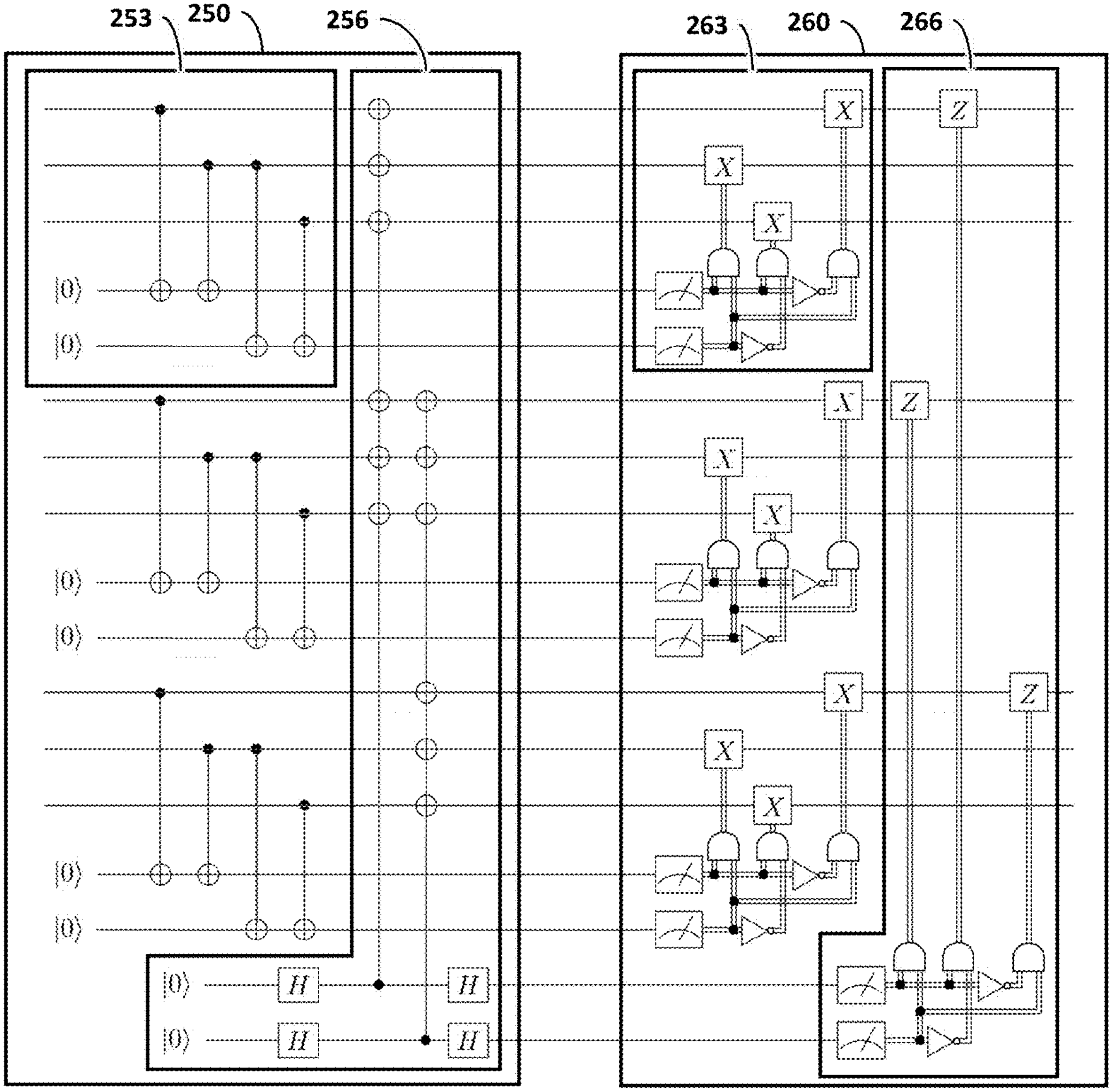
FIG. 2A schematically illustrates encoding and decoding of The Shore 9-qubit error-correction code.

FIG. 2A schematically illustrates an example of an error-correction encoding 250 and decoding 260. The error correction code is the Shore 9-qubit code, where ancilla qubits are used. The Shore 9-qubit code is one of the basic, early examples of an error correction code. The Shore 9-qubit code requires 9 data qubits and 8 ancilla qubits. The encoding 250 and decoding 260 each include two stages.

In the first stage of encoding 250, all ancilla qubits are initialized to the zero state. Three subsets sets of three data qubits are each entangled (via four CNOT gates) with a corresponding set of two ancilla qubits, e.g., as depicted for first-stage-encoding of a first subset 253.

In the second stage 256 of encoding 250, the 9 data qubits are entangled (via twelve CNOT gates) with (the last) two ancilla qubits, where Hadamard gates are applied to these two ancilla qubits before and after the entanglement.

In the first stage of decoding 260, for each of the three subsets of data qubits, the corresponding ancilla qubits are measured, and the results are provided to a classical circuit that may control application of quantum operations. If both ancilla qubits are measured zero, no operation is taken. If any ancilla qubit is measured non-zero, a Pauli-X operation is applied on a corresponding qubit. I.e., if only the first ancilla qubit is measured non-zero, the Pauli-X operation is applied on the third data qubit. If only the second ancilla qubit is measured non-zero, the Pauli-X operation is applied on the first data qubit. If both ancilla qubits are measured non-zero, the Pauli-X operation is applied on the second data qubit. E.g., as depicted for first-stage-decoding of a first subset 263.

In the second stage 266 of decoding 260, the last two ancilla qubits (i.e., those that were entangled with the data qubits in second stage 256 of encoding 250) are measured, and the results are provided to a classical circuit that may control application of quantum operations. If both ancilla qubits are measured zero, no operation is taken. If any ancilla qubit is measured non-zero, a Pauli-Z operation is applied on a first qubit of a corresponding subset of qubits. I.e., if only the first ancilla qubit is measured non-zero, the Pauli-Z operation is applied on the first qubit of the first subset of qubits. If only the second ancilla qubit is measured non-zero, the Pauli-Z operation is applied on the first qubit of the third subset of qubits. If both ancilla qubits are measured non-zero, the Pauli-Z operation is applied on the first qubit of the second subset of qubits.

Figure 2B:
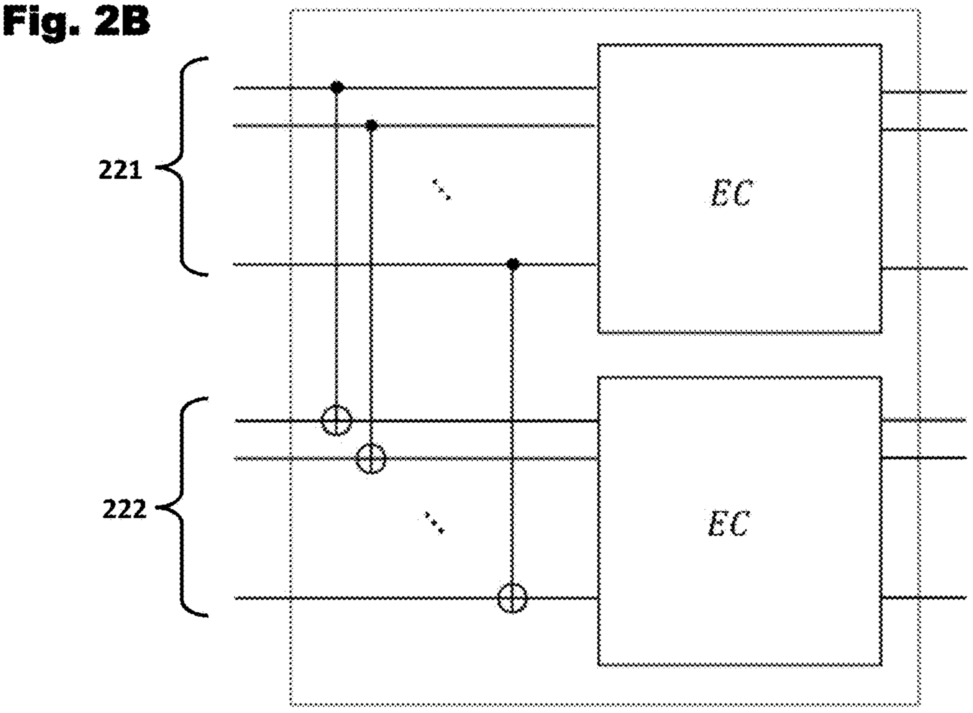
FIG. 2B schematically illustrates an error-corrected logical gate.

FIG. 2B schematically illustrates an example of an error-corrected logical gate. The logical gate is a transverse CNOT gate. A first logical qubit may be encoded on a first set of data qubits 221. A second logical qubit may be encoded on a second set of data qubits 222. A plurality of physical CNOT gates may be applied, so that each data qubit included in the first set of data qubits 221, may be a control qubit of a corresponding data qubit included in the second set of data qubits 222. After the application of the physical CNOT gates, error-correction may be performed for any of the logical qubits, e.g., ancilla qubits (not illustrated) may be measured and recovery operation(s) may be applied. The error-correction may be performed independently for each logical qubit (as illustrated), or may be performed for both logical qubits together. The encoding of the logical qubits may not be limited, and may be, for example, according to the Steane code (illustrated in FIG. 3C).

General Setup, Mathematical Definitions, Notation and Terminology

A vertical bar, when not being a part of a bracket notation, may denote conditioning of a left quantity/object by a right quantity/object. In other words, the notation a|b may denote a given b. The notation may be via a subscript. For example, an error-channel $\Lambda$ may be conditioned by a syndrome s, that may be denoted $\Lambda|s$ or $\Lambda_{|s}$. In other words, the referenced error channel may be the part of the error channel $\Lambda$ that may result the given syndrome s.

The term "quantum code" (or a "code space") may refer to a $2^k$-dimensional subspace Code $\subset \mathbb{C}^{2^n}$ of quantum states on n qubits.

The term "quantum encoder" may refer to a unitary mapping E on n qubits (or a device that implements the mapping), that maps a subset of k qubits to the code space ($E[\mathbb{C}^{2^k}\otimes|0_{n-k}\rangle]$=Code). Similarly, the term "quantum decoder" D may refer to a unitary mapping being the inverse of the mapping of the encoder, i.e., $D=E^{-1}$. The above k qubits (that are mapped to Code) may be referred to as "data qubits". The n−k complementary qubits may be referred to as "ancilla qubits". The total number of qubits (i.e., n) may be referred to as "code qubits". The rate of the code may be defined as k/n.

The term "logical equivalence" may be defined as follows: Two operators $\sigma$, $\sigma'$ (e.g., in the context of errors, Kraus operators) may be referred to as logically equivalent if their action on the code space is identical. Logical equivalence may be denoted by a tilde. That is, $\sigma\sim\sigma'$ if $\sigma|c\rangle\rangle=\sigma'|c\rangle\rangle$ for all $|c\rangle\in$Code. Between two logically equivalent operators, the following equality holds: $\sigma=\sigma'\cdot D^{-1}(I_k\otimes Z_{n-k})D$, for some invertible n−k qubit operator $Z_{n-k}$ that stabilizes $|0_{n-k}\rangle$.

$\Pi_s$ may denote an orthogonal projector corresponding to a syndrome measurement outcome s. $R_s$ may denote a recovery operation corresponding to the syndrome measurement outcome s. Specifically, $\Pi_0$ may be the projector on the code space, where $R_0=1$. The following equivalence may hold for each syndrome measurement outcome s:

$$\prod_s = R_s^{-1}\prod_0 R_s.$$

There are $2^{n-k}$ syndrome measurement outcomes s, and thus, there are $2^{n-k}$ orthogonal projectors $\Pi_s$, and there are $2^{n-k}$ corresponding recovery operations. The orthogonal projectors $\Pi_s$ and recovery operations $R_s$ may be defined as super-operators. An orthogonal projector $\Pi_s$ corresponds a projection operator $\pi_s$ where $\Pi_s|\rho\rangle\rangle=\pi_s\rho\pi_s$. A recovery operation $R_s$ corresponds a unitary operator $r_s$ where $$R_s|\rho\rangle\rangle = r_s\rho r_s^{-1}.$$

Additional "measurement qubits" and "flag qubits" may be added to the code qubits. The measurement qubits and flag qubits may be assumed to be initialized to the $|\vec{0}\rangle$ state. These qubits are usually traced out or being reset after they are measured (in the Z basis). The syndrome s may thus include more than $2^{n-k}$ bits, e.g., due to the measurement of flag qubits or repeated or iterated code cycles. Generally, all mid-circuit measurement outcomes of syndromes (i.e., values of s) obtained during an EC cycle may be collected for processing. In other words, the syndrome s may contain all mid-circuit measurement outcomes obtained during an EC cycle.

An ideal error-correction cycle may be: $EC_{ideal}=\Sigma_s R_s\Pi_s$ where the sum runs over all the possible syndrome measurement outcomes s. An ideal EC cycle always outputs a code state.

The syndrome measurement and recovery operations may generally be implemented by noisy quantum circuits. Each physical operation in these circuits may carry a physical error channel (i.e., an error channel defined over physical qubits). The physical error channel can be assumed to act before an operation, after an operation, or both before and after an operation. As an example, a noise model where a Pauli channel after each physical gate may be assumed. Such model may be e.g., when employing Pauli twirling, or by considering a Clifford EC cycle (see Nielsen & Chuang, page 443). In such example, each physical error channel may be viewed as a probability distribution over Pauli super-operators. Locality may also be assumed, such that each physical Pauli error may have a low weight (see definition below), and may involve only nearby qubits according to some graph or hyper-graph.

A fault f may correspond to a set of physical errors that can occur during the noisy EC cycle. A fault f may be specified by the space-time positions in the circuit at which each error occurs, and the type of errors that occurred at each position (e.g., specified by a Pauli operator).

A weight of a fault may be defined according to context. The possible definitions include: the number of physical errors included in the fault f, and a number of qubits affected by the fault f.

The term "error-fault combination" (EFC for short) may refer to a pair of an error e and a fault f, An EFC may be denoted (e, f). A weight of an EFC may be defined as $w_{e,f}=w_e+w_f$, where We may be the weight of the input error e.

Figure 1:
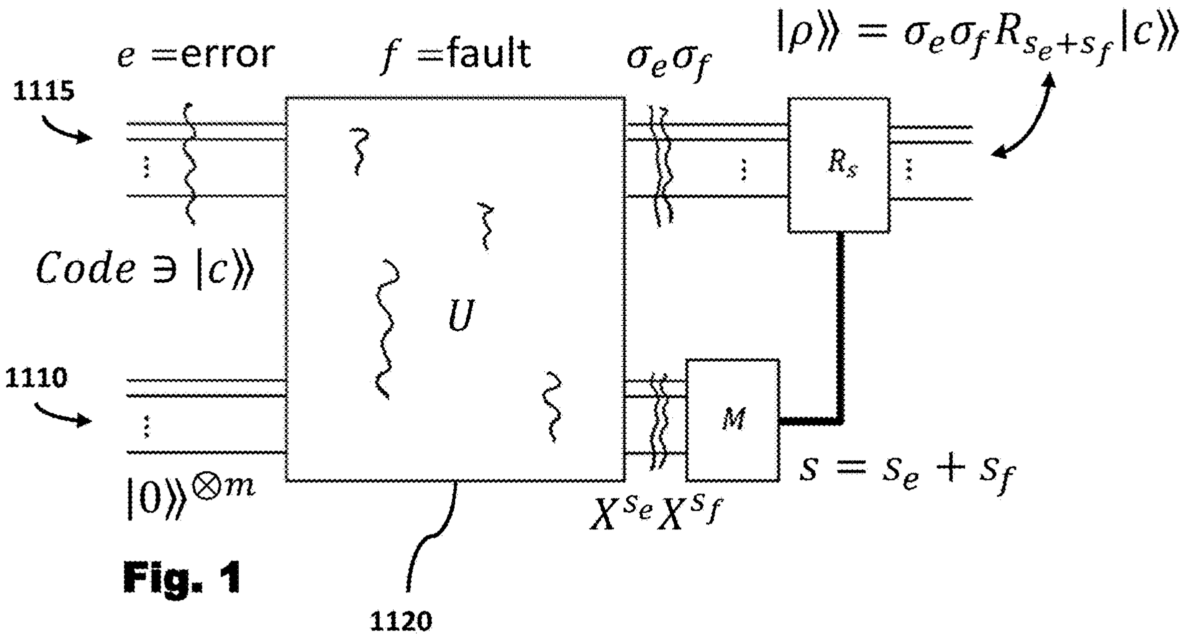
FIG. 1 schematically illustrates an error-correction cycle, using notation used in the present disclosure.

FIG. 1B schematically illustrates an exemplary error-correction cycle, using notation introduced hereinabove. A simple EC cycle (i.e., computation with one round of syndrome measurement) is illustrated. Data qubits 1115 may be encoded, i.e., be in quantum state $|c\rangle\rangle\in$Code. Ancilla qubits 1110 may be initialized to a zero state (i.e., $|0\rangle\rangle^{\otimes m}$). The data qubits may be affected by an error e (depicted by a curly line crossing the lines depicting the data qubits 1115), represented by the super-operator $\sigma_e$, before a computation U 1120. In this example, the error e may include at least one physical Pauli error (thus, a single Pauli super-operator on the code qubits). The computation U 1120 may introduce further errors, that is, a fault f (depicted by curly lines inside the box depicting the computation U 1120), represented by the super-operator $\sigma_f$. The fault f may include at least one physical Pauli error. Clifford gates included in the computation U 1120, that may entangle the data qubits 1115 with the ancilla qubits 1110, may be assumed ideal. The effect of the fault f on the code qubits may be equal to $\sigma_f\otimes X^{s_f}$, where $$X^{s_f}=\otimes_{i=1}^{m} X^{s_{f,i}},$$

where each $X^{s_{f,i}} \in \{I, X\}^{\otimes m}$ may be an X-type Pauli super-operator acting on the m measurement qubits. The syndrome may be $$s_f = (s_{f,i})_{i=1}^m \in \{0, 1\}^m.$$

It is noted that analogous Z-type Pauli errors may be irrelevant, since the measurement is performed in the Z basis. A similar propagation and decomposition is performed to the input error. Thus, the combined effect of the error e and the fault f on the data qubits 1115 may be equal to $\sigma_e\sigma_f$. The combined effect of the error e and the fault f on the ancilla qubits 1110 may be equal to $X^{s_e}X^{s_f}$. The measured syndrome s (measured by measurement apparatus M) may thus be $s=s_e+s_f$. A recovery operation $R_s$ may be applied on the data qubits 1115 according to the measured syndrome s. Thus, the total effect of the computation on the data qubits 1115 may be $\sigma_e\sigma_f R_{s_e+s_f}|c\rangle\rangle$.

Given a distribution of possible faults p(f), a non-ideal EC cycle may be:

$$EC_F = \sum_s EC_s = \sum_f \sum_s p(f)\sigma_{f,s} R_{s'} \prod_{s'}$$

where $$\sigma_{f,s} = \sigma_f R_s R_{s'}^{-1}$$

and $s'=s-s_f$. Here, s may be a measured syndrome, $s_f$ may be the syndrome corresponding the fault f and an ideal input ($\in$ Code), and s' may be the correct syndrome that would have been measured in the absence of the fault f. The output error $\sigma_{f,s}$ may be due to the direct action $\sigma_f$ of f on the code qubits, as well as the incorrect recovery operation $R_s$ instead of $R_{s'}$, which is due to the action of f on the measurement qubits.

In order to obtain 'fault tolerance' (see definition hereinbelow), it is common to use repeated EC cycles, where, e.g., two faulty cycles may be performed:

$$EC_F = \sum_{s_2} R_{s_2} N_{s_2} \sum_{s_1} R_{s_1} \prod_{s_1}$$

where faults are not explicitly indicated. Another common practice is adaptive EC cycles, where, e.g., the second cycle may be performed only if the first cycle produces a non-trivial syndrome, in which case the recovery operation may may depend on the two syndrome measurements:

$$EC_F = \prod_0 + \sum_{s_1 \neq 0, s_2} R_{s_2,s_1} \prod_{s_2} R_{s_1} \prod_{s_1}$$

A non-ideal EC cycle $EC_F$ may be applied to an erred code state $|c_{err}\rangle\rangle$:

$$|c_{err}\rangle\rangle = \Lambda_{in}|c\rangle\rangle = \sum_e p(e)e|c\rangle\rangle$$

$\Lambda_{in}$ may be an input error channel, that may be described as a distribution over errors (e.g., Kraus super-operators) e. The following relations may hold:

$$EC_F\Lambda_{in}|c\rangle\rangle = \sum_s EC_s\Lambda_{in}|c\rangle\rangle = \sum_{s,f,e} p(e)p(f)\sigma_{f,e,s}R_{s'}\prod_{s'}|c\rangle\rangle$$

where $s'=s-s_e-s_f$ and $$\sigma_{e,f,s} = \sigma_e\sigma_f R_s R_{s'}^{-1}.$$

Since $R_{s'}\Pi_{s'}|c\rangle\rangle = \delta_{s',0}|c\rangle\rangle$, then an output error channel $\Lambda_{out}$ may be defined:

$$EC_F\Lambda_{in}|c\rangle\rangle = \sum_s \sum_{f,e:\, s_e+s_f=s} p(e)p(f)\sigma_{e,f}|c\rangle\rangle = \sum_{e,f} p(e)p(f)\sigma_{e,f} = \Lambda_{out}|c\rangle\rangle$$

with $\sigma_{e,f}=\sigma_e\sigma_f R_{s_e+s_f}$. Since output error channel $\Lambda_{out}$ may act on a code state $|c\rangle\rangle$, output errors $\sigma_{e,f}$ may be only defined up to logical equivalence, and can be replaced with a fixed representative for their logical equivalence class. In stabilizer codes, an error $\sigma_{e,f}$ can be replaced by a representative for its stabilizer group coset.

The input channel may be defined on the code space, that is, it may describe errors on top of an ideal code state. Under this assumption, the output channel may be a usual Pauli channel. This convention may be used for any EC cycle or error-corrected logical operation, irrespective of their position in the circuit. Thus, all previous errors, apart from $\Lambda_{in}$, may be assumed to have been corrected, or may be assumed to have generated logical errors (that preserve the code space), at least up to small corrections.

$\Lambda_{out}$ may be expressed in a few alternative ways:

$$\Lambda_{out} = \sum_\sigma p(\sigma)\sigma = \sum_s p(s)\sum_\sigma p(\sigma|s)\sigma = \sum_s p(s)\Lambda_{out|s}$$

where a conditioned output error channel may be defined as $\Lambda_{out|s}=\Sigma_\sigma p(\sigma|s)\sigma$. The quantities p(σ), p(s), p(σ, s) may be:

$$p(\sigma) = \sum_{\substack{e,f:\\ \sigma_{e,f}\sim\sigma}} p(e)p(f);\ p(s) = \sum_{\substack{e,f:\\ s_e+s_f=s}} p(e)p(f);\ p(\sigma, s) = \sum_{\substack{e,f:\\ s_e+s_f=s\\ \sigma_{e,f}\sim\sigma}} p(e)p(f)$$

and where p(σ|s)=p(σ,s)/p(s). In these equations, s may run over syndromes and σ may run over logical equivalence classes.

A "classical decoder", or a "classical decoding algorithm", may refer to classical algorithm (i.e., algorithm running on a classical computer) that may implement a mapping $s \mapsto R_s$, i.e., the mapping between syndrome and recovery operation. An example of a classical decoder is a maximum likelihood (classical) decoder. The maximum likelihood classical decoder may choose for a syndrome s the recovery operation given by the most likely logical equivalence class of errors:

$$R_s = \underset{\sigma}{\text{argmax}}\, p(\sigma_{bare} \mid s) = \underset{\sigma}{\text{argmax}}\, p(\sigma_{bare}\ \&s)$$

where $p(\sigma_{bare}\&s)$ may be defined by:

$$p(\sigma_{bare}\ \&s) = \sum_{\substack{e,f: \\ s_e+s_f=s \\ \sigma_e\sigma_f\sim\sigma_{bare}}} p(e)p(f)$$

$\sigma_{bare}\sim\sigma_e\sigma_f$ may be a logical equivalence class of pre-recovery output errors, to be distinguished from the post-recovery output errors $\sigma\sim\sigma_{e,f}=\sigma_e\sigma_f R_{s_e+e_f}$. This may require specification of an input error model. A simpler approach (i.e., without specification of an input error model) may be to choose the minimum weight equivalence class, that is, the equivalence class that can be obtained from the lowest weight EFC (e, f).

In addition to or as part of the classical decoding algorithm, a subset of syndromes may be rejected, i.e., final measurement outcomes of shots may be discarded if a rejected syndrome is measured. Rejected shots may be terminated after the rejected syndrome is measured, and prior to final measurement. In other words, rejection of shots may be done in mid-shot, for example, after syndrome measurement of an error-corrected subcircuit. The set of syndromes may be divided into two non-overlapping subsets, $S=S_{acc}\cup S_{rej}$, where syndromes in $S_{acc}$ may be corrected, and syndromes in $S_{rej}$ may be rejected.

The output errors $\sigma$ in $\Lambda_{out}=\Sigma_\sigma p(\sigma)\sigma$ and $\Lambda_{out|s}$ may be divided into three different types. A first type may be corrected (or trivial) output errors. An output error $\sigma$ may be classified as corrected (or trivial) if it is logically equivalent to the identity, $\sigma\sim I$, or $\sigma|c\rangle\rangle=|c\rangle\rangle$ for all code states c. This means that any EFC e, f with $\sigma_{e,f}=\sigma$ may be corrected by the EC cycle, and may not need to be addressed by subsequent EC cycles or EM.

A second type may be correctable errors. An output error $\sigma$ may be classified as correctable if an additional ideal code cycle corrects it, $EC_{ideal}\sigma|c\rangle\rangle=|c\rangle\rangle$ ($\forall c\in$ Code). Non-trivial correctable errors may include errors that may be corrected by a next EC cycle with high probability (assuming the probability for faults in each cycle is small, a necessary condition for useful EC). Therefore, correctable errors may be viewed as the input errors for the next cycle. Accordingly, correctable errors may not be required to be mitigated as output errors.

A third type may be logical errors. An output error $\sigma$ may be classified as a logical error if it may be equivalent to an encoded k-qubit operation, $\sigma\sim D(\sigma_k\otimes I_{n-k})D^{-1}$. Nontrivial logical errors may map the code space to itself, with some code states |c) being mapped to different code states, $|c'\rangle\rangle=\sigma|c\rangle\rangle\neq|c\rangle\rangle$. It follows that non-trivial logical errors may not be correctable, $EC_{ideal}\sigma|c\rangle\rangle=EC_{ideal}|c'\rangle\rangle=|c'\rangle\rangle\neq|c\rangle\rangle$. In the absence of mitigation, logical errors may accumulate from logical operation to logical operation, eventually leading to large systematic errors in final measurement outcomes.

Figure 3A:
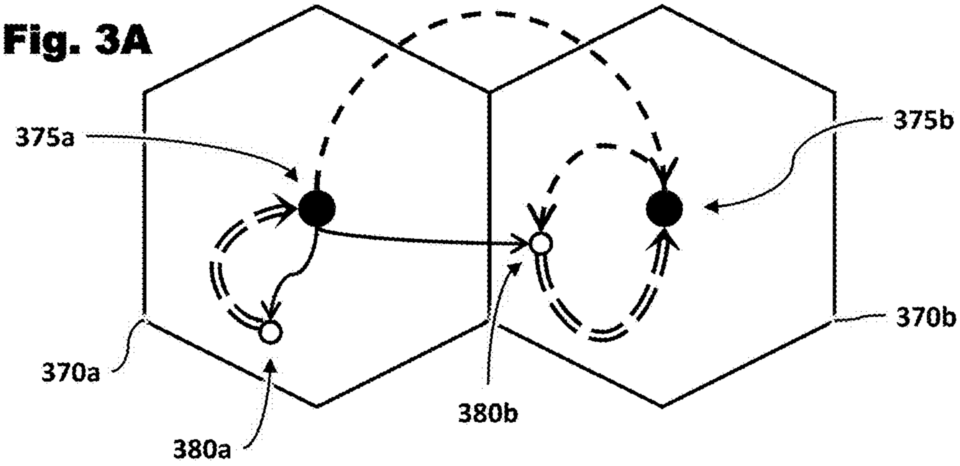
FIG. 3A-3B depicts ideal and non-ideal error-correction.
Figure 3B:
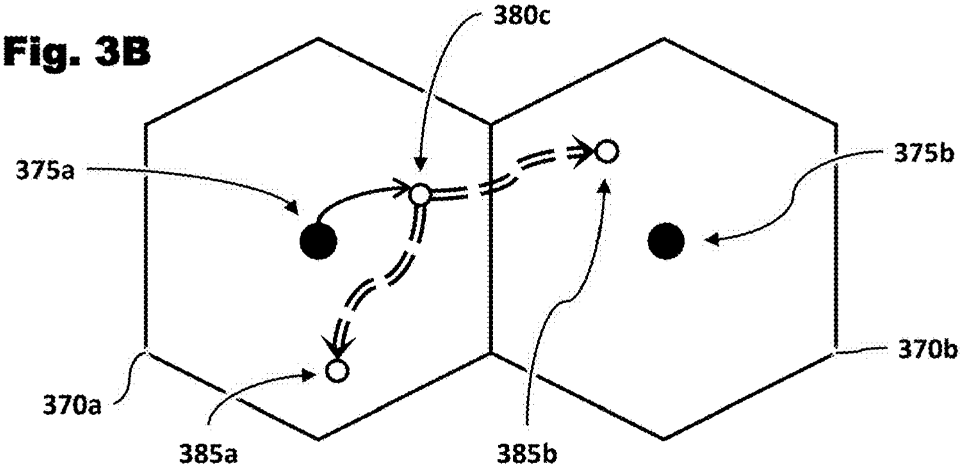

FIG. 3A-3B depicts ideal and non-ideal error-correction, along with some types of errors. FIG. 3A depicts ideal error-correction, whereas FIG. 3B depicts non-ideal error-correction. A logical qubit may be composed of a plurality of physical qubits. The plurality of quantum states of the physical qubits are depicted as points inside polygons 370*a* 370*b*. Ideally, the logical qubit may be in a $|0\rangle\rangle$ state 375*a*, or in a $|1\rangle\rangle$ state 375*b*, or in a superposition thereof. However, errors may occur, depicted by arrows with a solid line. Error correction is depicted by arrows having a dashed compound (double) line.

Each polygon defines a set of quantum states of the physical qubits that may be corrected by an ideal EC cycle to the same logical quantum state. That is, quantum states depicted as a point in polygon 370*a* (such as quantum state 380*a*) may be corrected by an ideal EC cycle to the $|0\rangle\rangle$ state 375*a*. Quantum states depicted as a point in polygon 370*b* (such as quantum state 380*b*) may be corrected by an ideal EC cycle to the $|1\rangle\rangle$ state 375*b*.

The error shifting the quantum state from $|0\rangle\rangle$ state 375*a* to the quantum state 380*a* may be a correctable error, as the logical state before the occurrence of the error is the same as the logical state after applying the ideal error correction. The error shifting the quantum state from $|0\rangle\rangle$ state 375*a* to the quantum state 380*b* may not be correctable, as the logical state before the occurrence of the error is not the same as the logical state after applying the ideal error correction. In other words, the latter error may be a logical error.

Should a non-ideal error correction be applied, some errors may not be corrected, and/or new errors may be introduced. For example, a correctable error (by an ideal EC cycle) may shift the quantum state from $|0\rangle\rangle$ state 375*a* to the quantum state 380*c*. A non-ideal EC cycle may be applied in an attempt to correct the error. Depending on the exact errors that may occur during the non-ideal EC cycle, the new quantum state may be a correctable error (e.g., quantum state 385*a*), or may represent a be an uncorrectable error (e.g., quantum state 385*b*).

Figure 3C:
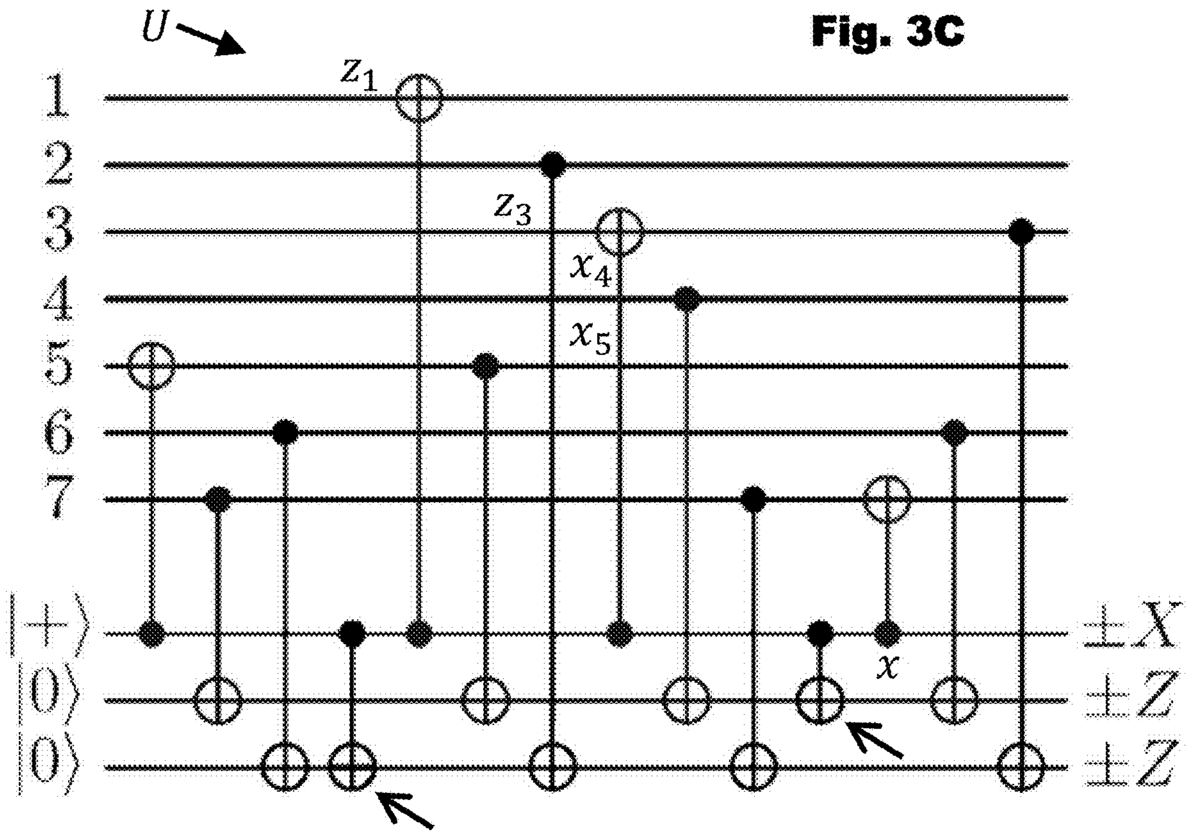
FIG. 3C schematically illustrates different types of errors in a syndrome-measurement circuit for the Stean error-correction code.

FIG. 3C schematically illustrates corrected and correctable errors in a syndrome measurement circuit for the Stean error-correction code. FIG. 3C schematically illustrates a syndrome measurement circuit U for 3 out of 6 stabilizers of the Steane code. A complementary syndrome measurement circuit U' may be used for measuring the remaining 3 stabilizers of the Steane code. See [Reichardt, 2018] listed hereinabove, which FIG. 3C is based on.

An EC cycle may begin with a syndrome measurement using these two circuits (i.e., U, U'). If a non-trivial syndrome bit is observed, the syndrome measurement may be stopped and restarted (now without the CNOT gates herein marked with arrows). U' may be assumed to be performed first, and then U. $x_4$ marks a Pauli-X error, affecting the fourth qubit, which may be measured and corrected. $x_5$ marks a Pauli-X error, affecting the fifth qubit, which happens too late in the syndrome measurement circuit to be measured by U (i.e., no further gates, between the affected qubit and the ancilla qubits, are applied after the error). $x_5$ is, however, correctable, as it may be corrected by the next EC cycle (if it is fault-free EC cycle). A simple example of a fault that may lead to a logical error, is a pair of Pauli-Z errors that may affect the first and third qubits ($Z_1Z_3\sim Z_2Z_1$) at the positions marked with $z_1$, $Z_3$. This fault leads to a trivial syndrome and therefore trivial recovery. x (without a subscript) marks a Pauli-X error that may flip the measurement result (measurement error), leading to an incorrect syndrome.

Generally, errors may be decomposed into a product of (other) errors. In other words, errors may be equivalent to a series of two or more (other) errors. Thus, every output error $\sigma$ may be (equivalent to) a product $\sigma \sim \sigma_l \sigma_c$, i.e., a product of a logical error $\sigma_l$ and a correctable error $\sigma_c$. The proof is as follows. Given an output error $\sigma$, the following equivalence may hold (c.f. hereinabove in the definition of logical equivalence):

$$\sigma \sim D(\sigma_k \otimes X_{n-k})D^{-1} = D(\sigma' \otimes X_s)D^{-1}$$

Each $X_{n-k}=X_s$ may correspond to a unique syndrome s of the ideal code cycle. Each $s\neq 0$ may correspond to either a rejected syndrome, or to a unique correctable error, having an associated recovery operation $$R_s = D(\sigma'_s \otimes X_s)D^{-1}.$$

Thus:

$$\sigma \sim D\left(\sigma'(\sigma'_s)^{-1} \otimes I\right)D^{-1} \cdot D(\sigma'_s \otimes X_s)D^{-1} = \sigma_l \sigma_c$$

i.e., $\sigma$ may be a product of a logical error and a correctable error. Q.E.D.

A corollary is that by applying an ideal EC cycle to $$\Lambda_{out} = \sum_{i,j} p_{i,j} \sigma_c^{(i)} \sigma_l^{(j)}$$

all $$\sigma_c^{(i)}$$

may be corrected. Thus, a logical error channel $$\Lambda_l \times \sum_j p_j \sigma_l^{(j)}$$

may be obtained, where $p_j=\Sigma_i p_{i,j}$. An output error $\sigma=\sigma_l\sigma_c$ may thus be non-correctable if $\sigma_l\neq I$, i.e., if it carries a logical error.

The decomposition hereinabove (to a correctable error and a logical error) is depicted in FIG. 3A. As indicated hereinabove, an error shifts the quantum state from $|0\rangle\rangle$ state 375*a* to the quantum state 380*b*. This error is equivalent to an error that may shift the quantum state from $|0\rangle\rangle$ state 375*a* to the $|1\rangle\rangle$ state 375*b*, followed by an error that may shift the quantum state from the $|1\rangle\rangle$ state 375*b* to the quantum state 380*b*. These two errors are depicted by arrows having a dashed, non-compound line.

Up to logical equivalence, the output error channel may be:

$$\Lambda_{out} = (1-\epsilon_c-\epsilon_{nc})I + \epsilon_c \sum_c + \epsilon_{nc} \sum_{nc}$$

where in this equation, the capital-sigma symbols here may symbol errors and may not symbol a sum of quantities preceded by the capital-sigma symbols. $\epsilon_c$ and $\epsilon_{nc}$ may denote, respectively, the probability for obtaining a correctable error and a non-correctable error, at the output of a given EC cycle. The probability for a corrected output error may be $1-\epsilon_c-\epsilon_{nc}$. Mathematically:

$$\epsilon_c = \sum_{\sigma:\,correctable} p(\sigma); \sum_c = \epsilon_c^{-1} \sum_{\sigma:\,correctable} p(\sigma)\sigma$$

$$\epsilon_{nc} = \sum_{\sigma:\,noncorrectable} p(\sigma); \sum_{nc} = \epsilon_{nc}^{-1} \sum_{\sigma:\,noncorrectable} p(\sigma)\sigma$$

A correctable error channel $\Lambda_c$ and a non-correctable error channel $\Lambda_{nc}$ may be defined:

$$\Lambda_c = (1-\epsilon_c)I + \epsilon_c \sum_c; \Lambda_{nc} = (1-\epsilon_{nc})I + \epsilon_{nc} \sum_{nc}$$

The logical error rate/probability/infidelity may be the infidelity of the logical error channel $\Lambda_l$ defined above, and may be given by $\epsilon_l=\epsilon_{nc}$. The error channels may be defined per-syndrome:

$$\Lambda_{out|s} = \left(1-\epsilon_{c|s}-\epsilon_{nc|s}\right)I + \epsilon_{c|s} \sum_{c|s} + \epsilon_{nc|s} \sum_{nc|s}$$

And where $\epsilon_{l|s}=\epsilon_{nc|s}$.

A set of logical operations (or code cycles) may be defined as fault-tolerant up to a weight t, or t-FT for short, if any EFC with weight $w_{e,f} \leq t$ may either be corrected or be correctable (irrespective of what the next logical operation is). That is, the lowest weight EFCs that lead to a non-correctable error may have weight t+1.

A code with distance d, may provide for logical operations which are t-FT with t up to t=[(d−1)/2], which is equivalently (d−1)/2 for d odd, and (d−2)/2 for d even. For many known codes with distance d, universal sets of t-FT logical operations have been constructed. As a rule of thumb, the logical error for a given FT level t may be the probability for any fault with weight t+1, which may be given by:

$$\epsilon_l \approx \binom{V}{t+1} \epsilon^{t+1}(1-\epsilon)^{V-t-1} \approx e^{-V\epsilon}(V\epsilon)^{t+1}/(t+1)! \approx (V\epsilon)^{t+1}/(t+1)!$$

where V may be the number of gates in the EC cycle, and where the relevant regime may be $t \ll V \ll \epsilon^{-1}$. The first inequality may be due to the fact that known EC cycles require $V \gg t$ gates to correct all t-EFCs (which may gradually change with improvements in hardware). The second inequality states that the probability for a single fault in the EC cycle is small, which may be valid at least for small-distance codes.

An EC threshold may be defined as the physical infidelity $\epsilon$ at which $\epsilon_l=\epsilon$. According to the above rule of thumb, the threshold is $\epsilon_{th} \sim [(t+1)!]^{1/t} V^{-1-1/t}$, and $\epsilon_l \sim (\epsilon/\epsilon_{th})^t \epsilon$. Increasing t may improve the dependence of the threshold on the volume, though generally V may be increased to achieve larger t. In the specific example of a surface code, these effects cancel out at large t, but the threshold does improve with t at small t. The logical infidelity may decrease exponentially with t for a given ratio $\epsilon/\epsilon_{th}<1$.

A "naïve" rejection strategy may be to reject any syndrome that does not correspond to a unique lowest weight output error (the weight of an output error being that of the corresponding EFC, and where output errors are considered up to logical equivalence). This may be used as a specification of the syndrome subset $S_{rej}$. In the t-FT setting, $S_{rej}$ may correspond to syndromes that can only be generated by EFCs with w≥t+1. This may include a significant part of w=t+1 EFCs. Since a code with distance d=2t+2 can correct input errors up to weight t, and additionally detect input errors with weight t+1, the above naïve definition of $S_{rej}$ may be particularly useful in even distance codes. In comparison, codes with odd distance d=2t+1 can correct up to weight t input errors, with no additional guarantee for detection. In the context of SA-LEM, as described hereinbelow, syndrome rejection can, in some embodiments, be very useful in odd distance codes. In some embodiments of SA-LEM, it can be useful to avoid syndrome rejection altogether, setting $S_{rej}=\emptyset$.

The EC cycles and definitions presented and elaborated hereinabove in this subsection, can be viewed as error-corrected logical idle (or identity) operations. The above formalism extends straight forwardly to non-identity operations. An n-qubit operation g may defined as a logical operation if it corresponds to a k-qubit operation $g_k$, such that $g \sim D(g_k \otimes I_{n-k})D^{-1}$. g can be a unitary or non-unitary operation, including both Clifford and non-Clifford operations. g can be a state preparation operation, including both stabilizer and non-stabilizer states. g can be a measurement operation. In particular, g can be adaptive, including a measurement of (some) logical qubits and a subsequent operation conditioned on the measurement result.

A faulty sub-circuit $G=\Sigma_s G_s$ (in analogy with $EC_F=\Sigma_s EC_s$) may be referred to as an "error corrected logical operation" given that it includes syndrome measurements and recovery operations, and that is meant to implement a logical operation g (see FIG. 2B for an example). The error-corrected ideal version $G_{ideal}$ may be given by the same sub-circuit, but where a presumption of an absence of faults may hold. I.e., such that $G_{ideal}\sigma_c|c\rangle\rangle=g|c\rangle\rangle$ for any code state $|c\rangle\rangle$ and correctable input error $\sigma_c$. A logical operation may include one or more EC cycles. Distinct logical operations may have distinct EC cycles, and/or distinct sets of cycles. Note that G may generally involve additional measurement/flag qubits, which may be reset or traced out at after the execution of G (e.g., at the end of executing G).

A layer of logical operations $\otimes_\alpha g^{(\alpha)}$ may correspond to a parallel application of operations $g^{(\alpha)}$ on non-overlapping subsets of logical qubits. Each $g^{(\alpha)}$ may be mapped to a corresponding error corrected logical operation $G^{(\alpha)}$, thereby obtaining a layer of such operations, $L=\otimes_\alpha G^{(\alpha)}$, where a corresponding ideal version may be $$L_{ideal}=\bigotimes_a G^{(\alpha)}_{ideal}.$$

EC schemes that may encode many logical qubits or operations together, or classical decoding algorithms which may involve syndrome measurements performed in multiple EC cycles or circuit layers, may be grouped together to form larger error corrected logical operations.

Annotations provided inside pseudocode of algorithms ("inline comments") may each be given with a preceding hash symbol (i.e., the # symbol).

Description of the P2LC Component

As indicated hereinabove, SA-LEM may require, in some embodiments, a characterization of syndrome-conditioned error channels $\{\Lambda_{L|k}\}$. In other words, characterizing the errors, so that for at least one syndrome measurement outcome k, an error channel that affects the qubits of the computation so that a syndrome measurement will result the outcome k, may be inferred. The ExtLEM method suggested in the prior art (i.e., as described hereinabove, where logical operations are characterized as if they are physical operations, while ignoring their internal structure and syndrome data) is meant to characterize an average channel $\Lambda_L=\Sigma_k \Lambda_{L|k}$, and cannot generally provide syndrome-resolved characterization. The only case in which ExtLC may be able to provide some required characterization for SA-LEM may be when the set of possible syndrome measurement outcomes may be divided into two subsets (i.e., K=2), and one of the two subsets may be rejected. In this case, ExtLC may be used to characterize the accepted error channel $\Lambda_{L|acc}$, by implementing rejection in logical characterization circuits run on the QPU as part of ExtLC. However, this may lead to a shot sampling overhead in the characterization step due to the rejection probability (the probability to reject $p_{rej}$ may be $p_{rej}=1-p_{acc}$ where $p_{acc}$ may be the probability to accept, both may be non-zero). Further, there may be a significantly smaller logical error $\epsilon_{L|acc}<\epsilon_L$, that may be harder to characterize.

An additional difficulty in ExtLC is that it characterizes logical operations outside of their context in the given circuit, given by earlier and later quantum operations. Thus, ExtLC ignores a 'logical context dependence' phenomenon, which is described hereinbelow.

As an alternative to ExtLC, a physical-to-logical characterization method (hence, P2LC for short) is presented in the present disclosure. To summarily describe P2LC, an error corrected quantum circuit $C=L_D \ldots L_1$, written in terms of layers of error-corrected logical operations, $L_i=\otimes_{\alpha\in A_i} G_\alpha$ may be considered. Each layer may correspond to a parallel application of one or more error corrected logical operations $G_\alpha$. The error corrected logical operations $G_\alpha$ may be supported on non-overlapping subsets of logical qubits. By convention, it may be assumed that each $G_\alpha$ performs EC independently. If EC is done on several logical operations together, these logical operations may be considered as one error corrected logical operation. In particular, if EC is done on all logical operations in the layer together, the layer itself may be an error corrected logical operation. A layer $L_j$ in C may be considered. In order to characterize input, output and logical errors associated with $L_j$, the P2LC method may:

1. Characterize physical operations (as opposed to logical operations) on the given QPU.
2. Map the resulting physical error models to input, output and logical error cannels associated with $L_j$, via a classical algorithm, described below.

Figure 4:
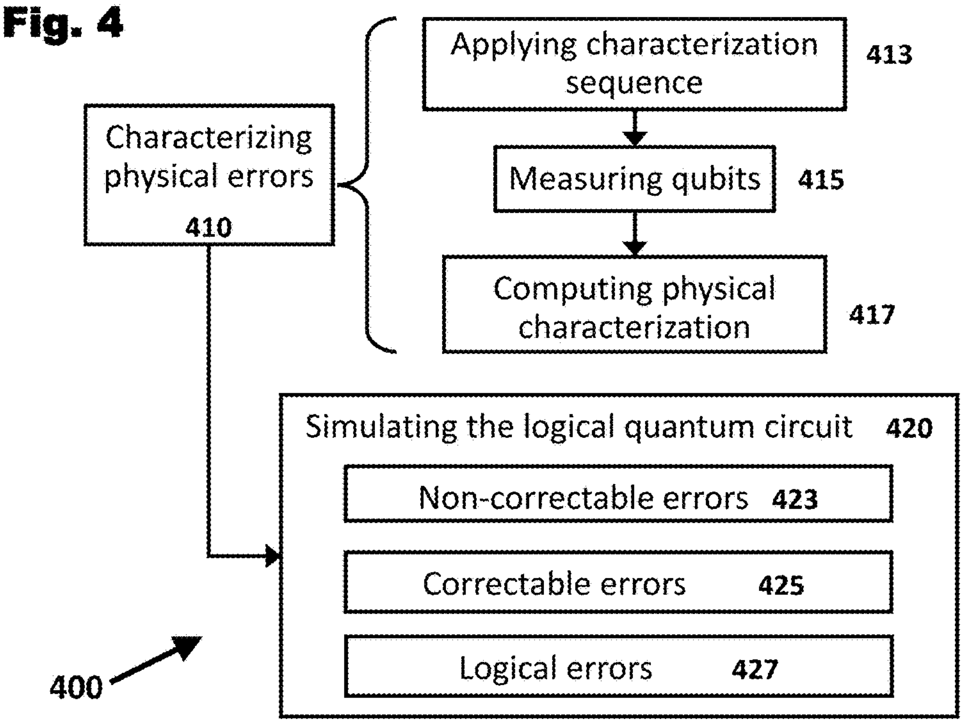
FIG. 4 schematically illustrates a broad aspect of characterization methods according to the present disclosure.

With reference to FIG. 4, a computer implemented method 400 according to embodiments of the present disclosure, for computing mitigatable errors of an error-corrected logical quantum operation, is schematically illustrated. The method 400 may be an embodiment of the P2LC component. In other words, the P2LC component may be schematically illustrated in FIG. 4.

The method 400 may include a step 410 of characterizing physical errors. Errors of at least one physical quantum gate, included in the logical quantum operation, may be characterized, so as to obtain physical characterization data.

The method 400 may include a step 420 of simulating the logical quantum operation. The logical quantum operation may be simulated according to the characterization data. In other words, a computation may be performed, where an input to the computation may include the characterization data and a representation of a quantum state being an input to the logical quantum operation. An output of the computation may be a representation of a quantum state being an output to the logical quantum operation given the representation of a quantum state being an input to the logical quantum operation.

The logical quantum operation may be simulated so as to obtain simulated output errors and syndromes. Simulated output errors and syndromes may be obtained so as to obtain the mitigatable errors. For example, the mitigatable errors may be computed (i.e., post-processed) according to an input of the simulated output errors and syndromes.

Generally, step 410 of characterizing physical errors may include applying a characterization protocol. Examples include, but not limited to, gate set tomography, state tomography, and process tomography. The step 410 of characterizing physical errors may include a step 413 of applying at least one characterization sequence to a set of qubits included in a quantum processor. The step 410 of characterizing physical errors may include a step 415 of measuring the set of qubits using a measurement apparatus of the quantum processor, thereby obtaining a set of measurement values. The step 410 of characterizing physical errors may include a step 417 of computing the physical characterization data, by fitting a model to the set of measurement values.

The step 420 of simulating the logical quantum operation may include a step 423 of computing a distribution of correctable output errors. The step 420 of simulating the logical quantum operation may include a step 425 of computing a distribution of non-correctable output errors. according to the simulated output errors and syndromes.

The step 420 of simulating the logical quantum operation may include a step 427 of simulating output errors includes computation of logical output errors.

The physical characterization step in P2LC (i.e., step 410) may correspond to the characterization of individual physical gates, layers of such gates acting in parallel, sub-circuits including several such layers, and/or entire sub-circuits implementing syndrome-measurements and logical operations. A distinction from ExtLC may be that the characterized operations may not include any (or at least as little as possible) recovery operations or syndrome rejection.

Figure 5:
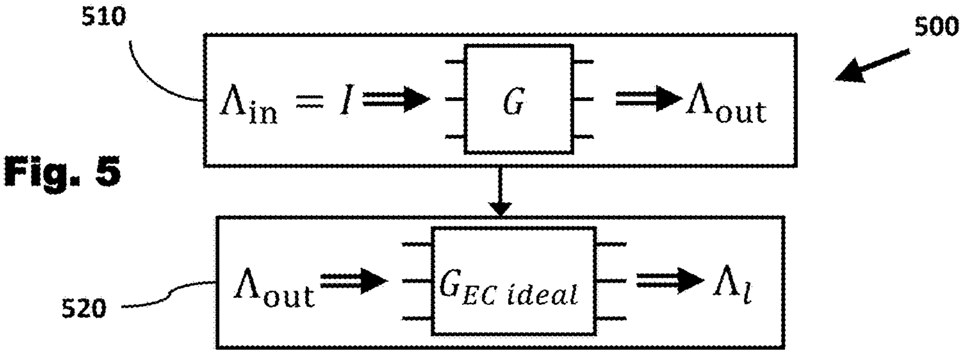
FIG. 5 schematically illustrates computation of errors, including simulation of logical errors, according to the present disclosure.

With reference to FIG. 5, exemplary simulation of logical errors 500 (i.e., an exemplary implementation of step 427 in FIG. 4), according to the present disclosure, is schematically illustrated. The logical operation may be denoted G. A version of the logical operation G where error correction is ideal, may be denoted $G_{EC\ ideal}$.

In some embodiments, simulating the logical quantum operation may include performing a simulation using any of a Clifford simulator (e.g., a stabilizer simulator) or a state-vector simulator.

In some embodiments (of the P2LC, e.g., of method 400) simulating the logical quantum operation 500 may include a step 510 of providing the logical quantum operation with input channel having no errors, so as to obtain the output error channel. That is, a $\Lambda_{in}=I$ may be provided to G, so as to obtain $\Lambda_{out}$. Simulating the logical quantum operation 500 may include a step 520 of applying (in simulation) an ideal error correction cycle on the output error channel, so as to obtain a correctable part $\Lambda_c$ of the output error channel and a logical error part $\Lambda_l$ of the output error channel. That is, a $\Lambda_{out}$ may be provided to $G_{EC\ ideal}$, so as to obtain $\Lambda_l$ and $\Lambda_c$.

In some embodiments, the classical algorithm included in P2LC may take as input a 'history parameter' h≥1. The classical algorithm included in P2LC may include an iterative procedure, where iterating may be performed over the logical layers $L_{i_0}, \ldots, L_j$, where $i_0=\max(1, j-h)$. The earliest layer may be assigned an input error channel $\Lambda_{in,i_0}=I$, i.e., $L_{i_0}$ may be assumed to have an error-free input. The output error channel $\Lambda_{out,i}$ of each logical layer $L_i$ may be computed by simulating $L_i$, where an error channel $\Lambda_{in,i}$ and the model obtained for physical errors in $L_i$ may be given as an input. Mathematically, $\Lambda_{out,i}L_{ideal,i}=L_i\Lambda_{in,i}$, where $L_{ideal,i}$ may be the ideal version (i.e., with no physical errors) of $L_i$. Given $\Lambda_{out,i-1}$, the input to the subsequent layer may be defined by extracting the 'correctable part', $\Lambda_{in,i}=\mathrm{Corr}(\Lambda_{out,i-1})$. The correctable part may correspond to output errors which may be corrected, with high probability, by subsequent logical layers. In some embodiments, correctable errors may be defined as being corrected by a next logical layer, if it is ideal, i.e., $L_{ideal,i}\mathrm{Corr}(\Lambda_{out,i-1})=I$. The input and output error channels estimated by P2LC for the layer of interest $L_j$ may be $$\Lambda_{in}^{(j)} = \Lambda_{in,j},\ \Lambda_{out}^{(j)} = \Lambda_{out,j}.$$

A logical error channel $$\Lambda_l^{(j)}$$

may additionally be estimated for $L_j$. Estimating the logical error channel $$\Lambda_l^{(j)}$$

may be performed by extracting from each error in $$\Lambda_{out}^{(j)}$$

its logical part. In some embodiments of P2LC, the iterative procedure may applied to both $L_j$ and $L_{j+1}$, and the 'exact error channel'

$$\Lambda_e^{(j)} = \left(\Lambda_{in}^{(j+1)}\right)^{-1}\Lambda_{out}^{(j)}$$

may be computed.

The channels $$\Lambda_e^{(j)} \text{ and } \Lambda_l^{(j)}$$

may be related, and each may have an advantage when utilizing the methods according to the present disclosure. The channel $$\Lambda_e^{(j)}$$

may as an exact error channel, i.e., $$C = \prod\nolimits_{j=1, \ldots D} L_j = \prod\nolimits_{j=1, \ldots D} \Lambda_e^{(j)} L_{j,ideal}.$$

However, $$\Lambda_e^{(j)}$$

is not a logical error channel in the mathematical sense, i.e., it may be defined over physical qubits, as opposed to the significantly smaller number of logical qubits. Therefore the channel $$\Lambda_e^{(j)}$$

may be harder to characterize, may be harder to store (i.e., have parameters thereof stored in a computer's memory), and manipulate. On the other hand, the channel $$\Lambda_l^{(j)}$$

may be a logical error channel defined over logical qubits. The channel $$\Lambda_l^{(j)}$$

may be approximate, i.e., $$C = \prod\nolimits_{j=1, \ldots D} L_j \approx \prod\nolimits_{j=1, \ldots D} \Lambda_l^{(j)} L_{j,ideal}.$$

The accuracy of this approximation, as well as the relation between $$\Lambda_l^{(j)} \text{ and } \Lambda_e^{(j)},$$

may depend on h, as described hereinbelow.

Figure 8:
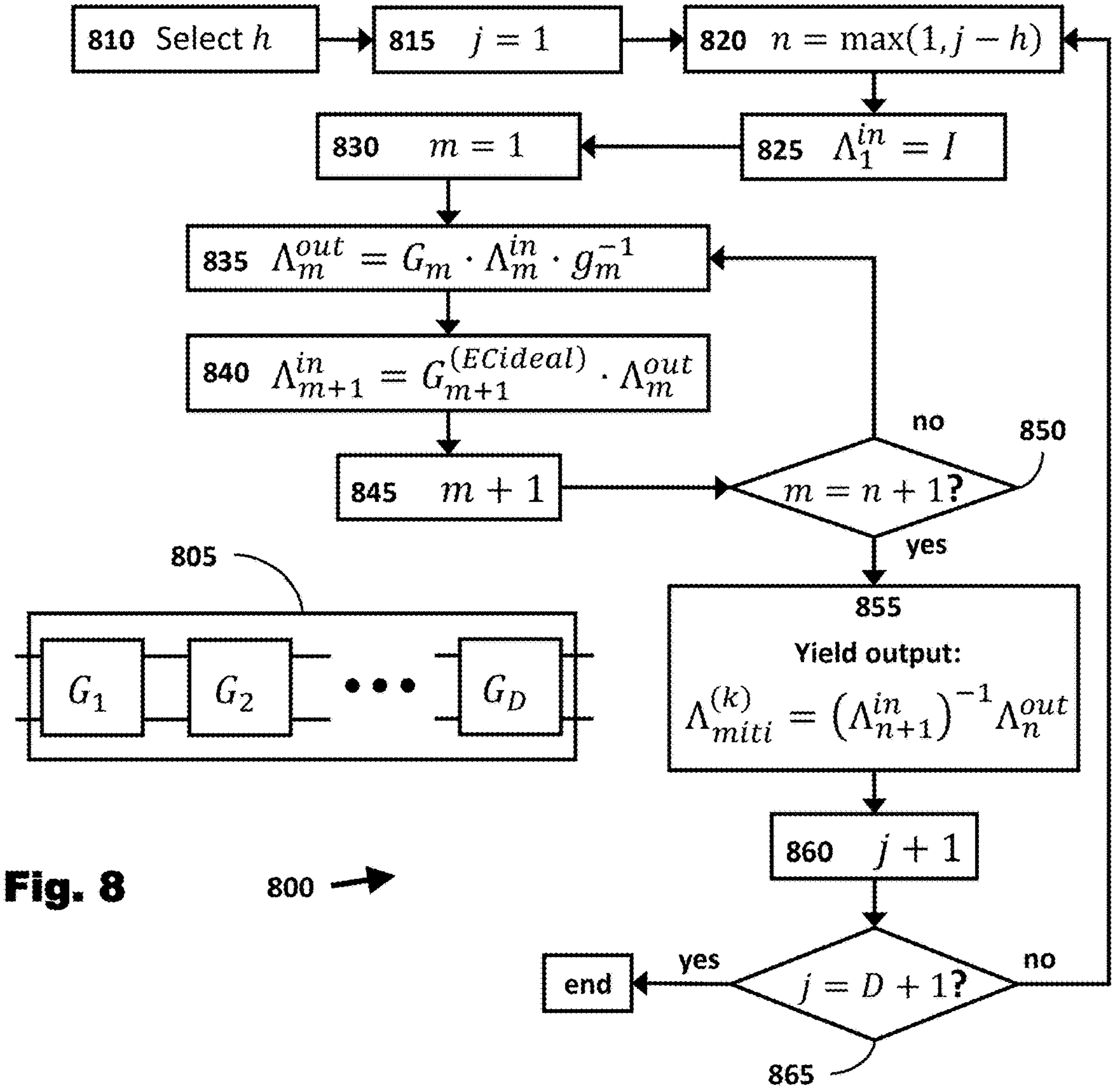
FIG. 8 schematically illustrates characterization methods according to the present disclosure.

FIG. 8 shows a flowchart schematically illustrating a characterization method 800 according to the present disclosure. The method 800 may be an iterative embodiment of P2LC, described hereinabove and further elaborated hereinbelow. An error-corrected quantum circuit 805 may be composed of a sequence of error-corrected quantum gates. A first error-corrected quantum gate in the sequence may be $G_1$. A last error-corrected quantum gate in the sequence may be $G_D$. The method 800 may fully characterize error in the error-corrected quantum circuit 805.

The method 800 may include a step 810 of selecting a desired history parameter. The method 800 may include a step 815 of setting a first loop-index j, so that j=1. The method 800 may include a step 820 of setting a layer-pointer (layer-indexer) n to a first layer to be included in the characterization. Thus, the layer-pointer n is set so n=max(1, j−h). The method 800 may include a step 825 of setting a first input error-channel $$\Lambda_1^{in}$$

to 'no error', or in other words, to an identity matrix $$(\Lambda_1^{in} = I).$$

The method 800 may include a step 830 of setting a second loop-index m, so that m=1.

The method 800 may include a step 835 of computing an output error channel for the m'th quantum gate (i.e., $$\Lambda_m^{out},$$

associated with $G_m$, may be computed). In other words, the m'th quantum gate may be simulated. The computation may include executing the m'th quantum gate on a QPU, and processing measurement results. The specific computation method is not limited. The computation may generally compute the expression $$\Lambda_m^{out} = G_m \cdot \Lambda_m^{in} \cdot g_m^{-1}$$

(or equivalent thereof), where $g_m$ may be an ideal version of $G_m$.

The method 800 may include a step 840 of computing an input error channel for the m+1'th quantum gate. The specific computation method is not limited. The computation may generally compute the expression $$\Lambda_{m+1}^{in} = G_{m+1}^{(ECideal)} \cdot \Lambda_m^{out}$$

(or equivalent thereof). In other words, application of an ideal EC cycle, on the output error channel (for the m'th quantum gate), may be simulated. The resulting logical error channel may be the input for the m+1'th quantum gate.

The, to simulate the next (the m+1'th) quantum gate. The method 800 may include a step 850 of checking a condition on m. If m≠n+1, then the next quantum gate may be simulated (execution of the method 800 is transferred back to step 835).

If m=n+1, then a step 855 of providing/recording a partial output (sometimes known in algorithmics as a "yield-output") is performed. The yield-output is an output of the last simulated (error-corrected) quantum gate (in the loop indexed by m). Mathematically, the yield-output is equal to $$\Lambda_{miti}^{(k)} = (\Lambda_{n+1}^{in})^{-1} \Lambda_n^{out}.$$

where k may index the output logical error channels.

After step 855, method 800 may include a step 860 of advancing the first loop-index j in one (i.e., j←j+1). The method 800 may include a step 865 of checking a condition on j. If j≠D+1, then a next output logical error channel may be characterized (execution of the method 800 is transferred back to step 820). If j=D+1, the method 800 ends.

Iterative embodiments may be summarized, with some change of notation, as follows. A computer implemented method (e.g., method 800) for characterizing an output error channel in a sequence of error-corrected logical quantum operations $G_k \ldots G_1$. The method may include performing P2LC (e.g., method 400) for each quantum operation $G_n$ included in a subsequence of error-corrected logical quantum operations $G_1, \ldots, G_h$. The method may include, for each quantum operation $G_n$, providing the quantum operation $G_n$ with input channel having errors being a correctable part $$\Lambda^*_{n-1}$$

of an output error channel of a preceding quantum operation $G_{n-1}$, so as to obtain an output error channel of the quantum operation $G_n$. A first input channel 4, provided for a first quantum operation $G_1$ may have no errors. The method may include, for each quantum operation $G_n$, applying an ideal error correction cycle version of a succeeding quantum operation $G_{n+1}$ on the output error channel $\Lambda_n$ of the quantum operation, so as to obtain a correctable part of the output error channel $$\Lambda^*_n$$

of the quantum operation $G_n$. An iterative embodiment may be repeated so as to encompass a plurality of gates (preferably, all gates) of a quantum circuits. These embodiments may be summarized as follows. A computer implemented method (e.g., method 800) for characterizing an output error channel in a subcircuit of error-corrected logical quantum operations. The subcircuit may include a sequence $G_D \ldots G_1$, the method may include performing an iterative embodiment (e.g., method 800) for some (preferably, each) sequence $G_A \ldots G_H$ wherein H=max(1, A−h) wherein h may be an history parameter. In some embodiments, h may equal the fault tolerance level (i.e., t or t+1).

The significance of the history parameter h may stems from the fact that in all known EC schemes, errors generated within one logical operation may in part be corrected by subsequent logical operations. The basic reason is that physical errors can generically occur 'too late' in the logical operation to be corrected by it. Examples include physical measurement errors, and errors in the recovery operation. See FIG. 3C for an illustration and description associated thereto hereinabove.

The output error channel after each logical operation may depend both on the input errors (un-corrected but correctable errors) received from previous logical operations, and on the errors passed as input to subsequent operations. An inherent 'logical context-dependence', or 'logical non-Markovianity', may result in error corrected quantum circuits. I.e., logical errors that may appear after a given logical operation, may generically depend on both past and future operations. This effect is distinct and occurs irrespectively of any non-Markovianity or context dependence that may occur at the physical level.

A larger h may lead to a longer classical runtime for P2LC (e.g., method 800). However, taking h too small may lead to a very inaccurate $$\Lambda^{(j)}_l$$

(logical errors due to fault-paths that may extend more than h layers backwards in time may be ignored), and may lead to a channel $$\Lambda^{(j)}_e$$

which may include correctable errors (and therefore, may have an infidelity which is much larger than $\epsilon_L$). Performing LEM based on $$\Lambda^{(j)}_l$$

may then result in a large systematic error of the mitigated outcome, while performing LEM based on $$\Lambda^{(j)}_e$$

may result in the un-needed mitigation of correctable errors, leading to large statistical errors.

In some embodiments, computation of logical output errors may be performed according to a fault tolerance level t being a number of faults correctable by an ideal error correction cycle. In some embodiments, the computation may include computation of correctable errors that may include at least t+1 faults. Hereinbelow, it is shown that for a t-fault-tolerant circuit (t-FT, where each fault path with weight ≤t may be corrected by some logical operation), setting h=t may suffice to ensure that $$\Lambda^{(j)}_e = I + O(\epsilon^{t+1}),$$

where $\epsilon$ may be the physical error rate. Thus, no fault-paths with weight ≤t, which may be guaranteed to be corrected, may be included in $$\Lambda^{(j)}_e.$$

Note that in a t-FI circuit, the logical error rate is $\epsilon_l = O(\epsilon^{t+1})$. Moreover, for the same value of h=t, it is shown that $$\Lambda^{(j)}_l$$

may be exact up to $O(\epsilon^{t+2})$ corrections. Thus, all leading order logical errors may accurately be captured by $$\Lambda_l^{(j)}.$$

Accordingly, in some embodiments, the circuit C may have accurately be captured by fault-tolerance level t, and the history parameter is h=t. In other embodiments, lower or higher values of h may be used.

In some embodiments, the above iterative procedure of classical simulation and elimination of non-correctable errors may be based on a sampling of fault-paths. Each fault path may be a set of physical errors in the in the subcircuit $L_j \ldots L_{i_0}$, which may be sampled from the (model for) physical error models of physical operations in the subcircuit. The iterative procedure may then be applied separately to each sampled fault-path. Working with fault-paths may allow to condition on syndrome data within P2LC, by recoding the syndrome data obtained in each simulated fault path. This may be done by:

a) For some error-corrected logical operations $\{G_\alpha\}_{\alpha\in A}$, included in the subcircuit $L_j \ldots L_{i_0}$, a partition of the corresponding set of syndromes into $K^\alpha$ non-overlapping subsets $$\{S_k^\alpha\}_{k=1}^{K^\alpha}$$

may be specified.

b) A corresponding syndrome data vector $k=(k^\alpha)_{\alpha\in A}$, may be recorded for each simulated fault-path, if the syndrome $$s^\alpha \in S_{k^\alpha}^\alpha$$

is obtained during the simulation of $G_\alpha$, for $\alpha\in A'$.

c) Averaging over the input, output and logical errors obtained for fault paths where a specified syndrome data vector k was obtained, to obtain conditioned input, output and logical error channels, $$\Lambda_{in|k}^{(j)}, \Lambda_{out|k}^{(j)}, \text{ and } \Lambda_{l|k}^{(j)},$$

as well as the probability for the syndrome data vector $$p_k^{(j)}.$$

The exact channel may also be computed in the syndrome-conditioned case, $$\Lambda_{e|k}^{(j)} = \left(\Lambda_{in|k}^{(j+1)}\right)^{-1} \Lambda_{out|k}^{(j)}.$$

P2LC may allow to condition on the syndrome data k corresponding to any subset of error corrected logical operations $G_\alpha$ in the subcircuit $L_j \ldots L_{i_0}$. The syndrome data k may include syndromes that may be measured within the characterized layer $L_j$, and/or may include syndromes measured in earlier layers. In some embodiments, it may be useful to condition only on syndromes measured within $L_j$, while averaging may be performed over earlier syndromes.

The classical resources required for P2LC may be proportional to the number n of fault-paths that may need to be sampled in order to meet a required characterization accuracy. Hereinbelow, a simple ('naïve') sampling of fault paths, where a physical error is sampled from each physical error channel, is demonstrated to have an advantage. It is shown that $$n = \tilde{O}\left(m\delta_{rel}^{-2}\epsilon_L^{-1}\right)$$

may suffice to meet a relative 1-norm characterization accuracy $\delta_{rel}$ with high probability, when m error rates may be characterized. It is further shown that the number of error rates m may be m=O(N) when $\Lambda_l$ my be characterized on N logical qubits in local EC schemes. The factor $$\epsilon_L^{-1}$$

in n may already be much better than the naively expected $$\epsilon_L^{-2}.$$

Thus, sampling only a small traction of fault-paths (i.e., fault-paths leading to a logical error) may be required.

More sophisticated sapling may be performed. An 'importance sampling' strategy, described hereinbelow, may be utilized in P2LC. The sampling may be based on a set of constraints that may be satisfied by fault paths in order to generate a logical error. The factor $$\epsilon_L^{-1}$$

(in the expression for n) may be reduced significantly, and may even be eliminated. In other words, the number of paths (that may be required to be sampled) may not increase as the logical error-rate decreases. As an example, in a t-FT circuit, the requirement of a total weight ≥t+1 may be incorporated, reducing the factor $$\epsilon_L^{-1} = O\left(\epsilon^{-t-1}\right)$$

to a factor c=O(1). An additional exemplary set of constraints ('casual-connectivity') that may be used in order to reduce the factor c towards 1, are described hereinbelow. Thus, the importance sampling of fault-paths in P2LC may be highly efficient.

In some embodiments, characterizing physical errors may be performed so a ratio of relative accuracy of logical errors $\Delta\varepsilon_L/\varepsilon_L$ to a relative accuracy of physical errors $\Delta\varepsilon/\varepsilon$ may be approximately t+1. The benefit may be as derived hereinbelow.

Hereinabove output errors were described as a function of input errors and faults. Input errors may be due to faults occurring in earlier operations, that were not corrected. The input errors may include multiple faults, or fault-paths, occurring in multiple earlier operations. As a result, output error channels in error-corrected circuits may have an inherent memory, or in other words, non-Markovianity. Thus, error channels may depend not only on the operation to which they correspond, but also on previous operations. As shown hereinbelow, this memory may extend further back in time for error-corrected circuits with higher fault-tolerance levels. Additionally, the partition of output errors to correctable and non-correctable errors, may depend on the subsequent logical operation, implying that non-correctable and logical error channels may depend not only on previous operations, but also on the subsequent operation. This dependency may be termed 'logical context-dependence', and may pose a challenge for the 'external logical characterization' (ExtLC) protocols suggested in the prior art. ExtLC protocols involve logical characterization circuits that differ from the given logical circuit, and will therefore characterize operations outside of their appropriate context in the given circuit. This is inherent in ExtLC, as despite the dependence between output errors occurring in different error corrected logical operations, it is desirable to specify a separate error model associated with each operation in a circuit, for several applications-including certain logical error mitigation (LEM) protocols.

Given an error-corrected circuit $C=G_D \ldots G_1$ (where each $G_j$ may be a layer of error-corrected logical operations), an 'exact' error channel $$\Lambda_e^{(j)}$$

may be obtained for each layer, for example, by specifying an arbitrary input channel $$\Lambda_{in}^{(j)}$$

for each layer, as follows. Output channels due to input errors and faults may be computed:

$$\Lambda_{out}^{(j)} = G_j \Lambda_{in}^{(j)} g_j^{-1},$$

such that $$\Lambda_{out}^{(j)} g_j |c\rangle\rangle = G_j \Lambda_{in}^{(j)} |c\rangle\rangle$$

for all code states c, may be computed. The following equalities may hold:

$$C = \prod_j G_j = \prod_j G_j \Lambda_{in}^{(j)} \left(\Lambda_{in}^{(j)}\right)^{-1} = \prod_j \left(\Lambda_{in}^{(j+1)}\right)^{-1} G_j \Lambda_{in}^{(j)} = \prod_j \left(\Lambda_{in}^{(j+1)}\right)^{-1} \Lambda_{out}^{(j)} g_j = \prod_j \Lambda_e^{(j)} g_j$$

Thus, $$\Lambda_e^{(j)} = \left(\Lambda_{in}^{(j+1)}\right)^{-1} \Lambda_{out}^{(j)}$$

may function as an effective after-error channel for the layer $g_j$, and may be exact. The exactness may be in the sense that $$C = \prod_j \Lambda_e^{(j)} g_j$$

may be a strict equality, as opposed to an approximation.

The definition in the example hereinabove of $$\Lambda_{in}^{(j)}$$

(and therefore, the definition of $$\Lambda_e^{(j)})$$

has been completely arbitrary (i.e., no specific details of $$\Lambda_{in}^{(j)} \text{ and } \Lambda_e^{(j)}$$

were relied upon the derivation). The input channel $$\Lambda_{in}^{(j)}$$

may account for fault-paths that may have not been corrected by layers before $G_j$. Additionally, fault-paths that may lead to a logical error before $G_j$ may not be passed as input to $G_j$ since they may not be corrected by it. An appropriate definition of $$\Lambda_{in}^{(j)}$$

may lead to channels $$\Lambda_e^{(j)}$$

that may be closely related to the logical error channels $$\Lambda_l^{(j)}$$

corresponding to $$\Lambda_{out}^{(j)}.$$

Hereinbelow is described an embodiment of a P2LC protocol that may output an estimate for the error channel $$\Lambda_e^{(j)}$$

occurring after each logical layer, and which may account for logical context-dependence. The strategy may be to perform a characterization of physical operations, and from it (i.e., according to the characterization of physical operations), compute classically the channel $$\Lambda_e^{(j)}$$

for each logical layer. The quantum and classical runtime advantages of P2LC over ExtLC are discussed further below.

Given a t-FT error-corrected circuit $C=G_D \ldots G_1$ and a physical error model for faults occurring in each logical gate $G_j$, a pseudocode of a P2LC characterization protocol based on classical simulation may be as follows:

---

Algorithm 1: P2LC - channel version

---

1. Input:
   - 1.1. A t-FT error-corrected circuit $C = G_D \cdots G_1$.
   - 1.2. A physical error model for faults occurring in each logical layer $G_j$.
   - 1.3. An integer "history parameter" h, which has a default value of t.
2. For $j = 1, \ldots, D$:
   - 2.1. Set $i_0 = \max(1, j - h)$, and begin with an ideal input channel $\Lambda_{in,i_o} = I$.
   - 2.2. For $i = i_o, \ldots, j$:
     - 2.2.1. Compute $\Lambda_{out,i} = G_i \Lambda_{in,i} g_i^{-1}$, where $g_i$ is the non-error-corrected and ideal version of $G_i$.
     - 2.2.2. Extract the correctable errors by applying $G_{i+1,ideal}$, the ideal but error-corrected version of $G_{i+1}$: $\Lambda_{out,i} = (1 - \epsilon_{c,i} - \epsilon_{nc,i})I + \epsilon_{c,i}\Sigma_{c,i} + \epsilon_{nc,i}\Sigma_{nc,i}$, such that $G_{i+1,ideal}\Sigma_{c,i} = g_{i+1}$.
     - 2.2.3. Define the correctable error channel $\Lambda_{in,i+1} := \Lambda_{c,i} := (1 - \epsilon_{c,i})I + \epsilon_{c,i}\Sigma_{c,i}$, which is the input to the next step.
     - 2.2.4. End For.
   - 2.3. Record $\Lambda_{out}^{(j)} = \Lambda_{out,j}$ and $\Lambda_{in}^{(j)} = \Lambda_{in,j}$.
   - 2.4. End For.
3. Output:
   - 3.1. for each of $j = 1, \ldots, D$:
     - 3.1.1. $\Lambda_e^{(j)} = \left(\Lambda_{in}^{(j+1)}\right)^{-1}\Lambda_{out}^{(j)}$ (with $\Lambda_{in}^{(D+1)} = \Lambda_{in}^{(1)} = I$).
     - 3.1.2. $\Lambda_l^{(j)}$, the logical channel corresponding to $\Lambda_{out}^{(j)}$.

---

Some comments on Algorithm 1 may now be given. By definition $$G_j\Lambda_{in}^{(j)} = \Lambda_{out}^{(j)} g_j = \Lambda_{in}^{(j+1)}\Lambda_e^{(j)} g_j,$$

thus $$C = \prod_j G_j = \prod_j \Lambda_e^{(j)} g_j$$

(as shown above), and therefore $$\Lambda_e^{(j)}$$

may be an "after error channel" that may occur after the logical layer $g_j$.

$$\Lambda_{in}^{(j)} \text{ and } \Lambda_{out}^{(j)}$$

may be different. The construction of $$\Lambda_{in}^{(j)}$$

may include several choices, including the history parameter h, and the way in which the non-correctable part may be manipulated at each step (e.g., $\Lambda_{in,i+1} := (1-\epsilon_{c,i})/+\epsilon_{c,i}\Sigma_{c,i}$ as was done in Algorithm 1, by conditioning $$\Lambda_{in,i+1} := \frac{1}{1-\epsilon_{nc,i}}\left[(1-\epsilon_{c,i}-\epsilon_{nc,i})I + \epsilon_{c,i}\sum\nolimits_{c,i}\right],$$

without normalizing $\Lambda_{in,i+1} := (1-\epsilon_{c,i}-\epsilon_{nc,i})/+\epsilon_{c,i}\Sigma_{c,i}$, or without any removal $\Lambda_{in,i+1} := (1-\epsilon_{c,i}-\epsilon_{nc,i})I+\epsilon_{c,i}\Sigma_{c,i}+\epsilon_{nc,i}\Sigma_{nc,i}$, all of which agree up to $O(\epsilon^{t+1})$ corrections). For the purpose of logical error mitigation (LEM), any $$\Lambda_{in}^{(j)}$$

may be used to obtain un-biased mitigation. The sampling overhead will depend on the choice of $$\Lambda_{in}^{(j)}.$$

As shown hereinbelow the construction of $$\Lambda_{in}^{(j)}$$

may be designed to produce $$\Lambda_e^{(j)} = \Lambda_{out}^{(j)}\left(\Lambda_{in}^{(j+1)}\right)^{-1} = I + O\left(\epsilon^{t+1}\right),$$

which may ensure that all corrected and correctable errors guaranteed by t-FT may not unnecessarily be mitigated, thus leading to a sampling overhead $e^{O(\epsilon^{t+1})}$. In contrary, once $$\Lambda_{in}^{(j)}$$

is chosen, $$\Lambda_{out}^{(j)}$$

is uniquely determined (up to logical equivalence), and any inaccuracy in the computation of $$\Lambda_{out}^{(j)}$$

may lead to a possible bias in mitigation.

Figure 6:
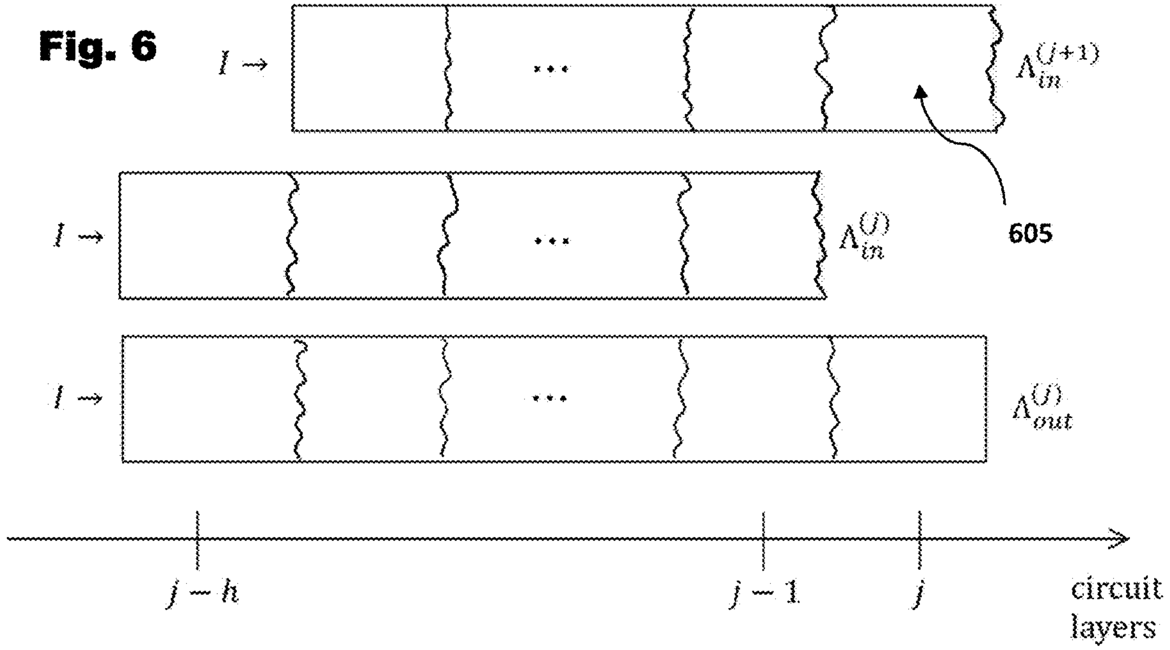
FIG. 6 schematically illustrates computation in characterization methods according to the present disclosure, applied to multi-layer quantum circuits.

Algorithm 1 is schematically illustrated in FIG. 6. Each error-corrected gate (equivalently, layer), e.g., gate 605, is depicted as a segment of a stripe. Gates are delimited (i.e., separated) from preceding/subsequent gates (in a circuit) by curly lines. An error-less input ($\Lambda$=I) may be provided to a first gate. Three examples are depicted. In a first depicted example, the first gate may be assigned the index subsequent to j−h. The execution of the circuit may be simulated. The result may be an output error channel. The simulation reaches the gate indexed j, and may continue. Thus, an input error channel for the j+1'th layer is obtained $$\left(\text{i.e., } \Lambda_{in}^{(j+1)}\right).$$

The second depicted example may be similar to the first depicted example. However, the first gate may be assigned the index j−h, and simulation stops at the gate indexed j. Thus, an input error channel for the j'th layer The third depicted example may be similar to the second depicted example. However, the simulation ends at the gate indexed j. Thus, an output error channel is obtained $$\left(\text{i.e., } \Lambda_{out}^{(j)}\right).$$

Several theorems on the P2LC may now be given.

Theorem 1 (P2LC guarantee for $\Lambda_a$ with h=t): If h=t, then $$\Lambda_e^{(j)} = I + \Lambda_{out}^{(j)} - \Lambda_{in}^{(j)} + O\left(\epsilon^{t+2}\right) = I + O\left(\epsilon^{t+1}\right).$$

I.e., $$\Lambda_e^{(j)}$$

agrees with the $\sim\epsilon^{t+1}$ part of $$\Lambda_{out}^{(j)},$$

which contains the leading-order non-correctable errors in $$\Lambda_{out}^{(j)},$$

without the lower-weight errors that are guaranteed to be correctable by t-FT (and which are canceled by $$\Lambda_{in}^{(j)}).$$

In particular $$\epsilon_e^{(j)} = O\left(\epsilon^{t+1}\right),$$

where $$\epsilon_e^{(j)}$$

is the infidelity of $$\Lambda_e^{(j)}.$$

Proof: It is first noted that $\Lambda_{in,i+1}$=$A_{c,i}$=$\Lambda_{out,i}$+O($\epsilon^{t+1}$), so:

$$\Lambda_{out,j} = G_j\Lambda_{in,j}g_j^{-1} = G_j\Lambda_{out,j-1}g_j^{-1} + O\left(\epsilon^{t+1}\right) = G_j \cdots G_{j-h}g_{j-h}^{-1} \cdots g_j^{-1} + O\left(\epsilon^{t+1}\right)$$

It follows that:

$$\Lambda_{out}^{0)} = G_j \ldots G_{j-h}g_{j-h}^{-1} \ldots g_j^{-1} + O\left(\epsilon^{t+1}\right)$$

$$\Lambda_{in}^{(j+1)} = G_j \ldots G_{j+1-h}g_{j+1-h}^{-1} \ldots g_j^{-1} + O\left(\epsilon^{t+1}\right)$$

where these two equalities are for j>h, as otherwise both $$\Lambda_{out}^{(j)} \text{ and } \Lambda_{in}^{(j+1)}$$

are given by $$G_j \ldots G_{j-h} g_{j-h}^{-1} \ldots g_j^{-1} + O(\epsilon^{t+1}).$$

Whether $G_{j-h}$ does not contain a fault $$(\text{i.e., } G_{j-h} g_{j-h}^{-1} = I)$$

or $G_{j-h}$ does contain a fault, then since corrections are up to $O(\epsilon^{t+1})$ and non-correctable errors are ignorable, a fault in each subsequent logical layer is required to avoid correction, leading to an $O(\epsilon^{h+1})$ difference between $$\Lambda_{out}^{(j)} \text{ and } \Lambda_{out}^{(j+1)}:$$

$$\begin{aligned}
\Lambda_{out}^{(j)} &= G_j \ldots G_{j-h} g_{j-h}^{-1} \ldots g_j^{-1} + O(\epsilon^{t+1}) \\
&= G_j \ldots G_{j-h+1}(I + O(\epsilon)) g_{j-h} g_{j-h}^{-1} g_{j-h+1}^{-1} \ldots g_j^{-1} + O(\epsilon^{t+1}) \\
&= \Lambda_{in}^{(j+1)} + G_j \ldots G_{j-h+1} O(\epsilon) + O(\epsilon^{t+1}) \\
&= \Lambda_{in}^{(j+1)} + G_j \ldots G_{j-h+1} O_c(\epsilon) + O(\epsilon^{t+1}) \\
&= \Lambda_{in}^{(j+1)} + G_j \ldots G_{j-h+2}(G_{j-h+1,ideal} + O(\epsilon)) O_c(\epsilon) + O(\epsilon^{t+1}) \\
&= \Lambda_{in}^{(j+1)} + G_j \ldots G_{j-h+2} O_c(\epsilon^2) + O(\epsilon^{t+1}) \\
&= \Lambda_{in}^{(j+1)} + G_j O_c(\epsilon^h) + O(\epsilon^{t+1}) \\
&= \Lambda_{in}^{(j+1)} + O(\epsilon^{h+1}) + O(\epsilon^{t+1}).
\end{aligned}$$

Here, if $O(\epsilon)=\Sigma\, a_\sigma(\sigma-I)$, then the notation $O_c(\epsilon)=\Sigma_{\sigma\in c}\, a_\sigma(\sigma-I)$ means that we remove the non-correctable part is removed, at the expense of $O(\epsilon^{t+1})$ corrections.

Therefore, for $h\geq t$ the equality $$\Lambda_{out}^{(j)} = \Lambda_{in}^{(j+1)} + O(\epsilon^{t+1})$$

holds, thus:

$$\begin{aligned}
\Lambda_e^{(j)} &= I + (\Lambda_{out}^{(j)} - \Lambda_{in}^{(j+1)})(\Lambda_{in}^{(j+1)})^{-1} \\
&= I + \Lambda_{out}^{(j)} - \Lambda_{in}^{(j+1)} + O(\epsilon^{t+2}) \\
&= I + O(\epsilon^{t+1}).
\end{aligned}$$

Corollary 2 (P2LC guarantee for $\Lambda_a$ with h=t+1): If $h\geq t+1$, then $$\Lambda_e^{(j)} = \Lambda_{nc}^{(j)} + O(\epsilon^{t+2}).$$

I.e., at leading order $\sim\epsilon^{t+1}$, $$\Lambda_e^{(j)}$$

agrees with the leading non-correctable errors in $$\Lambda_{out}^{(j)}.$$

As a result, the infidelity of $$\Lambda_e^{(j)}$$

agrees with the logical infidelity at leading order, $$\epsilon_e^{(j)} = \epsilon_{nc}^{(j)} + O(\epsilon^{t+2}) = \epsilon_l^{(j)} + O(\epsilon^{t+2}).$$

Proof: Theorem 1 shows that for h=t, the correctable part of $$\Lambda_{out}^{(j)}(\text{i.e., } \Lambda_c^{(j)})$$

agrees with $$\Lambda_{in}^{(j+1)},$$

up to possible $O(\epsilon^{t+1})$ corrections. These are due to correctable errors in $$\Lambda_{out}^{(j)}$$

beyond what's guaranteed by t-FT, and that depend on t+1 time steps backwards. They can be included in $$\Lambda_{in}^{(j+1)}$$

by setting h=t+1, in which case $$\Lambda_c^{(j)} = \Lambda_{in}^{(j+1)} + O(\epsilon^{t+2}),$$

and so $$\Lambda_{nc}^{(j)} = I + \Lambda_{out}^{(j)} - \Lambda_c^{(j)} = I + \Lambda_{out}^{(j)} - \Lambda_{in}^{(j+1)} + O(\epsilon^{t+2}) = \Lambda_e^{(j)} + O(\epsilon^{t+2}),$$

where Theorem 1 is used in the last equality.

Increasing h=t to h=t+1 does not change the scaling $\epsilon_a=O(\epsilon^{t+1})$, but will generally reduce ca by removing the leading 'accidental' correctable errors that are not guaranteed by t-FT. The case where h=t+1 steps (as opposed to h=t) may be referred to as "greedy P2LC".

Corollary 2 shows that P2LC gives an after-error channel $\Lambda_a$ that captures the leading order logical error, and which is exact, in the sense of the strict equality $$C=\prod_j \Lambda_a^{(j)} g_j.$$

However, $\Lambda_a=\Lambda_{nc}+O(\epsilon^{t+2})$ is, strictly speaking, a non-correctable error channel (at leading order) as opposed to a logical channel $\Lambda_l$, which means that, in each code block, it is defined over the n physical qubits, as opposed to the much smaller number of k logical qubits. Thus, the $4^k-1$ logical Pauli-error rates (per code block) in $\Lambda_l$ are split into a much larger number $4^n-1$ of possibly much smaller Pauli rates in $\Lambda_a$. Accordingly, it may be useful to work directly with $\Lambda_l$, which may be a much simpler channel to characterize, store and manipulate (e.g. mitigate), though this may involve an approximation, such that $$C\approx\prod_j \Lambda_l^{(j)} g_j.$$

Theorem 2 hereinbelow shows that with a history parameter h=t, P2LC may generate logical channels for which the approximation may involve an $O(\epsilon^{t+2})$ correction, such that leading logical errors $\sim\epsilon^{t+1}$ may be accurately captured.

Theorem 2 (P2LC guarantee for $\Lambda_l$ with h=t): Let $$\Lambda_l^{(j)}$$

be the logical error channels produced by P2LC, with h=t. Then $$C=\prod_{j=1}^{D}\Lambda_l^{(j)} g_j+O(D\epsilon^{t+2}).$$

Proof: The difference between $$\Lambda_e^{(j)} \text{ and } \Lambda_l^{(j)}$$

is given by $$\begin{aligned}\Lambda_{res}^{(j)}&=\Lambda_e^{(j)}-\Lambda_l^{(j)}\\&=\left[I+\Lambda_{out}^{(j)}-\Lambda_{in}^{(j)}+O(\epsilon^{t+2})\right]-\Lambda_l^{(j)}\\&=\left(\Lambda_c^{(j)}-\Lambda_{in}^{(j)}\right)+\left(\Lambda_{nc}^{(j)}-\Lambda_l^{(j)}\right)+O(\epsilon^{t+2}).\end{aligned}$$

Under the subsequent logical layer, $G_{j+1,ideal}[\Lambda_{nc,j}-\Lambda_{l,j}]=0$, so $G_{j+1}[\Lambda_{nc,j}-\kappa_{l,j}]=O(\epsilon^{t+2})$, Additionally, $$G_{j+1}\left(\Lambda_c^{(j)}-\Lambda_{in}^{(j)}\right)=G_{j+1}O_c\left(\epsilon^{t+1}\right)=O\left(\epsilon^{t+2}\right).$$

Thus, $$G_{j+1}\Lambda_{res}^{(j)}=O\left(\epsilon^{t+2}\right),$$

and so $$\begin{aligned}C&=G_D\ \ldots\ G_2G_1\\&=G_D\ \ldots\ G_2\Lambda_{in}^{(2)}\Lambda_e^{(1)}g_1\\&=G_D\ \ldots\ G_2\Lambda_e^{(1)}\Lambda_{in}^{(2)}g_1\\&=G_D\ \ldots\ G_2\left(\Lambda_l^{(1)}+\Lambda_{res}^{(1)}\right)\Lambda_{in}^{(2)}g_1.\\&=G_D\ \ldots\ G_2\Lambda_{in}^{(2)}\Lambda_l^{(1)}g_1+O\left(\epsilon^{t+2}\right)\\&=\Lambda_l^{(D)}g_D\ \ldots\ \Lambda_l^{(2)}g_2\Lambda_l^{(1)}g_1+O\left(D\epsilon^{t+2}\right).\end{aligned}$$

Since $$\Lambda_e^{(j)}\left(\Lambda_l^{(j)}\right)^{-1}-I=\Lambda_e^{(j)}-\Lambda_l^{(j)}+O\left(\epsilon^{2t+2}\right),$$

the same result holds when LEM is performed by implementing an inverse error channel (with e.g., QP decompositions), and $$\left(\Lambda_l^{(j)}\right)^{-1}$$

is implemented in place of $$\left(\Lambda_e^{(j)}\right)^{-1}.$$

Moreover, the above bounds hold in diamond norm (as shown for similar bounds hereinbelow), and are therefore worst-case bounds over input states and measured observables.

Following the above results, in some embodiments where SA-LEM is combined with P2LC, an exact error channel $\Lambda_e$ may play the role of the channel $\Lambda_L$ corresponding to logical errors which are mitigated, though $\Lambda_e$ is not, strictly-speaking, a logical error channel. In other embodiments of SA-LEM, the actual logical error channel $\Lambda_l$ may play the role of $\Lambda_L$. The small and capital subscripts l and L highlight this freedom.

P2LC with Fault-Path Sampling, and Syndrome-Aware P2LC

Assuming the physical error channels in each error-corrected logical layer can be described by a probability distribution of errors (e.g., Pauli errors), the classical simulation in P2LC may be performed by sampling fault-paths from the h-history of each logical layer, and separately performing classical simulation (of input, output and logical errors, as well as measured syndromes) for each fault-path. In this fault-path formulation, conditioning on measured syndromes and characterize error channels conditioned on syndrome data, as needed for SA-LEM, may be easy. An example, for a single layer, is given as a pseudocode in Algorithm 2. Algorithm 2 may be repeated for a plurality of layers.

A partition $$\{S_k^i\}_{k=1}^{K^i}$$

of syndromes in each logical layer $G_i$ in the h-history of $G_j$ ($i=i_0, \ldots, j$, $i_0=\max(1, j-h)$) may be assumed. It is assumed that a (possibly empty) rejected subset $$S^{i}_{rej}$$

is included in each partition. $K_{acc}$ denotes the version of K that excludes the rejected subsets. The following notations may be used:

$$k=(k_{i_o},\ldots,k_j);\ K=\{1,\ldots,K^{i_o}\}\times\cdots\times\{1,\ldots,K^j\};\ S_k=S_{k_{i_o}}\times\cdots\times S_{k_j}$$

| Algorithm 2: P2LC (fault-path version, syndrome-aware) |
|---|
| 1. Input:<br>1.1. A t-FT error-corrected circuit $C = G_D \cdots G_1$.<br>1.2. A target layer $G_j$.<br>1.3. An integer "history parameter" h, which has a default value of t.<br>1.4. A physical error model for faults occurring in each logical layer $G_i$, $i = i_0, \ldots, j$, $i_0 = \max(1, j - h)$.<br>1.5. A non-negative integer umber n of fault-paths to sample.<br>1.6. $e_{i_0} = I$. #Begin with no input errors.<br>2. For $p = 1, \ldots, n$:<br>2.1. For $i = i_0, \ldots, j$:<br>2.1.1. Sample a fault $f_{i,p}$ from the physical error channels in $G_j$, and compute the resulting output error $\sigma_{i,p} = G^{(f_{i,p})}_{i,p} e_{i,p} g_i^{-1}$ and sydrome $s_{(i,p)}$.<br>2.1.2. If $s_{i,p} \in S^{(i)}_{rej}$, $\sigma_{j,p} = e_{j,p} = 0$<br>2.1.2.1. Break For. #Simulated syndrome rejection.<br>2.1.3. Else: Check if $\sigma_{i,p}$ is correctable by applying $G_{i+1,ideal}$.<br>2.1.4. If $G_{i+1,ideal}\sigma_{i,p} \sim g_{i+1}$<br>2.1.4.1. $e_{i+1,p} = \sigma_{i,p}$. #Correctable output passed as input to next step.<br>2.1.5. Else: define $e_{i+1,p} = I$. #Non-correctable output is replaced by the identity.<br>2.1.6. End For.<br>2.2. End For.<br>2.3. $s_p = (s_{i_0,p}, \ldots, s_{j,p})$; $n_k = \lvert\{p: s_p \in S_k\}\rvert$.<br>3. Output:<br>3.1. for each $k \in K_{acc}$:<br>3.1.1. $p^{(j)}_k = n_k/n$; #Probability for measuring the syndrome data vector $k$.<br>3.1.2. $p^{(j)}_{acc} = \sum_{k\in K_{acc}} p^{(j)}_k$; #Probability of all accepted syndromes.<br>3.1.3. $\Lambda^{(j)}_{out\vert k} = n_k^{-1}\sum_{p:s_p\in S_k}\sigma_{j,p}$; #Output error channel conditioned on $k$.<br>3.1.4. $\Lambda^{(j)}_{in\vert k} = n_k^{-1}\sum_{p:s_p\in S_k} e_{j,p}$; #Input error channel conditioned on $k$.<br>3.1.5. $\Lambda^{(j)}_{l\vert k} = n_k^{-1}\sum_{p:s_p\in S_k}(\sigma_{j,p})_l$. #Logical error channel conditioned on $k$.<br>Here, $(\sigma_{j,p})_l$ is the logical factor in the correctable-logical representation $\sigma_{j,p} = (\sigma_{j,p})_l\,(\sigma_{j,p})_c$ |

After the algorithm runs also for $$G^{j+1},\ \Lambda^{(j)}_{e\vert k} = \Lambda^{(j)}_{out\vert k}\left(\Lambda^{(j+1)}_{in\vert k}\right)^{-1}$$

may be obtained.

The runtime of Algorithm 2 may be proportional to the number n of fault paths that need to be sampled to meet a required characterization accuracy. For simplicity of the proof, the logical error channel averaged over accepted syndromes, $$\Lambda_l = p^{-1}_{acc}\sum_{k\in K_{acc}} p_k\Lambda_{l\vert k}$$

may be considered. Writing $\Lambda_l=\Sigma_\sigma\, p_\sigma\, \sigma$ as a distribution over logical Pauli errors, the goal of P2LC may be to estimate the probability vector p. Denoting the estimate of P2LC for this vector by p̃, the characterization error may be quantified using the relative 1-norm $\delta_{rel}=\|\tilde{p}-p\|_1/\epsilon_1$. This norm may serve as a metric for possible EM biases due to characterization errors, as shown by Proposition 2 hereinbelow.

Fault paths may be sampled in P2LC. However, the resulting logical errors σ form a sample from p, and so p̃ may be a frequency vector sampled from p. The number of samples n may now be considered. In other words, assuming p̃ is obtained by sampling n times from p, how large should n be to guarantee a specified relative accuracy $\delta_{rel}$? This is a classical problem that can be stated as an $\ell_1$ tail bound for the multinomial distribution defined by p and n. As shown hereinbelow, $$n \sim \delta_{rel}^{-2}\epsilon_L^{-1}$$

samples may be enough. To gain intuition for the factor $$\epsilon_l^{-1},$$

as opposed to the naive $$\epsilon_l^{-2},$$

it is to be noted that small probabilities are estimated. Thus, corresponding variances are also small:

$$\mathbb{V}[\tilde{p}_\sigma] \le \mathbb{E}[\tilde{p}_\sigma^2] \le \mathbb{E}[\tilde{p}_\sigma] = p_\sigma \le \epsilon_l, \text{ for } \sigma \ne I.$$

Lemma 1 (P2LC classical sample complexity, naive sampling): Let m=|Supp(p)| be the number of non-zero entries in p(which need not be known a priori). Then $$n = O\left(\log(m/\delta) m \delta_{rel}^{-2} \epsilon_l^{-1}\right) = \tilde{O}\left(m \delta_{rel}^{-2} \epsilon_l^{-1}\right)$$

samples are enough to ensure $\|\tilde{p}-p\|_1/\epsilon_l \le \delta_{rel}$, with probability $1-\eta$.

Proof: Denoting $q=(q_\sigma)_{\sigma\ne I}=(p_\sigma)_{\sigma\ne I}$ the probability vector with the σ=I entry removed, the following holds: $1-p_I=\|q\|_1=\epsilon_l$. Ensuring:

$$\| p - \tilde{p} \|_1 \le 2\| q - \tilde{q} \|_1 \le \delta = \delta_{rel}\epsilon_L$$

May be desired. The multi-variate tail bound may be used:

$$\mathbb{P}\left(\left\| \frac{1}{n}\sum_{i=1}^{n} x_i - \mathbb{E}[x] \right\|_2 \ge \delta\right) \le m e^{-\frac{n\delta^2/2}{V + L\delta/3}}$$

where $x_i \sim x$ are i.i.d. random vectors, with $\|x\|_2 \le L/2$ and where $$\mathbb{E}\left[\| x - \mathbb{E}[x] \|_2^2\right] \le V$$

(c.f. 'matrix Bernstein inequality' in Tropp (2015) listed hereinabove, which also applies to vectors. Also, $\|x\|_2 \le L/2$ implies $\|x-\mathbb{E}[x]\|_2 \le L$). x may be a single-shot frequency vector (without the first entry) sampled from a multinational distribution defined by $$p = (p_I, q) \cdot \tilde{q} = \frac{1}{n}\sum_{i=1}^{n} x_i$$

may be a corresponding n-shot frequency vector. An expectation bound may hold:

$$\| x - \mathbb{E}[x] \|_2 \le \| x - \mathbb{E}[x] \|_1 \le \| x \|_1 + \| q \|_1 \le 1 + \epsilon_l$$

A variance bound may hold:

$$\sum_{\sigma\ne I} \mathbb{V}[x_\sigma] = \mathbb{E}\left[\| x - \mathbb{E}[x] \|_2^2\right] \le \mathbb{E}\left[\| x \|_2^2\right] = \sum_{\sigma\ne I} \mathbb{E}\left[x_\sigma^2\right] \le \sum_{\sigma\ne I} \mathbb{E}[x_\sigma] = \| q \|_1 \le \epsilon_l.$$

It follows that:

$$\mathbb{P}(\|\tilde{q} - q\|_2 \ge \delta) \le m e^{-\frac{n\delta^2/2}{\epsilon_l + (1+\epsilon_l)\delta/3}}$$

Using $\|\tilde{q}-q\|_1 \le \sqrt{m}\|\tilde{q}-q\|_2$:

$$\begin{aligned}
\mathbb{P}(\| \tilde{p} - p \|_1 / \varepsilon_l \ge \delta_{rel}) &\le \mathbb{P}(\| \tilde{q} - q \|_1 \ge \varepsilon_l \delta_{rel}/2) \\
&\le \mathbb{P}\left(\|\tilde{q} - q\|_2 \ge \epsilon_l \delta_{rel} m^{-1/2}/2\right) \\
&\le m e^{-\frac{n\epsilon_l \delta_{rel}^2/8}{m\left(1+(1+\epsilon_l)\delta_{rel} m^{-1/2}/6\right)}} \\
&< m e^{-\frac{n\epsilon_L \delta_{rel}^2}{9m}}
\end{aligned}$$

Thus $$n = 9\log(m/\eta) m \epsilon_l^{-1} \delta_{rel}^{-2}$$

samples may suffice to guarantee that $\|\tilde{q}-q\|_1/\epsilon_l \le \delta_{rel}$, with probability $>1-\eta$.

The support m may be the number of non-negligible terms in the logical error channel being characterized. m, in simple implementations, may be as large as $4^N$ for a logical layer acting on N logical qubits. Hereinbelow it is shown that m=O(N) may suffice for a local EC scheme and a local physical error model.

Lemma 2 (linear support of the logical error channel in local EC schemes): Assuming EC is done independently in t-FT blocks with a small and fixed number ≤k logical qubits (irrespective of the number of physical qubits in each block), and that no individual physical error couples physical qubits in different blocks (no inter-block cross-talk errors), each weight-(t+1) fault path may lead to a logical error in at most one block in one layer. It follows that at leading order $\sim\epsilon^{t+1}$, the total number m of non-zero logical error probabilities is at most $(N/k)4^k=O(N)$.

Figure 7A:
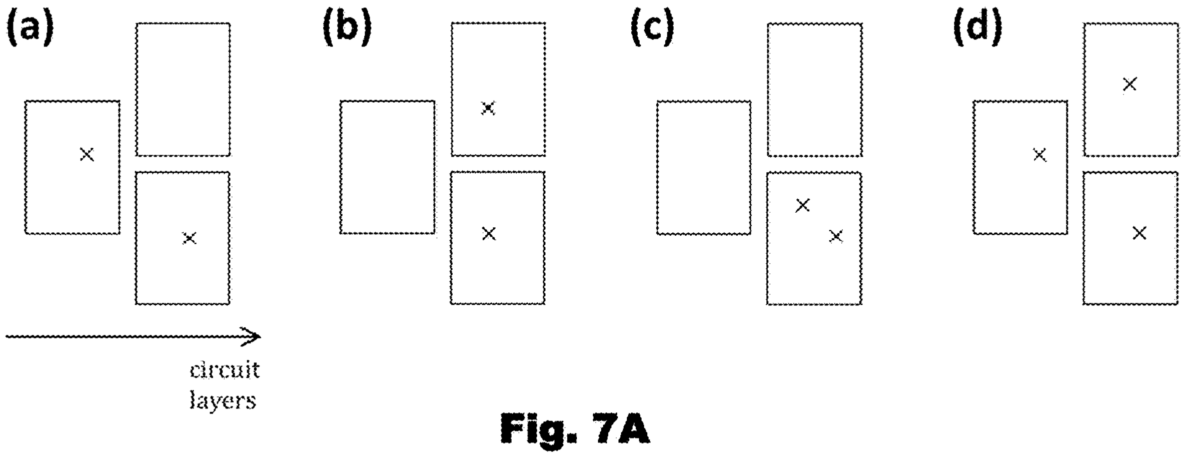
FIG. 7A-7C schematically illustrate error propagation.

Proof: A logical error in two blocks in the same layer requires that each of these blocks contain a fault with weight ≥1, otherwise one of the blocks is ideal, and will correct its input error. However, a weight-1 fault in each block is insufficient for a logical error, and a leading order logical error requires that the fault is part of a weight t+1 fault path extending up to t layers back. The total weight of faults needed for logical errors in distinct blocks is therefore ≥(t+1)+1=t+2. FIG. 7A schematically illustrates examples with t=1, i.e., fault paths and logical errors in 1-FT local EC schemes (c.f. Lemma 2). Each rectangle represents an error corrected logical operation, and x-marks mark physical errors participating in a fault path. In examples (a) and (c), a logical error may be generated only in the bottom block. In example (b), no logical error can be generated. Example (d) shows the lowest weight (w=t+2=3) assignment of physical errors to blocks that can lead to a logical error in two distinct blocks.

In local EC schemes, each simulation step in P2LC, mapping an input error to an output error, may involve the separate simulation of each faulty block. A similar statement may hold when EC may be done in a single block, encoding all N logical qubits with a quantum low-density parity-check (LDPC) code. In this case, each stabilizer measurement may involve only a small number of physical qubits, and each physical qubit may participate in a small number of stabilizer measurements. Generating a logical error at leading order $\sim\epsilon^{t+1}$ may require that all t+1 physical errors may be close enough in space (or more accurately, on the graph corresponding to the LDPC code).

The factor $$\epsilon_l^{-1}$$

in the number of samples $$n = \tilde{O}\left(m\delta_{rel}^{-2}\epsilon_l^{-1}\right)$$

may represent a small fraction of sampled fault-paths that may contribute non-trivially to the logical error channel. The important fault-paths (e.g., fault-paths that may contribute the most to the infidelity) may easily be identified, based on the requirement of a total weight ≥t+1, as well as additional requirements described below ('causal connectivity'). By simulating only the important fault-paths, or more advantageously, sampling only important fault-paths, the classical run-time of P2LC characterization may be improved dramatically. Potentially, the factor $$\epsilon_l^{-1}$$

my be eliminated. For example, $\tilde{q}=0$ is assumed for all fault-paths in the complement $F^c$ of a set of fault paths F. Thus, $q=\mathbb{E}[\tilde{q}]=\mathbb{E}[\mathbb{P}(F)\tilde{q}|F]$. $\tilde{q}$ may be sampled from the original distribution, or alternatively, $\mathbb{P}(F)\tilde{q}$ may be sampled from the distribution conditioned on F. The variances in the two cases are given by:

$$\mathbb{V}[\tilde{q}_\sigma] = \mathbb{E}\left[\tilde{q}_\sigma^2\right] - \mathbb{E}[\tilde{q}_\sigma]^2 = \mathbb{P}(F)\left(\mathbb{E}\left[\tilde{q}_\sigma^2 \mid F\right] - \mathbb{P}(F)\mathbb{E}[\tilde{q}_\sigma \mid F]^2\right)$$

$$\mathbb{V}[\mathbb{P}(F)\tilde{q}_\sigma \mid F] = \mathbb{P}(F)^2\left(\mathbb{E}\left[\tilde{q}_\sigma^2 \mid F\right] - \mathbb{E}[\tilde{q}_\sigma \mid F]^2\right)$$

thus:

$$\sum\nolimits_{\sigma\neq I}\mathbb{V}[\mathbb{P}(F)\tilde{q}_\sigma \mid F] \leq \mathbb{P}(F)\sum\nolimits_{\sigma\neq I}\mathbb{V}[\tilde{q}_\sigma] \leq \mathbb{P}(F)\epsilon_l$$

With a good understanding of the types of fault-paths that lead to logical errors, a scaling $\mathbb{P}(F)=O(\epsilon_l)$ may be achieved, so $$\sum\nolimits_{\sigma\neq I}\mathbb{V}[\mathbb{P}(F)\tilde{q}_\sigma \mid F] = O\left(\epsilon_l^2\right).$$

Thus, the number of required samples and classical simulations may be reduced i just $$n = \tilde{O}\left(m\delta_{rel}^{-2}\right).$$

The following theorems and definitions provide summarized examples.

Theorem 3 (P2LC classical sample complexity, importance sampling): Let F be a subset of the set of fault-paths with weight ≥t+1, which incudes all fault-paths that lead to a logical error, and assume $\epsilon_l=\Theta(\epsilon^{t+1})$. Then, P2LC with an importance sampling of fault paths, done by conditioning on F and multiplying by $\mathbb{P}(F)$, requires a number of samples $$n = \tilde{O}\left(cm\delta_{rel}^{-2}\right)$$

to achieve relative 1-norm error $\leq\delta_{rel}$, where $$c = \mathbb{P}(F)\epsilon_l^{-1} = O(1)$$

as a function of $\epsilon$. In a local EC scheme on N logical qubits, m=O(N).

Figure 7B:
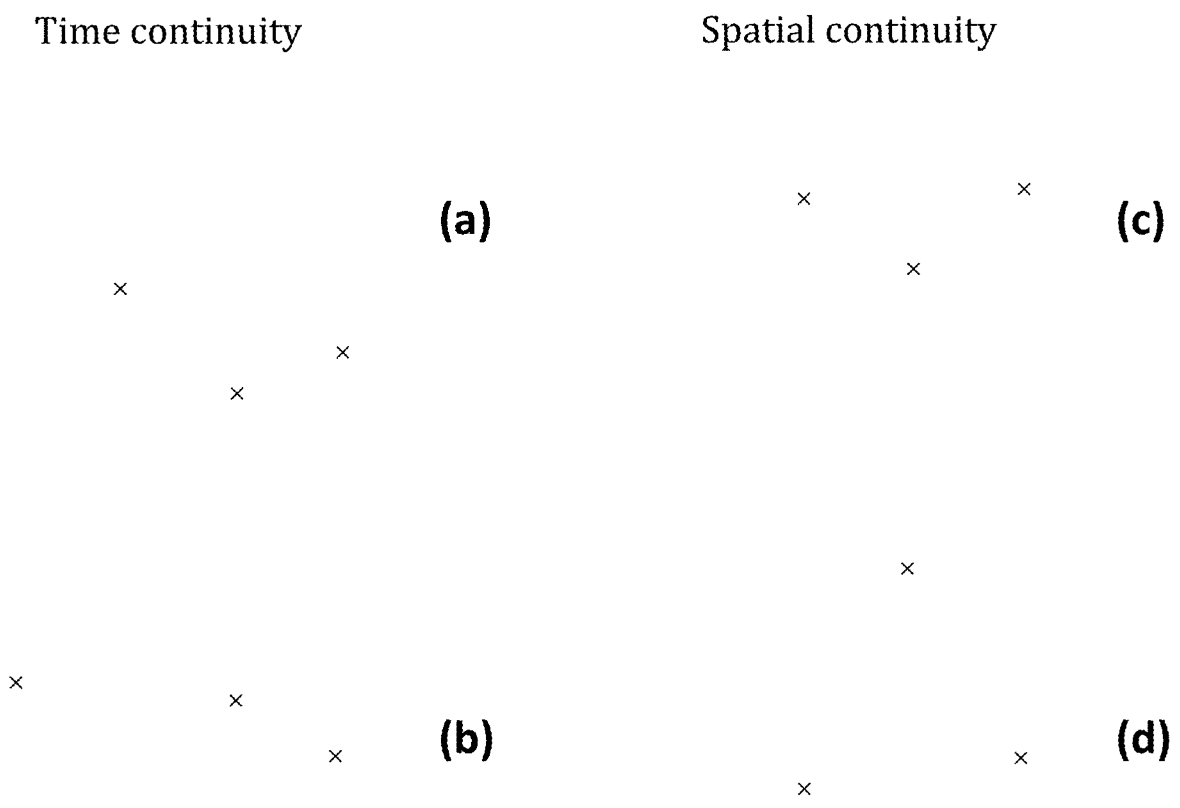

The coefficient c can be reduced towards 1 by including as many constraints as possible that fault-paths may satisfy in the definition of the sampled set F. A few exemplary constraints are described hereinbelow, and are depicted in FIG. 7B. Many additional constraints may be incorporated.

Time-continuity constraint: A logical error $\sim\epsilon^{t+1}$ after a layer $G_j$ may require a fault path with weight t+1 that may end at $G_j$, and which may be time-continuous. A time continuous fault-path may be defined as follows: if it includes a fault in a layer $G_i$ (i<j), it also includes a fault in each subsequent layer i≤j. Time continuity may be significant, as otherwise, if a layer k between i and j may be fault-free, it may correct the output error from layer k−1 (which is correctable since it has weight w<t). The remaining part of the fault path has weight t−w<t, so it may not generate a logical error.

Spatial-continuity constraint: For local EC schemes, as defined hereinabove, the faults in two consecutive layers in a time-continuous fault path with weight t+1 may require to occur in blocks whose supports overlap. Spatial continuity may be significant, as otherwise, the output of the earlier layer may be corrected by fault-free blocks in the later layer.

Causal-connectivity constraint: The time-continuity and spatial-continuity constraints described hereinabove may be combined In other words, a constraint may require both time-continuity and spatial-continuity. This constraint may be referred to as causal-connectivity constraint. The causal-connectivity constraint may require that a weight t+1 fault path that leads to a logical error in a given block, may end at that block, and may be continuous (no fault-free blocks along the path), and may be contained in the backwards causal-cone of the block.

In FIG. 7B, example (a) depicts errors that comply to the time-continuity constraint, whereas example (b) depicts errors that do not comply to the time-continuity constraint. Example (c) depicts errors that comply to the spatial-continuity constraint, whereas example (d) depicts errors that do not comply to the spatial-continuity constraint.

Importance sampling (indicated hereinabove) may be achieved, for example, via a 'fault-path tree'. A fault-path tree may be defined as a binary tree T where each branch may correspond to a fault-path in $G_{i_0} \ldots G_j$. Each level $\ell=1, \ldots, \mathcal{L}$ may correspond to a particular physical error channel, that may be assumed to be a single-Pauli error channel, e.g., $(1-\epsilon_X)/+\epsilon_X X$ after a particular physical gate. The different physical errors may be ordered according to their corresponding positions in time. The ordering of simultaneous faults may be chosen arbitrarily. Generalizing to multi-Pauli physical error channels is straight forward: the tree may be a non-binary tree (i.e., a tree where a node may have more than two child nodes). Every multi-Pauli channel (with infidelity <½) can be written as a product of single-Pauli channels, and this is a common parameterization for physical Pauli error channels. The two children of each node at level $\ell$ in T may correspond to whether or not the physical error corresponding to $\ell$ occurred. Each edge between levels $\ell-1$ and $\ell$ may carry a weight $\epsilon_{\ell-1}$ or $1-\epsilon_{\ell-1}$, according to whether it corresponds to occurring, or whether it corresponds to the physical error in the ($\ell-1$)th level not occurring.

Figure 7C:
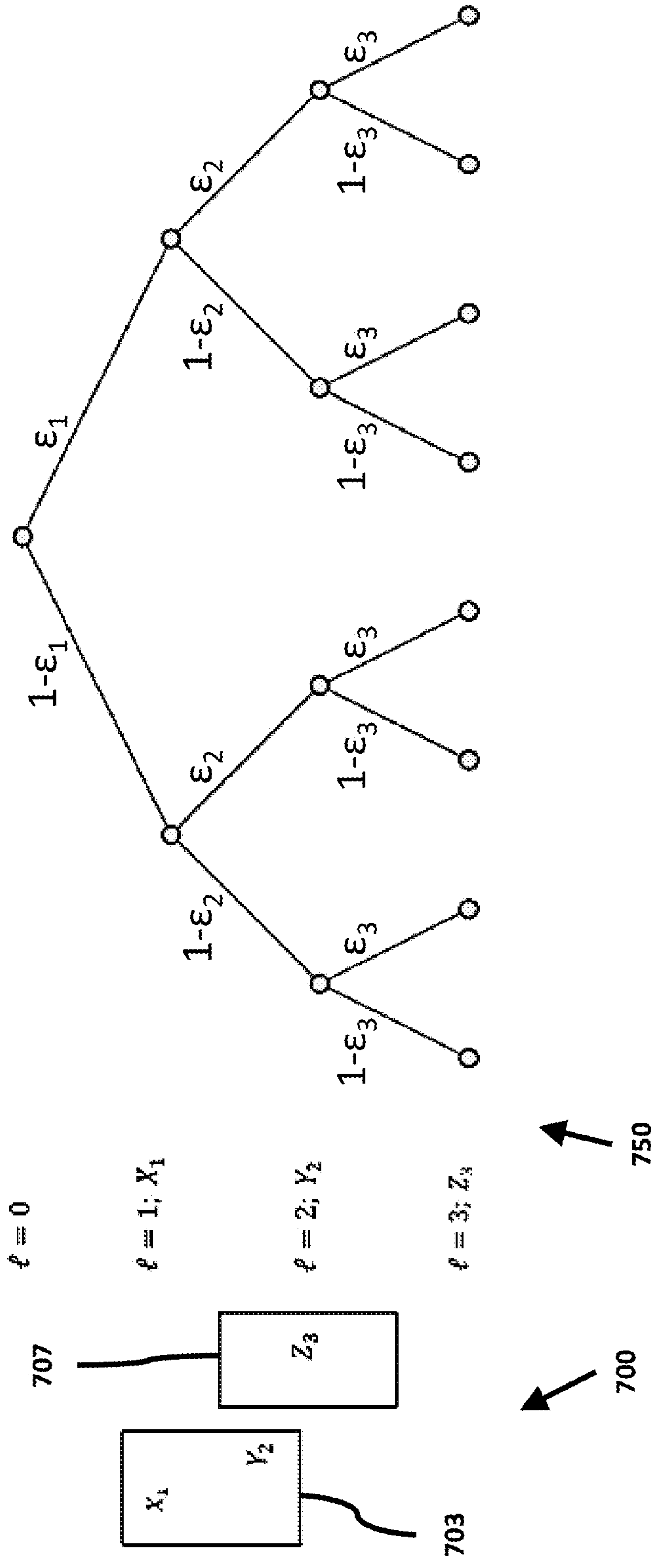

An exemplary fault-path tree 750 is depicted in FIG. 7C. An error-corrected circuit 700 may include two error-corrected logical operations. A first error-corrected logical operation 703 may be affected by two error-channels ($X_1$, $Y_2$). A second error-corrected logical operation 707 may be affected by a single error-channel ($Z_3$). The error-channels $X_1$, $Y_2$, $Z_3$ may result in errors with probabilities $\varepsilon_1$, $\varepsilon_2$, $\varepsilon_3$ respectively. The (errors in the) error-corrected circuit 700 may be associated with the fault-path tree 750.

The procedure described hereinbelow may correspond to sampling branches from the tree T by sampling levels. The level $\ell_1$ (of the first fault) may be sampled. Then, the level $\ell_2$ (of the second fault) may be sample. Next levels may be sampled, until the level $\ell_{t+1}$ (of the (t+1)th fault) may be sampled. This may ensure that only fault-paths with weight ≥t+1 may be sampled. Sampling naively from all levels $\ell > \ell_{t+1}$ may be performed, to obtain an un-biased estimator of the logical error channel. Alternatively, the final step of naive sampling may be omitted. Omitting the step of naive sampling may result $O(\epsilon^{t+2})$ biases. These biases may be insignificant, as biases of the same order may be present if $\Delta_l$ is used instead of $\Lambda_e$. Constraints such as causal-connectivity, which can be expressed in terms of the levels $\ell_1, \ldots, \ell_{t+1}$, may easily be incorporated. A pseudocode of an exemplary importance sampling is provided in Algorithm 3.

P2LC Errors Due to Physical Characterization Errors

Hereinabove, bounds for statistical error s (due to the sampling of fault paths in P2LC) were provided. Hereinbelow, bounds for the systematic errors in P2LC (due to an inaccurate characterization of physical errors) may be provided.

A possible concern that might arise is that the small logical errors estimated by P2LC may require an un-reasonably high accuracy in physical characterization. Hereinbelow it is show that this concern does not arise. The basic intuition may be that $$\epsilon_l \sim \frac{1}{(t+1)!}(V_{EC}\epsilon)^{t+1},$$

so $\delta\epsilon_l/\epsilon_l \sim (t+1)\delta\epsilon/\epsilon$. The argument may hold even if only a fraction 1/c of weight t+1 fault-paths may lead to logical errors, $$\epsilon_l \sim \frac{1/c}{(t+1)!}(V_{EC}\epsilon)^{t+1}.$$

Theorem 4 (required physical characterization accuracy for P2LC): Let $\epsilon$ be the average infidelity of physical operations in an error corrected logical layer. Physical operations are assumed to be characterized to an average 1-norm inaccuracy $\delta\epsilon$. Then an average relative 1-norm inaccuracy $\delta\epsilon/\epsilon \le \delta_{rel}/[C(t+1)]$ in physical characterization may suffice to ensure a relative 1-norm (systematic) inaccuracy $\delta_{rel}$ in the output of P2LC. Here $$C = c\frac{(1+\delta\epsilon/\epsilon)^{t+1}-1}{(t+1)(\delta\epsilon/\epsilon)} \ge 1$$

may typically be close to 1, with c=O(1) if $\epsilon_l = \Theta(\epsilon^{t+1})$ and e.g., $$\frac{(1+\delta\epsilon/\epsilon)^{t+1}-1}{(t+1)(\delta\epsilon/\epsilon)} \le 2$$

for say, $\delta\epsilon/\epsilon \le 0.1$ and t≤10.

Algorithm 3 of fault-paths in P2LC):

1. $\ell_0 = 0$.
2. For a = 1, . . . , t + 1:
   2.1. Sample $\ell_a \in \{\ell_{a-1}+1, \ldots, \mathcal{L}\}$ with probability $\mathbb{P}(\ell_a \mid \ell_{a-1}) = \dfrac{\varepsilon_{\ell_a}\prod_{\ell=\ell_{a-1}+1}^{\ell_a-1}(1-\varepsilon_\ell)}{1-\prod_{\ell=\ell_{a-1}+1}^{\mathcal{L}}(1-\varepsilon_\ell)}$
   2.2. End For.
3. Output: $(\ell_1, \ldots, \ell_{t+1})$. #Weight t + 1 fault path When using Algorithm 3, the output $\tilde{q}$ of P2LC may be multiplied by the probability for fault-paths with weight ≥t+1:

$$\mathbb{P}(F) = 1 - \sum_{w=1,\ldots t+1}\sum_{\ell_1,\ldots,\ell_w}\epsilon_{\ell_1}\ldots\epsilon_{\ell_w}\prod_{\ell\ne\ell_1,\ldots,\ell_w}(1-\epsilon_\ell)$$

Proof: Up to $O(\epsilon^{t+2})$ corrections:

$$q_i = \frac{1}{(t+1)!}\sum_{j_1,\ldots,j_{t+1}} c_i^{j_1,\ldots,j_{t+1}}\epsilon_{j_1}\ldots\epsilon_{j_{t+1}}$$

where i may run over possible logical errors. $j_1, \ldots, j_{t+1}$ may label weight-(t+1) fault-paths. $\epsilon_j$ may denote the physical fault rates.

$$c_i^{j_1, \cdots, j_{t+1}} \in \{0,1\}.$$

$$\sum_i c_i^{j_1, \cdots, j_{t+1}} \leq 1$$

may indicate that each weight-(t+1) fault-path may contribute to at most one logical error rate (e.g., physical Paulis may map to logical Paulis).

$$\sum_i c_i^{j_1, \cdots, j_{t+1}} = 0$$

if $J_i = J_k$ for some i≠k, and may indicate that each fault can contribute once. The logical infidelity may be:

$$\epsilon_l = \sum_i q_i \leq \frac{1}{(t+1)!} \sum_{j_1, \cdots, j_{t+1}} \epsilon_{j_1} \cdots \epsilon_{j_{t+1}} = \frac{1}{(t+1)!}\left(\sum_j \epsilon_j\right)^{t+1} = \frac{1}{(t+1)!}(V_{EC}\epsilon)^{t+1}$$

where $$\epsilon = V_{EC}^{-1} \sum_j \epsilon_j$$

may be the average infidelity over the $V_{EC}$ physical operations in each logical layer.

Now, an inaccurate physical characterization $\tilde{\epsilon} = (\tilde{\epsilon}_j)_j$ may be assumed, so that $$V_{EC}^{-1} \|\epsilon - \tilde{\epsilon}\|_1 \leq \delta\epsilon.$$

The characterized infidelity may be bounded as $$V_{EC}^{-1} \sum_j \tilde{\epsilon}_j \leq \tilde{\epsilon},$$

where $\tilde{\epsilon} = \epsilon + \delta\epsilon$. For the (infinite-trajectory limit of) the output of P2LC:

$$\tilde{q}_i = \frac{1}{(t+1)!} \sum_{j_1, \cdots, j_{t+1}} c_i^{j_1, \cdots, j_{t+1}} \tilde{\epsilon}_{j_1} \cdots \tilde{\epsilon}_{j_{t+1}}$$

and $$\begin{aligned} \|q - \tilde{q}\|_1 &= \sum_i |q_i - \tilde{q}_i| \\ &= \sum_i \left| \frac{1}{(t+1)!} \sum_{j_1, \cdots, j_{t+1}} c_i^{j_1, \cdots, j_{t+1}} \left(\epsilon_{j_1} \cdots \epsilon_{j_{t+1}} - \tilde{\epsilon}_{j_1} \cdots \tilde{\epsilon}_{j_{t+1}}\right) \right| \\ &\leq \frac{1}{(t+1)!} \sum_{j_1, \cdots, j_{t+1}} \sum_i c_i^{j_1, \cdots, j_{t+1}} \left| \epsilon_{j_1} \cdots \epsilon_{j_{t+1}} - \tilde{\epsilon}_{j_1} \cdots \tilde{\epsilon}_{j_{t+1}} \right| \\ &\leq \frac{1}{(t+1)!} \sum_{j_1, \cdots, j_{t+1}} \left| \epsilon_{j_1} \cdots \epsilon_{j_{t+1}} - \tilde{\epsilon}_{j_1} \cdots \tilde{\epsilon}_{j_{t+1}} \right| \end{aligned}.$$

Now, $$\begin{aligned} &\left|\epsilon_{j_1} \cdots \epsilon_{j_{t+1}} - \tilde{\epsilon}_{j_1} \cdots \tilde{\epsilon}_{j_{t+1}}\right| \leq \\ &\quad \left|\epsilon_{j_1} - \tilde{\epsilon}_{j_1}\right| \epsilon_{j_2} \cdots \epsilon_{j_{t+1}} + \tilde{\epsilon}_{j_1} \left|\epsilon_{j_2} \cdots \epsilon_{j_{t+1}} - \tilde{\epsilon}_{j_2} \cdots \tilde{\epsilon}_{j_{t+1}}\right| \leq \cdots \leq \\ &\quad \sum_{k=1}^{t+1} \epsilon_{j_1} \cdots \epsilon_{j_{k-1}} \left|\epsilon_{j_k} - \tilde{\epsilon}_{j_k}\right| \tilde{\epsilon}_{j_{k+1}} \cdots \tilde{\epsilon}_{j_{t+1}}, \end{aligned}$$

Thus:

$$\begin{aligned} \|q - \tilde{q}\|_1 &\leq \frac{1}{(t+1)!} \sum_{j_1, \cdots, j_{t+1}} \left|\epsilon_{j_1} \cdots \epsilon_{j_{t+1}} - \tilde{\epsilon}_{j_1} \cdots \tilde{\epsilon}_{j_{t+1}}\right| \\ &\leq \frac{1}{(t+1)!} \sum_{k=1}^{t+1} \sum_{j_1, \cdots, j_{t+1}} \epsilon_{j_1} \cdots \epsilon_{j_{k-1}} \left|\epsilon_{j_k} - \tilde{\epsilon}_{j_k}\right| \tilde{\epsilon}_{j_{k+1}} \cdots \tilde{\epsilon}_{j_{t+1}} \\ &= \frac{1}{(t+1)!} \|\epsilon - \tilde{\epsilon}\|_1 \sum_{k=1}^{t+1} (\Sigma\epsilon_j)^{k-1} (\Sigma\tilde{\epsilon}_j)^{t-(k-1)} \\ &\leq \frac{1}{(t+1)!} V_{EC}\delta\epsilon \sum_{k=1}^{t+1} (V_{EC}\epsilon)^{k-1} (V_{EC}\tilde{\epsilon})^{t-(k-1)} \\ &= \frac{1}{(t+1)!} (V_{EC}\epsilon)^{t+1} (\delta\epsilon/\epsilon) \sum_{k=0}^{t} (\tilde{\epsilon}/\epsilon)^k \\ &= \epsilon'_l (\delta\epsilon/\epsilon) \sum_{k=0}^{t} (1 + \delta\epsilon/\epsilon)^k \\ &= \epsilon'_l \left[(1 + \delta\epsilon/\epsilon)^{t+1} - 1\right] \\ &= \epsilon_l C(t+1)\delta\epsilon/\epsilon \end{aligned}.$$

QPU Time Requirements of P2LC

The QPU time required for the physical characterization step in P2LC may be compared with the QPU time required for ExtLC. Characterizing the logical error channel averaged over accepted syndromes, $$\Lambda_l = p_{acc}^{-1} \sum_{k \in K_{acc}} p_k \Lambda_{l|k},$$

may be compared (as indicated hereinabove, the logical error channel averaged over accepted syndromes is where ExtLC can be applied, and thus, compared to P2LC).

It will first be assume that all syndromes may be accepted, and then the case where certain syndromes may be rejected will be considered. A given characterization protocol, that may be applied to either physical or logical operations (or layers), may be assumed. The QPU time required by this protocol to characterize an operation with infidelity $\epsilon$ to relative 1-norm accuracy $\delta_{rel}$ may be assumed to be $$T \propto \delta_{rel}^{-2} \epsilon^{-1}.$$

Justification for this assumption can be found hereinabove in Lemma 1. This behavior of T occurs in commonly used 'amplified characterization' involving quantum circuits with depth $d \sim \epsilon^{-1}$, and $$n \sim \delta_{rel}^{-2}$$

shots, under the assumption that the QPU time is proportional to the total number of gate applications, $T \propto nd$.

The proportionality constant may include a time scale (e.g., the gate time), and may include an extensive constant (analogous to m in Lemma 1). The extensive constant may be related, for example, to the number of characterized parameters, the number of required characterizations circuits, and a Jacobian involved in mapping from circuit outcomes to model parameters. Both physical and logical layers may be assumed to be characterized as tensor products of few-qubit (physical or logical) operations. Thus, the extensive constant may not be significant.

Some embodiments of P2LC may require a slightly better accuracy $\delta_{rel,P2LC} \propto \delta_{rel}/(t+1)$. Using the relation between the physical and logical infidelities via the EC threshold, $\epsilon_l \propto (\epsilon/\epsilon_{th})^t \epsilon$, the ratio between the QPU times of ExtLC and P2LC may be:

$$\frac{T_{P2LC}}{T_{ExtLC}} \propto (t+1)^2 \frac{\epsilon_l}{\epsilon} \propto (t+1)^2 \left(\frac{\epsilon}{\epsilon_{th}}\right)^t.$$

For $\epsilon$ significantly below threshold, $T_{P2LC} \ll T_{ExtLC}$ may be accepted. The proportionality constant in the above equation may depend on many details, like the number of physical operations per logical operation, and the time for a single logical operation relative to a physical operation. However, these factors are polynomial in t, while the factor $(\epsilon/\epsilon_{th})^t$ is exponential, and dominates below threshold.

As mentioned hereinabove, the only case in which ExtLC may be able to provide (some of) the required characterization for SA-LEM may be when there are only two syndrome subsets, one of which is rejected. In this case, ExtLC may be used to characterize the accepted error channel $\Lambda_{L|acc}$ by implementing rejection in logical characterization circuits (run on the QPU as part of ExtLC). This may lead to a shot sampling overhead in the characterization step, due to the non-zero rejection probability $p_{rej}=1-p_{acc}$. Further, there may be a significantly smaller logical error $\epsilon_{L|acc}<\epsilon_L$, that may be harder to characterize. Quantitatively, the QPU time $$T_{ExtLC} \propto \delta_{rel}^{-2} \epsilon_l^{-1}$$

required for ExtLC may be modified to $$T_{ExtLC} \propto \delta_{rel}^{-2} p_{acc}^{-V_{char}} \epsilon_{L|acc}^{-1}$$

in the presence of syndrome rejection. Here, $V_{char}$ may be the (causal) volume of characterization circuits, which in 'amplified characterization' may be well approximated by the depth $$d \sim \epsilon_{l|acc}^{-1}.$$

Thus, in the presence of syndrome rejection, the advantage of P2LC over ExtLC increases significantly:

$$\frac{T_{P2LC}}{T_{ExtLC}} \propto (t+1)^2 p_{acc}^{V_{char}} \frac{\epsilon_{l|acc}}{\epsilon}.$$

The P2LC method may be applicable outside the context of the SA-LEM component (described hereinbelow). Generally, the P2LC method may be applicable outside the context of LEM. As an example, the P2LC method may be applicable for the design and improvement of decoding algorithms for EC. P2LC may have three main advantages over ExtLC:

1. P2LC can characterize logical errors conditioned on measured syndromes.
2. P2LC may require a QPU time that may scale inversely with the physical error rate $\epsilon^{-1}$. This is opposed to the much worse scaling $$\sim \epsilon_L^{-1}$$

(i.e., scaling with the logical error rate), known in the art. Additionally, the QPU time for P2LC may be free of any sampling overhead due to syndrome rejection.

3. P2LC may characterize error-corrected logical operations in their appropriate context in a given quantum circuit, thus P2LC may account for the 'logical context dependence'.

Description of the SA-LEM Component

For a given error-corrected logical quantum circuit C, i.e., a quantum circuit compiled to be executed on a QPU with a given EC scheme (where an EC scheme includes quantum EC code and a set of error-corrected logical operations, including syndrome measurement, decoding and recovery), mitigating logical errors may be desired, i.e., mitigating errors that cannot be corrected by the given EC scheme. The mitigation of the logical errors may be at the expense of an overhead in shot number, which corresponds to an overhead in QPU time. A basic idea of the SA-LEM, is to exploit the wealth of syndrome-data generated during the execution of error-corrected circuits, in order to significantly reduce the QPU time overhead required to meet a given output accuracy, including both statistical and systematic errors, thus improving over the currently available solutions of ExtLEM and PS.

Though syndromes are by construction highly informative regarding correctable errors, they are also by construction blind to the logical errors left behind after correction, and which need to be mitigated. That is, a given syndrome does not indicate with high probability which logical error occurred (assuming reasonable decoding). Applicant found that nevertheless, syndrome data turns out to be highly informative for the distribution of possible logical errors, and it is this information which is exploited in SA-LEM.

As an example of SA-LEM, a single occurrence of a single error-corrected logical operation G, included in the given error-corrected circuit C, may be considered. The set of syndromes of this logical operation may be denoted by S={s}, where each syndrome s may be a possible outcome vector including the outcomes of all mid-circuit measurements included in G. The syndromes may be partitioned into K>1 non-overlapping subsets $$\{S_k\}_{k=1}^{K},$$

such that $$\bigcup_{k=1}^{K} S_k = S.$$

The case K=1 may correspond to the known ExtLEM, and therefore may be excluded. For each subset $S_k$, a corresponding error mitigation (EM) protocol $EM_k$ may be assigned. Each EM protocol may include modification of the given circuit, and may include post-processing of the measurement outcome of the resulting modified circuit. For at least one circuit execution ('shot'), a 'single-shot mitigated circuit outcome' o may be obtained. The given circuit C may be executed N times on the QPU. For at least one shot (in some embodiments, for each shot), the EM protocol $EM_k$ may be applied if a syndrome $s \in S_k$ is measured. The resulting N single-shot mitigated circuit outcomes, $o_1, \ldots, o_N$, and the N measured syndrome subset indices, $k_1, \ldots, k_N$, may then be combined into an N-shot mitigated circuit outcome $\bar{o}$. A corresponding statistical error bar may be computed. The combination may involve a weighted average $\bar{o}=w_{k_1} o_1 + \ldots + w_{k_N} o_N$. In some embodiments where each $o_i = o|k_i$ may be an estimator for the ideal (logical-error-free) outcome of the given circuit C, the minimal statistical error bar may be obtained by using inverse-variance weights, $$w_k \propto \mathbb{V}_{o|k}^{-1},$$

for some subsets $S_k$, where $\mathbb{V}_{o|k}$ may be an estimate for the variance of the single-shot mitigated outcome o conditioned on k.

Some, and ideally each, of the EM protocols $EM_k$ may be designed to mitigate an error channel $\Lambda_{L|k}$ conditioned on $S_k$. This is in contrast to ExtLEM, where an average error channel $\Lambda_L = \Sigma_k p_k \Lambda_{L|k}$ is mitigated. Here, $p_k = \mathbb{P}(S_k)$ may be the probability to measure a syndrome in $S_k$. The channel $\Lambda_{L|k}$ may correspond to logical errors (hence the subscript L) in the circuit C. However, $\Lambda_{L|k}$ need not, strictly speaking, be a logical error channel defined over logical qubits. Examples where this is not the case are given hereinbelow. Moreover, even though $\Lambda_{L|k}$ may be conditioned on the syndrome measured in G, it may not correspond to logical errors associated with the operation G itself, and it may represent logical errors which are associated with different operations in C. In particular, $\Lambda_{L|k}$ may represent errors in the entire circuit C, for example, in the form of multiple channels associated with multiple circuit locations, or with a single global error channel. In some embodiments, the error channel $\Lambda_{L|k}$ may be a conditioned distribution of possible errors, $\Lambda_{L|k} = \Sigma \sigma_L \mathbb{P}(\sigma_L|S_k)\sigma_L$, where $\sigma_L$ may be logical errors, e.g., Pauli errors. The channels $\Lambda_{L|k}$ may be very different from one another, with highly non-uniform conditioned error probability (or infidelity) $\epsilon_{L|k} = \mathbb{P}(L|S_k) = \Sigma \sigma_L \mathbb{P}(\sigma_L|S_k)$, as a function of k. The conditioned infidelities may differ significantly from their mean, $\epsilon_L = \mathbb{P}(L) = \Sigma_k p_k \epsilon_{L|k}$, which may corresponds to the usual logical infidelity.

Differences in $\epsilon_{L|k}$ can be traced back to the decoding algorithm that may be implemented as part of the given EC scheme. Decoding would ideally be performed with a maximum-likelihood algorithm. The maximum-likelihood algorithm may map each syndrome to a recovery operation that inverts the most probable output error, given that syndrome and the error models of physical gates. Realistic decoders may resort to approximating the ideal decoder. Approximating the ideal decoder may be due to limitations stemming from a limited knowledge of the error models of physical gates, and/or may be due to the classical computational complexity of the decoding problem for large code blocks, where lookup tables may be infeasible. Subsets $S_k$ with small $\epsilon_{L|k}$ may include syndromes that may, with high probability, indicate a unique required recovery operation. Subsets with a high $\epsilon_{L|k}$ may include syndromes for which multiple recovery operations may have a high probability.

An example may be given for how the conditioned infidelities $\epsilon_{L|k}$ may be used to design the EM protocols $EM_k$. A subset of syndromes $S_k$ in which $\epsilon_{L|k}$ may be negligible (e.g., $\epsilon_{L|k} \ll \epsilon_L$) may be considered. In this case, avoiding the complexities of mitigating $\Lambda_{L|k}$, and assign $EM_k$=do_nothing, may be desired. In an opposite case, a subset of syndromes with $\epsilon_{L|k} \approx 1$ may be considered. That is, with very high probability, a logical error may have occurred if a syndrome $s \in S_k$ is measured. In this case, a simple rejection of $S_k$ may be implemented. The rejection may be an efficient error mitigation strategy for these syndromes. Rejection of a subset $S_{rej} \in \{S_k\}$ may be implemented by assigning a weight $w_{rej}=0$ to shots for which a rejected syndrome $s \in S_{rej}$ was measured. A rejection protocol $EM_{rej}$=reject, which aborts circuit execution once a rejected syndrome may be measured, may be used. The latter may be useful in reducing the shot-time in rejected shots, and thus the total QPU time overhead for mitigation, and may not affect the total shot overhead. The special case in which K=2, with one rejected subset $S_{rej}$, and a complementary subset of 'accepted' syndromes, $S_{acc}$, to which a do_nothing protocol may be applied, may correspond to standard post-selection (PS), and may be outside the scope of this application. As described in the Background section, a significant drawback of PS is that it leaves un-mitigated the accepted error, $\epsilon_{L|acc}$. A simple embodiment of SA-LEM may be given by specifying K=2 syndrome subsets, with one rejected subset $S_{rej}$, and a complementary subset of 'accepted' syndromes, $S_{acc}$, for which a non-trivial mitigation protocol $EM_{acc}$ is applied.

Any EM protocol designed to mitigate errors in physical operations may in principle be adapted and used for error-corrected logical operations within SA-LEM. EM protocols may include mitigation based on QP decompositions. The QP decompositions may be configured to invert errors directly (as in PEC). The QP decompositions may be configured to add errors and subsequently perform zero-noise extrapolation (as in ZNE). An additional example may include the application of a classical description of the inverse of the global noise channel in post-processing (as in TEM). In some embodiments, SA-LEM may involve the adaptation of more than one physical EM protocol, such that the choice of protocol adapted may be syndrome-dependent. For example, in some embodiments, PEC may be applied when measuring a syndrome $s \in S_{k_1}$, and ZNE may be applied when measuring syndromes in $S_{k_2}$.

The above-mentioned examples of EM protocols may be characterization-based, that may require a detailed error model to be provided as input. Such characterization-based protocols may be viewed as functions EM: $\Lambda \mapsto EM(\Lambda)$, that may map a given error channel $\Lambda$ to a resulting EM protocol $EM(\Lambda)$ that is configured to mitigate the error channel $\Lambda$. In some embodiments, some of the protocols $EM_k$ in may be given by $EM_k = EM(\Lambda_{L|k})$, with a fixed characterization-based EM protocol EM. As an example, in QP EM, a QP distribution that may approximate an inverse channel $$QP_k \approx \Lambda_{L|k}^{-1},$$

or more generally, a power $$QP_k \approx \Lambda_{L|k}^{\alpha},$$

may be constructed and implemented (i.e., sampled from a distribution). In some embodiments, the implementation of the QP distribution may be performed during circuit execution (i.e., concurrent to the execution of the circuit C). In this case, the variance estimates used for the inverse-variance weighting of shots may be obtained by squaring the quasi-probability norms $W_k$ of $QP_k$, i.e., $$\mathbb{V}_{o|k} = W_k^2.$$

The description of SA-LEM given so far referred, for simplicity, to syndrome subsets $S_k$ that may be associated with a single occurrence of a single logical operation G in the given circuit C, and may be associated with a single conditioned error channel $\Lambda_{L|k}$. However, the method may be applied to any number of occurrences of any number of error-corrected logical operation operations $\{G_\alpha\}_{\alpha\in A}$ in the given error-corrected quantum circuit. The set $\{G_\alpha\}_{\alpha\in A}$ may or may not cover all occurrences of all operations in the given circuit. For some of the $G_\alpha$ (preferably, each of the $G_\alpha$), a partition of the corresponding set of syndromes into $K^\alpha$ non-overlapping subsets $$\{S_k^\alpha\}_{k=1}^{K^\alpha},$$

may be specified. The measured syndrome-subset indices $k^\alpha$ from all operations (i.e., all operations that SA-LEM may be applied to) may be collected into a syndrome data vector $k=(k^\alpha)_{\alpha\in A}$. A k-dependent EM protocol $EM_k$ may then be specified. The EM protocol $EM_k$ may mitigate, in each shot, some or all of the logical errors in the given circuit, by using (i.e., according to) the syndrome data k collected from all operations. In particular, all syndrome data $k_\alpha$ collected prior to the execution of $G_\alpha$, may be used as input for the mitigation of logical errors associated with an operation $G_\alpha$. This feature may be beneficial, since, as described hereinbelow, logical errors may have an inherent memory, that may depend not only on the logical operation at which they occur, but may also depend on previous operations. The given circuit C may be executed N times (or shots), while applying the protocol $EM_k$ if the syndrome data vector k is measured. The resulting single-shot mitigated circuit outcomes, $o_1, \ldots, o_N$, and measured syndrome data vectors, $k_1, \ldots, k_N$, may be processed into an N-shot mitigated circuit outcome o, and a corresponding statistical error bar may be computed.

An optimization of the shot or QPU time overhead over the rejected and accepted subsets, as well as the weights $w_i$, may be performed. For example, if the mapping of an accepted subset $S_k\neq S_{rej}$ to a corresponding protocol $EM_k$ is fixed, e.g., $EM_k=EM(\Lambda_{L|k})=EM(\Lambda_{L|S_k})$ may be specified, and a bound $\mathbb{V}_{o|k}$ for the variance of each $EM_k$ may be specified. As described hereinbelow, optimal shot overhead may be obtained when:

(i) Accepting all syndromes ($S_{rej}=\emptyset$).

(ii) Assigning a separate subset {s} to each syndrome $s\in S$.

(iii) Averaging over shots with inverse-variance weights.

With these conditions, the shot sampling overhead of SA-LEM may, as shown hereinbelow, be bounded by a 'harmonic expectation' of 'conditioned variances' $\mathbb{H}[\mathbb{V}_{o|k}]$. The conditioned variances may, as shown hereinbelow, generically be exponentially smaller than the shot sampling overhead of ExtLEM with EM(ΛL).

Minimization of the QPU time (as opposed to the shot number) may lead to a non-empty rejected set $S_{rej}$, Minimization of the QPU time may lead to a partition of accepted syndromes $s\in S_{acc}$ to singletons {s} with inverse-variance weights. A more coarse-grained partition of accepted syndromes (i.e., a partition with $K<|S_{acc}|+1$ subsets) may be useful to reduce the number of distinct logical error channels $\Lambda_{L|k}$ that may be required to be characterized and mitigated. Such course-graining generally may increase the shot and QPU time overheads. The increase may be small if the conditioned logical errors $$\{\epsilon_{L|s}\}_{s\in S_k}$$

of individual syndromes within each subset $S_k$ may be approximately uniform, while syndromes with significantly distinct $\epsilon_{L|s}$ may be separated to different subsets.

In some embodiments, the choice of accepted subsets $S_k\neq S_{rej}$ as a function of $S_{rej}$ may be fixed, and the set $S_{rej}$ may be chosen by minimizing either the total QPU time, or total shot number N, that may be required to meet a maximal allowed statistical error and/or a maximal allowed systematic error. In some embodiments, the choice of accepted syndromes for a given $S_{rej}$ may correspond to a single subset $S_{acc}$ that may include all accepted syndromes $s\notin S_{rej}$, or may correspond to a distinct subset {s} for each accepted syndrome $s\notin S_{rej}$. The resulting rejected set $S_{rej}$ may depend on the partition, mitigation protocols and/or weights that may be used for accepted syndromes, and therefore, may generally differ from rejected sets constructed in the literature (in the context of PS). In particular, within SA-LEM, rejection may be useful for both odd and even distance codes.

EM protocols applied to physical operations may generally involve three steps:

(i) A classical pre-processing step, where an ideal input circuit, an observable expectation value to be estimated with a specified accuracy, and possibly a physical error model, may be mapped (e.g., via modifications of the input circuit) to a set of quantum circuits that may be run on the noisy QPU, with some number of shots (that may be per circuit).

(ii) A QPU step, where the obtained circuits may be executed on the QPU and the resulting noisy results may be collected.

(iii) A classical post-processing step, where noisy results may be mapped to an estimate of the required expectation value.

Generally, the logic involved in both the pre- and post-processing steps of an EM protocol may be adapted to make use of syndrome data. That is, the EM protocol may be k-dependent. Circuit modifications which may be adapted to be k-dependent, may not be performed in pre-processing as part of SA-LEM, and may be performed in real time, i.e., during circuit execution and/or after syndrome measurement. In particular, for embodiments where a characterization-based protocol $EM_k=EM(\Lambda_{L|k})$ may be used for at least two subsets $S_k$, the above statement may hold for any characterization-dependent circuit modification (e.g., sampling of circuit modifications from QP decompositions), which may become k-dependent through the conditioned logical error channel $\Lambda_{L|k}$. The above implementation challenge mays not appear in the simple case where K=2, with a rejected subset $S_{rej}$ and a characterization-based mitigation of all accepted syndromes together, $EM_{acc}=EM(\Lambda_{L|acc})$, since circuit modifications may be performed in pre-processing, under the assumption that only accepted syndromes may be measured during circuit execution.

Both EC and PS may generally performed in real time. PS may also be done in post-processing (e.g., by completing the computation of rejected shots and discarding the corresponding final measurement outcome). As noted hereinabove, aborting a shot once a rejected syndrome is measured may lead to a reduction in QPU time. In EC, the decoding and recovery step in each logical operation may be completed before the next logical operation can be performed.

The method of Pauli frames may provide an advantage. The method of Pauli frames may allow performing subsequent logical operations in parallel to the decoding process (of preceding logical operations). In the known art, Pauli frames may also be used for the QPU step of ExtLEM. The same holds for SA-LEM, i.e., Pauli frames may be used for the QPU step of SA-LEM, e.g., as part of IntLEM. When using SA-LEM, the method of Pauli frames may be advantageous, since some circuit modifications may be performed in real-time, as described hereinabove.

In the known art, it is generally accepted that the decoding algorithm in EC should be loaded as software onto dedicated classical hardware (such as an FPGA or ASIC) which is part of the classical control system of the relevant QPU, in order to avoid un-necessary time delays between subsequent logical operations. Similarly, the classical real time logic involved in SA-LEM may be loaded onto control hardware, and more generally, may be viewed as part of a generalized syndrome decoding algorithm, from both software and hardware perspectives.

SA-LEM and P2LC may be combined. In some embodiments of SA-LEM, a conditioned error channel $\Lambda_{L|k}$ may be needed as input to the mitigation protocol $EM_k$. This input may be provided by P2LC. For example, as follows.

A subset of layers $\{L_j\}_{j\in J}$ in the given circuit C may be specified. For each layer, P2LC may estimate an error channel, either $$\Lambda^{(j)}_{e|k_{j-h:j}} \text{ or } \Lambda^{(j)}_{l|k_{j-h:j}},$$

where $K_{j-h:j}$ may be the part of the syndrome data vector k measured between layers j–h and j. The characterization may define the relation between the error corrected logical operations $\{G_\alpha\}_{\alpha\in A}$ (which generate the syndrome data on which conditioning may be performed in SA-LEM), and the set $\{G_\alpha\}_{\alpha\in A}$, (on which conditioning may be performed in P2LC). That is, for a layer $L_j$: $\{G_\alpha\}_{\alpha\in A}=\{G_\alpha|\alpha\in A$, and $G_\alpha$ is in $L_{j-h} \ldots L_j\}$). The conditioned error channel $\Lambda_{L|k}$ may then be given by an independent set of channels $$\left\{\Lambda^{(j)}_{e|k_{j-h:j}}\right\}_{j\in J} \text{ or } \left\{\Lambda^{(j)}_{l|k_{j-h:j}}\right\}_{j\in J}.$$

Sampling an error from $\Lambda_{L|k}$ may be done by independently sampling an error after each layer $L_j$ from the corresponding channel $$\Lambda^{(j)}_{e|k_{j-h:j}} \text{ or } \Lambda^{(j)}_{l|k_{j-h:j}},$$

In some embodiments, SA-LEM may involve a sampling from quasi-probability distributions $QP_k$, and this sampling can be combined with the sampling of fault-paths in P2LC, such that the EM protocol $EM_k$ may sample elements from $QP_k$ by directly sampling a fault-paths from the physical error models.

Figure 9:
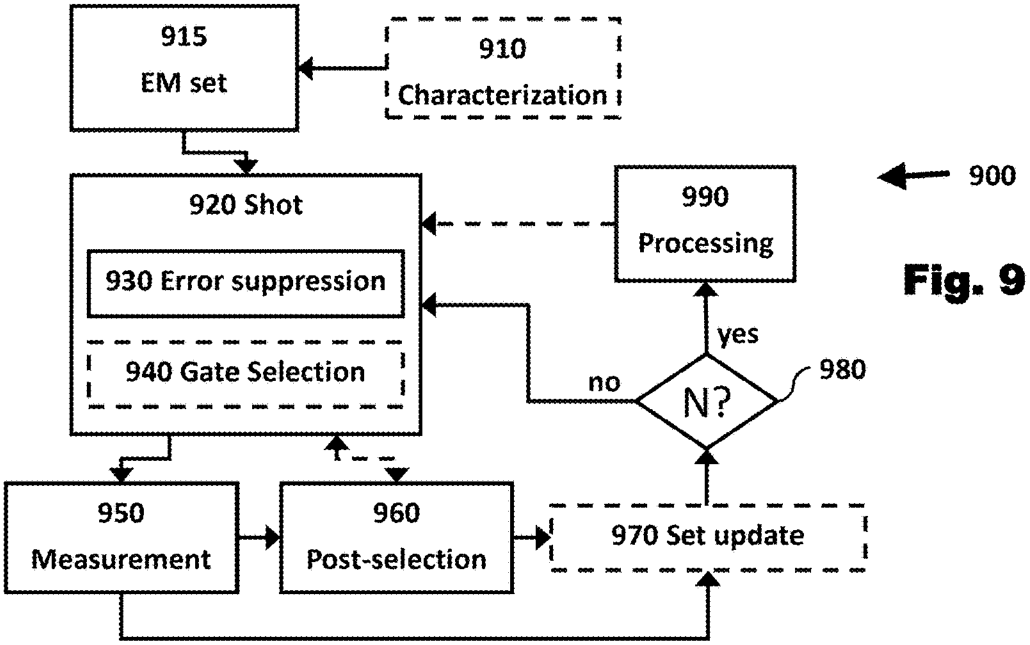
FIG. 9 schematically illustrates error mitigation methods according to the present disclosure.

SA-LEM is schematically illustrated in FIG. 9. FIG. 9 shows a flowchart schematically illustrating an error mitigation method 900 according to embodiments of the present disclosure. The method 900 may be implemented on a quantum-computer. The method 900 may be for mitigating errors in a quantum circuit C. The quantum circuit C may include at least one error-corrected quantum logic operation G.

The method may include a step 915, that may include providing a set of quantum error mitigation protocols {EM}. The set of quantum error mitigation protocols {EM} may include at least two quantum error mitigation protocols. The quantum error mitigation protocols may be configured for mitigating errors in the quantum circuit C.

The method 900 may include a step 920, that may include executing a plurality of shots. Executing a plurality of shots may be so as to (i.e., in order to) obtain a plurality of mitigated circuit outcomes {o}.

For at least one shot, the method 900 may include executing the at least one error-corrected quantum logic operation G. For at least one shot, the method 900 may include a step 950 of measuring least one syndrome associated with the quantum logic operation G, so as to obtain a syndrome measurement results vector $\vec{s}$.

At least one shot may be executed according to at least one quantum error mitigation protocol EM. The at least one quantum error mitigation protocol EM may be selected from the set of quantum error mitigation protocols {EM}. The selection of the at least one quantum error mitigation protocol EM may be based on the vector of syndrome measurement results $\vec{s}$. In some embodiments, a plurality of shots are executed according to the at least one quantum error mitigation protocol EM.

The method 900 may include combining the mitigated circuit outcomes {o} so as to obtain an estimate $\bar{o}$ of an outcome of an ideal version $C_0$ of the quantum circuit C. This may be performed, e.g., in a step 990 of processing measurement results.

It is noted that a 1-to-1 correspondence between shots and mitigated circuit outcomes {o} may not be necessary. For example, in some embodiments, at least one syndrome measurement results vector may be associated with at least two mitigated circuit outcomes. Alternatively, or in conjunction, at least one mitigated circuit outcome may be associated with at least two syndrome measurement results vectors.

In some embodiments, executing shots according to a quantum error mitigation protocol includes any one (or more) of the following:

a) executing the quantum circuit C with at least one additional quantum logic operation.

b) executing the quantum circuit C with at least one removed quantum logic operation.

c) postprocessing a measurement result of the quantum circuit C.

In some embodiments, executing shots according to a quantum error mitigation protocol may include any one of: mid-shot processing of a syndrome measurement result of the quantum circuit C, and/or mid-shot modification of the quantum circuit C. In some embodiments, mid-shot modification of the quantum circuit C may include a step 940 of gate selection (e.g., what gate to remove and/or what gate to add).

In some embodiments, the method 900 may include, for at least one shot, a step 930 of applying error-suppression (e.g., dynamical decoupling).

In some embodiments, non-overlapping sets of syndrome measurement results vectors $\vec{S}_i$ may be associated with distinct quantum error mitigation protocols $EM_i$ included in the set of quantum error mitigation protocols {EM}. In some embodiments, a union set of the non-overlapping sets of syndrome measurement results vectors $\vec{S}_i$ may include all possible syndromes of the at least one quantum logic operation G.

In some embodiments, each of the quantum error mitigation protocol $EM_i$ may be configured to mitigate errors associated with a set of syndrome measurement results vector $\vec{S}_i$.

In some embodiments, the set of quantum error mitigation protocols {EM} may include. The at least two quantum error mitigation protocols $EM_{1,2}$ may each be configured for mitigating errors in the at least one error-corrected quantum logic operation G. It is noted that hereinabove a more general case was described, where the at least two quantum error mitigation protocols $EM_{1,2}$ configured for mitigating errors in the quantum circuit C, but not necessarily in the at least one error-corrected quantum logic operation G.

In some embodiments, the method 900 may include applying to the at least one error-corrected quantum logic operation G, at least one quantum error mitigation protocol selected from the at least two quantum error mitigation protocols $EM_{1,2}$. Applying the at least one quantum error mitigation protocol may be according to the associated at least one syndrome thereof. In some embodiments, the method 900 may include executing at least two quantum error mitigation protocols included in the set of quantum error mitigation protocols {EM}.

In some embodiments, the combining may be performed according to the vector of syndrome measurement results $\vec{s}$. For example, In some embodiments, combining mitigated circuit outcomes may include computing a weighted average $\bar{o}=w_{s_1}o_1+\ldots+w_{s_N}o_N$ of the mitigated circuit outcomes {o}. Each weight $w_k$ may be associated with a set of syndrome measurement results vector $\vec{S}_k$, where N may be the number of shots. In some embodiments, each of the weights $w_{s_k}$ may be proportional to $$\mathbb{V}_{o|k}^{-1},$$

where $\mathbb{V}_{o|k}$ may be an estimate for a variance of a probability distribution of mitigated circuit outcome o. The distribution may be conditioned according to a set of syndrome measurement results vector $\vec{S}_k$. In some embodiments, the method 900 may include computing the estimate for variance $\mathbb{V}_{o|k}$.

It is noted that the combining may not be limited to computing linear combinations. In some embodiments, the combining measurement results may include computing a non-linear function of the mitigated circuit outcomes {o}.

In some embodiments, the at least two quantum error mitigation protocols may be configured to mitigate an error channel $\Lambda_{\vec{s}}$ associated with the syndrome measurement results vector s. In some embodiments, the error channel $\Lambda_{\vec{s}}$ may be a logical error channel $\Lambda_{L|\vec{s}}\ \Lambda_{L|\vec{S}_i}$, wherein $\vec{s}\in\vec{S}_i$. In some embodiments, the error channel $\Lambda_{\vec{s}}$ may be a physical error channel $\Lambda_{e|\vec{s}}\ \Lambda_{L|\vec{S}_i}$, wherein $\vec{s}\in\vec{S}_i$. In some embodiments, the method 900 may include estimating the error channel $\Lambda_{\vec{s}}$.

In some embodiments, the set of quantum error mitigation protocols {EM} may includes any one of: quasi-probability decomposition, zero-noise extrapolation, and tensor network error mitigation. In some embodiments, the set of quantum error mitigation protocols {EM} may includes any two of: quasi-probability decomposition, zero-noise extrapolation, and tensor network error mitigation. It is noted the phrasing "any two of" encompasses also cases where the set of quantum error mitigation protocols {EM} may include a plurality of error mitigation protocols from only a single type, where different parametrization may provide the difference. For example, the set of quantum error mitigation protocols {EM} may include error mitigation protocols only of the quasi-probability decomposition type, where the different decompositions may be define different weights and/or different circuits. In another example, the set of quantum error mitigation protocols {EM} may include error mitigation protocols only of the zero-noise extrapolation type, where the different extrapolations may define different regression-analysis (e.g., linear and exponential) and/or different thresholds.

In some embodiments, where the set of quantum error mitigation protocols {EM} may include a quasi-probability decomposition, the method 900 may include sampling quantum circuits according to a distribution based on the error channel $\Lambda_{\vec{s}}$.

In some embodiments, where the set of quantum error mitigation protocols {EM} may include a quasi-probability decomposition, the quasi-probability decomposition may approximate the ideal version $C_0$ of the quantum circuit C. Generally, a quasi-probability decomposition may not be limited to approximation of ideal circuits. For example, in some embodiments, the quasi-probability decomposition may approximate an execution of the quantum circuit C being subject to an amplified error channel $$\Lambda_{\vec{s}}^{\lambda}.$$

The amplified error channel $$\Lambda_{\vec{s}}^{\lambda}.$$

may be the error channel $\Lambda_{\vec{s}}$ raised to a power $\lambda\neq\pm1$.

In some embodiments, where the set of quantum error mitigation protocols {EM} may include a quasi-probability decomposition, a square of a quasi-probability norm $W^2$ of the quasi-probability decomposition may equal (i.e., may be) the estimate for variance $\mathbb{V}_{o|\vec{s}}$ associated with the error channel $\Lambda_{\vec{s}}$.

In some embodiments, sampling quantum circuits may be performed concurrently to an execution of at least one shot.

In some embodiments, the method 900 may include a step 960 of post-selection. That is, rejection of at least one shot based on a set of rejection syndromes $\vec{S}_{rej}$. In some embodiments, the set of rejection syndromes $\vec{S}_{rej}$ may be non-overlapping with any set of syndrome measurement results vectors $\vec{S}_i$ associated with a quantum error mitigation protocol $EM_i$. In other words, for a shot where a syndrome, that may lead to a rejection, may be measured, an associated measurement result may not be processed according to a quantum error mitigation protocol.

In some embodiments, the set of rejection syndromes $\{\vec{S}\}_{rej}$ may be selected so as to minimize at least one of: a total runtime, and a number of shots N. In some embodiments, the rejection may include abortion of at least one shot.

It is noted that a 1-to-1 correspondence between selected/rejected shots and measured syndromes, may not be necessary. For example, in some embodiments, at least one shot may be selected (or rejected) based on a plurality of vectors of syndrome measurement results.

It is noted that a 1-to-1 correspondence between gates and measured syndromes, may not be necessary. For example, in some embodiments, the quantum circuit C may include a plurality of error-corrected quantum logic operations $G^{(\alpha)}$. At least one syndrome measurement results vector may be associated with at least two error-corrected quantum logic operations $G^{(1,2)}$.

In some embodiments, the at least one error-corrected quantum logic operation G is encoded according to an odd distance error correcting code.

In some embodiments, the quantum circuit C may include at least two quantum logic operations $G_{1,2}$ that may act on overlapping sets of qubits. In some embodiments, the quantum circuit C includes at least two quantum logic operations $G_{1,2}$ may act sequentially. In some embodiments, the at least two error-corrected quantum logic operations $G^{(1,2)}$ may be distinct quantum logic operations.

In some embodiments, the at least one quantum error mitigation protocol EM may be selected from the set of quantum error mitigation protocols {EM} based on a plurality of vectors of syndrome measurement results.

Derivations of examples of SA-LEM, as well as simulations and proofs of the advantages of SA-LEM, are provided hereinbelow.

In some embodiments, the method 900 may include a step 970 of updating any one of: an error-mitigation protocol, and/or any subset of syndromes (e.g., an association of a syndrome to an error-mitigation protocol, may be updated). Step 970 can be performed concurrently to execution of a shot (i.e., step 920).

The method 900 may include a step 980 where a number of shots executed may be compared to a target number of shots N. Step 980 may control a looping of method 900.

Single-Shot SA-LEM with QP Distributions

Single-shot SA-LEM based on quasi-probability (QP) distributions is described hereinbelow, and is proven to be (at least approximately) unbiased. The full N-shot protocol is subsequently described, and its sampling overhead is computed. Examples of QP distributions based on the channels $\Lambda_{Ilk}$ and $\Lambda_{elk}$ produced by P2LC are described herein further below.

A faulty error-corrected circuit may be given by $C=G_D \ldots G_1=\Sigma_{s_D} G_{D,s_D} \ldots \Sigma_{s_1} G_{1,s_1}$, where $G_{j,s_j}$ may be the part of $G_j$ corresponding to the syndrome measurement outcome $s_j$. The initial state may be assumed to be an ideal code state $|c\rangle\rangle$. Usually, $G_1|c\rangle\rangle=|\text{prep } c\rangle\rangle$ may be an error-corrected logical state preparation. However, herein the code state may be indicated explicitly.

From the first syndrome measurement, each syndrome $s_1$ may be obtained with probability $\tilde{p}_{s_1}=\langle\langle I|G_{1,s_1}|c\rangle\rangle$, and the quantum state, given this measured syndrome, may be $$\tilde{p}_{s_1}^{-1} G_{1,s_1} \left| c \right\rangle\rangle.$$

Given the measured syndrome, an operation $$B_{\sigma_1}^{(1)}$$

may be sampled from an $s_1$-dependent QP distribution:

$$QP_{s_1}^{(1)} = \sum\nolimits_{\sigma_1} q_{\sigma_1|s_1}^{(1)} B_{\sigma_1}^{(1)},$$

where (assuming $$QP_{s_1}^{(1)}$$

is trace preserving), $$\sum\nolimits_{\sigma_1} q_{\sigma_1|s_1}^{(1)} = 1.$$

This may be achieved by defining the probability distribution $$p_{\sigma_1|s_1}^{(1)} = \left| q_{\sigma_1|s_1}^{(1)} \right| / W_{s_1}^{(1)},$$

where the QP norm may be given by $$W_{s_1}^{(1)} = \sum\nolimits_{\sigma_1} \left| q_{\sigma_1|s_1}^{(1)} \right| \geq 1.$$

The equality $$QP_{s_1}^{(1)} = W_{s_1}^{(1)} \sum\nolimits_{\sigma_1} \text{sgn}_{\sigma_1,s_1} p_{\sigma_1|s_1}^{(1)} B_{\sigma_1}^{(1)}$$

shows that inserting $$B_{\sigma_1}^{(1)}$$

after $G_1$ ('circuit modification'), with probability $$p_{\sigma_1|s_1}^{(1)},$$

and multiplying the modified circuit outcome by the factor $$f^{(1)}_{\sigma_1,s_1} = W^{(1)}_{s_1}\mathrm{sgn}_{\sigma_1,s_1}$$

('post processing'), may implement, in expectation, the desired super-operator $$QP^{(1)}_{s_1}$$

after $G_1$.

Applying the sampled QP operation $$B^{(1)}_{\sigma_1}$$

after $G_1$ may yield the state $$B^{(1)}_{\sigma_1}\tilde{p}^{-1}_{s_1}G_{1,s_1}|c\rangle\rangle.$$

The next error-corrected layer $G_2=\Sigma_{s_2} G_{2,s_2}$ may then be applied. Given $S_1$ and $\sigma_1$, the syndrome $s_2$ may be obtained with probability $$\tilde{p}_{s_2|\sigma_1,s_1} = \langle\langle I|G_{2,s_2}B^{(1)}_{\sigma_1}\tilde{p}^{-1}_{s_1}G_{1,s_1}|c\rangle\rangle,$$

and the state given this syndrome may be $$\tilde{p}^{-1}_{s_2}G_{2,s_2}B^{(1)}_{\sigma_1}\tilde{p}^{-1}_{s_1}G_{1,s_1}|c\rangle\rangle.$$

A second QP operation $$B^{(2)}_{\sigma_2}$$

may be sampled, with probability $$p^{(2)}_{\sigma_2|s_{2:1}},$$

form a QP distribution $$QP^{(2)}_{s_{2:1}} = \sum\nolimits_{\sigma_2} f^{(2)}_{\sigma_2,s_{2:1}}\, p^{(1)}_{\sigma_2|s_{2:1}}\, B^{(1)}_{\sigma_1},$$

where the notations $s_{1:j}=(s_1, \ldots, s_j)$, and similarly $\sigma_{1:j}$, are introduced. Further notations are $s=s_{1:D}$, $\sigma={}_{1:D}$. The output state of the circuit may be $$|\sigma, s\rangle\rangle = B^{(D)}_{\sigma_D}\frac{G_{D,s_D}}{\tilde{p}_{s_D|s_{D-1:1}\sigma_{D-1:1}}} \ldots B^{(1)}_{\sigma_1}\frac{G_{1,s_1}}{\tilde{p}_{s_1}}|c\rangle\rangle,$$

with probability $$\tilde{p}_{\sigma,s} = p^{(D)}_{\sigma_D|s_{D:1}}\tilde{p}_{s_D|s_{D-1:1},\sigma_{D-1:1}} \cdots p^{(1)}_{\sigma_1|s_1}\tilde{p}_{s_1}.$$

A measurement $\langle\langle O| = \Sigma_{o'}\langle\langle \Pi_{o'}|$ may be performed, to obtain a measurement outcome o', with conditioned probability $p_{o'|s,\sigma} = \langle\langle \Pi_{o'}|\sigma, s\rangle\rangle = |\langle{}_{o'}\rangle_{\sigma,s}$. The result may be multiplied by the factor $$f_{\sigma,s} = \prod\nolimits_{j=1,\ldots D} f^{(j)}_{\sigma_j,s_{j:1}}$$

(to note, $$|f_{\sigma,s}| = W_s = \prod\nolimits_{j=1,\ldots D} W^{(j)}_{s_{j:1}}$$

may be the QP norm for the entire circuit). This may define the single-shot mitigated outcome o=fo'. The above quantum-classical procedure is summarized as a pseudo-code by the example provided by Algorithm 4. Hereinbelow provided is a proof that the resulting random variable o may be an un-biased estimator for the ideal circuit outcome, for QP decompositions that may be constructed based on 'exact' error channels.

Algorithm 4 (single-shot SA-LEM with QP distributions):

1. Input:
   1.1. error corrected circuit $C = G_D \ldots G_1$, where $G_1$ is an error-corrected preparation of a code state $|c\rangle\rangle$.
   1.2. observable $\langle\langle O|$.
   1.3. $QP$ distribution $QP_s = \left(QP^{(j)}_{s_{j:1}}\right)^{D}_{j=1}$, corresponding to an independent QP distribution $QP^{(j)}_{s_{j:1}}$ for each layer $j = 1, \ldots, D$, defined by probabilities $p^{(j)}_{\sigma_j|s_{j:1}}$, operations $B^{(j)}_{\sigma_j}$.
   1.4. Factors $f^{(j)}_{\sigma_j,s_{j:1}}$.

-continued

Algorithm 4 (single-shot SA-LEM with QP distributions):

2. f = 1; $s_{1:1}$ = ( ); #Empty tuple
3. For j = 1, . . . , D:
 3.1. Apply error corrected operation $G_j$, and obtain a measured syndrome $s_j$.
 3.2. $s_{j:1} = s_{j-1:1} \cup (s_j)$.
 3.3. Sample $\sigma_j$ from the distribution $p^{(j)}_{\sigma_j|s_{j:1}}$, and apply $B^{(j)}_{\sigma_j}$. #Circuit modification
 3.4. $f \mapsto f^{(j)}_{\sigma_j, s_{j:1}} \times f$.
 3.5. End For
4. Measure ⟨⟨O| to obtain a measurement outcome o'.
5. Output: o = f × o'. #Post-processing Lemma 3 (Expectation value of SA-LEM with QP distributions): The estimator o defined by Algorithm 3 may satisfy $\mathbb{E}[o] = \langle\langle O|C_{EM}|c\rangle\rangle$, where $C_{EM} = G_{D,EM} \ldots G_{1,EM}$ may be an error-mitigated version of $C = G_D \ldots G_1$, where each layer $G_j = \Sigma_{s_j} G_{j,s_j}$ may be replaced by $$G_{j,EM} = \sum\nolimits_{s_j} QP^{(j)}_{s_{j:1}} G_{j,s_j}.$$

Proof: The conditioned expectation of o may be $\mathbb{E}[o|\sigma, s] = f_{\sigma,s} \Sigma_{o'} p_{o'|\sigma,s} o' = f_{\sigma,s} \langle\langle O|\sigma, s\rangle\rangle = f_{\sigma,s} \langle O\rangle_{\sigma,s}$. The full expectation of o may then be obtained by using the law of conditioned means, and 'un-packing' all expressions:

$$\begin{aligned}
\mathbb{E}[o] &= \mathbb{E}[\mathbb{E}[o|\sigma, s]] \\
&= \mathbb{E}\left[f_{\sigma,s}\langle O\rangle_{\sigma,s}\right] \\
&= \sum_{\sigma,s} \tilde{p}_{\sigma,s} f_{\sigma,s} \langle\langle O|\sigma, s\rangle\rangle \\
&= \sum_{\sigma,s} f_{\sigma,s} p^{(D)}_{\sigma_D|s_{D:1}} \tilde{p}_{s_D|s_{D-1:1},\sigma_{D-1:1}} \ldots \\
&\quad p^{(1)}_{\sigma_1|s_1} \tilde{p}_{s_1} \left\langle\left\langle O \middle| B^{(D)}_{\sigma_D} \frac{G_{D,s_D}}{\tilde{p}_{s_D|s_{D-1:1},\sigma_{D-1:1}}} \ldots B^{(1)}_{\sigma_1} \frac{G_{1,s_1}}{\tilde{p}_{s_1}} \middle| c \right\rangle\right\rangle \\
&= \sum_{\sigma,s} f_{\sigma,s} p^{(D)}_{\sigma_D|s_{D:1},\sigma_{D:1}} \ldots p^{(1)}_{\sigma_1|s_1} \langle\langle O|B^{(D)}_{\sigma_D} G_{D,s_D} \ldots B^{(1)}_{\sigma_1} G_{1,s_1}|c\rangle\rangle \\
&= \sum_{\sigma,s} \left\langle\left\langle O \middle| \left( \sum_{\sigma_D} p^{(1)}_{\sigma_{D:1},s_{d:1}} p^{(D)}_{\sigma_D|s_{D:1},\sigma_{D:1}} B^{(D)}_{\sigma_D} \right) G_{D,s_D} \ldots \right.\right. \\
&\quad \left.\left. \left( \sum_{\sigma_1} f^{(1)}_{\sigma_1,s_1} p^{(1)}_{\sigma_1|s_1} B^{(1)}_{\sigma_1} \right) G_{1,s_1} \middle| c \right\rangle\right\rangle \\
&= \sum_s \langle\langle O|QP^{(D)}_{s_D} G_{D,s_{D:1}} \ldots QP^{(1)}_{s_1} G_{1,s_1}|c\rangle\rangle.
\end{aligned}$$

Theorem 5 (SA-LEM with QP distributions that invert the exact error channel is un-biased): Assume the QP decompositions used in Algorithm 3 satisfy $$QP^{(j)}_{s_{j:1}} = \left(\Lambda^{(j)}_{e|s_{j:1}}\right)^{-1}, \text{ where } \Lambda^{(j)}_{e|s_{j:1}} = \Lambda^{(j)}_{out|s_{j:1}} \left(\Lambda^{(j+1)}_{in|s_{j:1}}\right)^{-1}$$

may be 'exact' errors channels defined by input channels $$\Lambda^{(j)}_{\text{in}|s_{j-1:1}}.$$

Then the random variable o defined by Algorithm 3 may be an un-biased estimator for the ideal circuit outcome, $\mathbb{E}[o] = \langle\langle O|g_D \ldots g_1|c\rangle\rangle = \langle O\rangle_{ideal}$, Proof: Using the above Lemma 3, $$\begin{aligned}
\mathbb{E}[o] &= \langle\langle O|C_{EM}|c\rangle\rangle \\
&= \sum_s \langle\langle O|QP^{(D)}_{s_{D:1}} G_{D,s_D} \ldots QP^{(1)}_{s_1} G_{1,s_1}|c\rangle\rangle \\
&= \sum_s \langle\langle O|(\Lambda^{(D)}_{e|s_{D1}})^{-1} G_{D,s_D} \ldots (\Lambda^{(1)}_{e|s_1})^{-1} G_{1,s_1}|c\rangle\rangle.
\end{aligned}$$

Using $$G_{1,s_1}|c'\rangle\rangle = p_{s_1} \Lambda^{(1)}_{out|s_1} g_1 |c'\rangle\rangle,$$

for every code state c', as well as $$(\Lambda^{(1)}_{e|s_1})^{-1} = \Lambda^{(2)}_{\text{in}|s_1} (\Lambda^{(1)}_{out|s_1})^{-1},$$

we have $$\begin{aligned}
\mathbb{E}[o] &= \sum_s p_{s_1} \langle\langle O| (\Lambda^{(D)}_{e|s_{D:1}})^{-1} G_{D,s_D} \ldots G_{2,s_2} (\Lambda^{(1)}_{e|s_1})^{-1} \Lambda^{(1)}_{out|s_1} g_1 |c\rangle\rangle \qquad (*) \\
&= \sum_s p_{s_1} \langle\langle O| (\Lambda^{(D)}_{e|s_{D:1}})^{-1} G_{D,s_D} \ldots G_{2,s_2} \Lambda^{(2)}_{\text{in}|s_1} g_1 |c\rangle\rangle.
\end{aligned}$$

Continuing in this manner, using $$G_{j,s_j} \Lambda^{(j)}_{\text{in}|s_{j-1:1}} |c'\rangle\rangle = p_{s_j|s_{j-1:1}} \Lambda^{(j)}_{out|s_{j:1}} g_j |c\rangle\rangle \text{ and } \left(\Lambda^{(j)}_{e|s_{j:1}}\right)^{-1} = \Lambda^{(j+1)}_{\text{in}|s_{j:1}} \left(\Lambda^{(j)}_{out|s_{j:1}}\right)^{-1} \left(\text{with } \Lambda^{(D+1)}_{\text{in}|s_{j:1}} = I\right)$$

find $$\mathbb{E}[o] = \sum_{s} p_{s_2|s_1} p_{s_1} \langle\langle O \,|\, (\Lambda^{(D)}_{e|s_{D:1}})^{-1} G_{D,s_D} \ldots G_{3,s_3} (\Lambda^{(2)}_{e|s_2,s_1})^{-1} \Lambda^{(2)}_{out|s_2,s_1} g_2 g_1 \,|\, c\rangle\rangle \quad (**)$$

$$= \sum_{s} p_{s_2|s_1} p_{s_1} \langle\langle O \,|\, (\Lambda^{(D)}_{e|s_{D:1}})^{-1} G_{D,s_D} \ldots G_{3,s_3} \Lambda^{(3)}_{\mathrm{in}|s_2,s_1} g_2 g_1 \,|\, c\rangle\rangle$$

$$= \sum_{s} p_{s_D|s_{D-1:1}} \ldots p_{s_3|s_{2:1}} p_{s_2|s_1} p_{s_1} \langle\langle O \,|\, g_D \ldots g_3 g_2 g_1 \,|\, c\rangle\rangle$$

$$= \langle\langle O \,|\, g_D \ldots g_1 \,|\, c\rangle\rangle.$$

To note, the last two multi-line equations are labeled as (*) and as (**).

Several comments may be given on Theorem 5. The notation indicates that the input channel.

$$\Lambda^{(j)}_{\mathrm{in}|s_{j-1:1}}$$

to the jth layer may be conditioned on all previously measured syndromes $s_{j-1:1}$. Accordingly, the exact error channel $$\Lambda^{(j)}_{e|s_{j:1}}$$

and corresponding QP distribution $$QP^{(j)}_{s_{j:1}}$$

may depend on $s_j$ as well as all previously measured syndromes. P2LC may only make use of the "recent" syndrome data, i.e., up to h steps back in time.

Even with a fixed history parameter h, within P2LC, which part of the "recent" syndrome data to condition on, may be chosen (i.e., selected). A simple exemplary choice may be given by averaging over all past syndromes, such that P2LC may output the syndrome-intendent input channel $$\Lambda^{(j)}_{in} = \Sigma_{s_{j-1:1}} p_{s_{j-1}|s_{j-2:1}} \ldots p_{s_2|s_1} p_{s_1} \Lambda^{(j)}_{in|s_{j-1:1}},$$

and the corresponding $$\Lambda^{(j)}_{out|s_j} = G_j \Lambda^{(j)}_{in} g_j^{-1},\ \Lambda^{(j)}_{e|s_j} = \Lambda^{(j)}_{out|s_j} (\Lambda^{(j+1)}_{in})^{-1} \text{ and } QP^{(j)}_{s_j} = \left(\Lambda^{(j)}_{e|s_j}\right)^{-1},$$

which may only depend on the "current" syndrome $s_j$. Equations (*) and (**) may then take the form:

$$\mathbb{E}[o] = \sum_{s_{D:2}} \left\langle\left\langle O \middle| (\Lambda^{(D)}_{e|s_{D:1}})^{-1} G_{D,s_D} \ldots G_{2,s_2} \sum_{s_1} p_{s_1} (\Lambda^{(1)}_{e|s_1})^{-1} \Lambda^{(1)}_{out|s_1} g_1 \middle| c \right\rangle\right\rangle$$

$$= \sum_{s_{D:2}} \left\langle\left\langle O \middle| (\Lambda^{(D)}_{e|s_{D:1}})^{-1} G_{D,s_D} \ldots G_{2,s_2} \sum_{s_1} p_{s_1} \Lambda^{(2)}_{\mathrm{in}|s_1} g_1 \middle| c \right\rangle\right\rangle$$

$$= \sum_{s_{D:2}} \left\langle\left\langle O \middle| (\Lambda^{(D)}_{e|s_{D:1}})^{-1} G_{D,s_D} \ldots G_{2,s_2} \Lambda^{(2)}_{in} g_1 \middle| c \right\rangle\right\rangle$$

-continued $$= \sum_{s_{D:3}} \left\langle\left\langle O \middle| (\Lambda^{(D)}_{e|s_{D:1}})^{-1} G_{D,s_D} \ldots \sum_{s_2} p_{s_2} \Lambda^{(2)}_{out|s_2} g_2 g_1 \middle| c \right\rangle\right\rangle$$

$$= \sum_{s_D} p_{s_D} \left\langle\left\langle O \middle| g_D \ldots g_2 g_1 \middle| c \right\rangle\right\rangle$$

$$= \langle\langle O \,|\, g_D \ldots g_2 g_1 \,|\, c\rangle\rangle.$$

Thus, SA-LEM may be un-biased, irrespective of the syndrome data we condition on.

In Lemma 3 and Theorem 5, two distinct but closely related distributions of syndromes appeared, $p_{s_j|s_{j-1:1}}$ and $\tilde{p}_{s_j|s_{j-1:1},\sigma_{j-1:1}}$. The latter distribution (i.e., $\tilde{p}_{s_j|s_{j-1:1},\sigma_{j-1:1}}$) may correspond to the circuits that may be run on the QPU as part of SA-LEM. The former distribution (i.e., $p_{s_j|s_{j-1:1}}$) may be the probability in the 'mitigated circuit', which may only be obtained in expectation. If the logical error channel $\Lambda_l$ may be mitigated instead of $\Lambda_e$ (i.e., the physical error channel), then $\tilde{p}_{s_j|s_{j-1:1},\sigma_{j-1:1}} = p_{s_j|s_{j-1:1}} + O(\epsilon^{t+2})$. When mitigating $\Lambda_l$, the QP operations $B_\sigma$ may be logical Pauli operations (further described hereinbelow), and therefore may not affect syndrome measurement outcomes. At leading order, $\Lambda_e$ may be replaced with $\Lambda_l$, such that errors may be logical, and may not affect the measured syndrome. The following equality may hold:

$$\tilde{p}_{s_1} = \langle\langle I | G_{1,s_1} | c \rangle\rangle = p_{s_1} \langle\langle I | \Lambda^{(f)}_{out|s_1} g_1 | c' \rangle\rangle = p_{s_1}$$

Thus:

$$\tilde{p}_{s_2|\sigma_1,s_1} = \langle\langle I | G_{2,s_2} B^{(1)}_{\sigma_1} \tilde{p}^{-1}_{s_1} G_{1,s_1} | c \rangle\rangle$$

$$= \langle\langle I | G_{2,s_2} B^{(1)}_{\sigma_1} \Lambda^{(1)}_{out|s_1} | c \rangle\rangle$$

$$= \langle\langle I | G_{2,s_2} B^{(1)}_{\sigma_1} \Lambda^{(1)}_{in|s_1} \Lambda^{(1)}_{e|s_1} | c \rangle\rangle$$

$$= \langle\langle I | G_{2,s_2} B^{(1)}_{\sigma_1} \Lambda^{(1)}_{in|s_1} \Lambda^{(1)}_{l|s_1} | c \rangle\rangle + O(\epsilon^{t+2})$$

$$= \langle\langle I | G_{2,s_2} \Lambda^{(1)}_{in|s_1} B^{(1)}_{\sigma_1} \Lambda^{(1)}_{l|s_1} | c \rangle\rangle + O(\epsilon^{t+2})$$

$$= \langle\langle I | G_{2,s_2} \Lambda^{(1)}_{in|s_1} | c' \rangle\rangle + O(\epsilon^{t+2})$$

$$= p_{s_2|s_1} + O(\epsilon^{t+2}).$$

In a similar manner, the equality $\tilde{p}_{s_j|s_{j-1:1},\sigma_{j-1:1}} = p_{s_j|s_{j-1:1}} + O(\epsilon^{t+2})$ may be obtained for all j. It follows that SA-LEM based on $\Lambda_l$ may be (at least approximately) un-biased, even when conditioned on the measured syndromes. That is, $\mathbb{E}[o|s] = \langle O \rangle_{ideal} + O(\epsilon^{t+2})$ for all s.

N-Shot SA-LEM and its Sampling Overhead

Hereinabove, a configuration of SA-LEM (with QP distributions) was described, where a single-shot mitigated outcome o may be obtained. Obtaining a high statistical accuracy generically may require running N>>1 shots. The plurality of shots may produce syndrome data vectors $s_i$ and may produce single-shot mitigated outcomes $o_i$, i=1, . . . , N. Each $o_i$ can be understood as being produced by a 2-step sampling procedure, in which a syndrome vector s may be sampled, and subsequently, a single-shot mitigated outcome o|s may be sampled. As described hereinabove, each o|s may be an independent estimator for the same ideal circuit outcome, $\mathbb{E}[o|s] \approx \langle O \rangle_{ideal}$. Accordingly, the syndrome vectors $$s_{1:N}=\{s_i\}_{i=1}^{N}$$

can be used to determine weights $w_i=w_i(s_{1:N})$, $\Sigma_i w_i=1$. An N-shot mitigated outcome may be defined: $\bar{o}=w_1o_1+\ldots+w_No_N$. This may define an (at least approximately) un-biased estimator, $\mathbb{E}[\bar{o}]=\mathbb{E}[\mathbb{E}[\bar{o}|s_{1:N}]]\approx\langle O\rangle_{ideal}$, and the weights $w_i$ may be chosen to minimize the variance of $\bar{o}$, and the corresponding shot sampling overhead.

The variance of $\bar{o}$, as a function of the weights $w_i$, may be computed. The law of conditioned variances, i.e., $\mathbb{V}[\bar{o}]=\mathbb{E}[\mathbb{V}[\bar{o}|s_{1:N}]]+\mathbb{V}[\mathbb{E}[\bar{o}|s_{1:N}]]$, may be used. The second term may vanish if each o|s may be unbiased, implying that $\mathbb{E}[\bar{o}|s]=\langle O\rangle_{ideal}$ may be independent of s. Given upper bounds $\mathbb{V}_{o|s}$ for the conditioned variances $\mathbb{V}[o|s]$, the following equality may hold:

$$\mathbb{V}[\bar{o}]=\mathbb{E}[\mathbb{V}[\bar{o}\,|\,s_{1:N}]]=\mathbb{E}\Big[\sum\nolimits_{i=1}^{N}w_i^2\mathbb{V}[o\,|\,s_i]\Big]\le\mathbb{E}\Big[\sum\nolimits_{i=1}^{N}w_i^2\mathbb{V}_{o|s_i}\Big].$$

Minimizing $$\sum\nolimits_{i=1}^{N}w_i^2\mathbb{V}_{o|s_i}$$

over the weights $w_i$ may give the 'inverse-variance' weights, $$w_i\propto\mathbb{V}_{o|s_i}^{-1}.$$

With these optimal weights, $$\sum\nolimits_{i=1}^{N}w_i^2\mathbb{V}_{o|s_i}=\Big(\sum\nolimits_{i=1}^{N}\mathbb{V}_{o|s_i}^{-1}\Big)^{-1},$$

so $$\mathbb{V}[\bar{o}]=\mathbb{E}[\mathbb{V}[\bar{o}\,|\,s_{1:N}]]\le\mathbb{E}\Big[\Big(\sum\nolimits_{i=1}^{N}\mathbb{V}_{o|s_i}^{-1}\Big)^{-1}\Big].$$

This motivates the use of inverse-variance weights within SA-LEM. When using SA-LEM with QP distributions, the bound may be simple:

$$\mathbb{V}[o|s]\le W_s^2=\prod_{j=1,\ldots D}\Big(W_{s_{j:1}}^{(j)}\Big)^2$$

(assuming, without loss of generality, that the operator O is normalized in operator norm, $\|O\|_{op}=1$). The bound may be set to $$\mathbb{V}_{o|s_i}=W_{s_i}^2,$$

as summarized in pseudocode by exemplary algorithms Algorithm 5 and Algorithm 5'.

Algorithm 5 (N-shot SA-LEM):

1. Input:
   1.1. Number of shots N.
   1.2. Estimates $\mathbb{V}_{o|s}$ for syndrome-conditioned variances.
   1.3. All input required for single-shot SA-LEM.
2. Run single-shot SA-LEM N times to obtain the syndrome data vectors $s_i$ and single-shot mitigated outcomes $o_i$, i = 1, . . . , N.
3. Output: $\bar{o}=\Big(\sum\nolimits_{i=1}^{N}\mathbb{V}_{o|s_i}^{-1}\Big)^{-1}\sum\nolimits_{i=1}^{N}\mathbb{V}_{o|s_i}^{-1}o_i.$ Algorithm 5' (N-shot SA-LEM with QP distributions):

1. Input:
   1.1. Number of shots N.
   1.2. All input required for Algorithm 4.
2. Run Algorithm 4 repeatedly N times to obtain the syndrome data vectors $s_i$ and single-shot mitigated outcomes $o_i$, i = 1, . . . , N.
3. Output: $\bar{o}=\Big(\sum\nolimits_{i=1}^{N}W_{s_i}^{-2}\Big)^{-1}\sum\nolimits_{i=1}^{N}W_{s_i}^{-2}o_i.$ To estimate the accuracy of Algorithm 5 (or Algorithm 5') as a function of the number of shots N, it is noted that (assuming each o|s is unbiased):

$$N\mathbb{V}[\bar{o}]\le\mathbb{E}\left[\left(\frac{1}{N}\sum_{i=1}^{N}\mathbb{V}_{o|s_i}^{-1}\right)^{-1}\right]$$

may be the expectation of the (empirical) harmonic mean of $\mathbb{V}_{o|s_i}$, which may converges to the 'harmonic expectation' as $N\to\infty$:

$$N\mathbb{V}[\bar{o}]\le\mathbb{E}\left[\left(\frac{1}{N}\sum_{i=1}^{N}\mathbb{V}_{o|s_i}^{-1}\right)^{-1}\right]\to\mathbb{E}\big[\mathbb{V}_{o|s}^{-1}\big]^{-1}=\mathbb{H}\big[\mathbb{V}_{o|s}\big].$$

The rate of convergence of the harmonic mean to the harmonic expectation was studied in, e.g., [Pakes (2001)] listed hereinabove. Assuming bounded moments of $$\mathbb{V}_{o|s}^{-1},$$

Theorem 7 provided hereinbelow may be used to show that:

$$N\mathbb{V}[\bar{o}]/\mathbb{H}\big[\mathbb{V}_{o|s}\big]=1+c^2N^{-1}+O\big(N^{-2}\big)$$

with $$c^2=\mathbb{V}\big[\mathbb{V}_{o|s}^{-1}\big]/\mathbb{E}\big[\mathbb{V}_{o|s}^{-1}\big]^2.$$

With the convention $\|O\|_{op}=1$, The bound may be restricted to $\mathbb{V}_{o|s}\ge1$. All moments of $$\mathbb{V}_{o|s}^{-1}$$

may be bounded, and moreover, $$\mathbb{V}[\mathbb{V}_{o|s}^{-1}] \leq \mathbb{E}[\mathbb{V}_{o|s}^{-1}]$$

may hold. Thus, $$c^2 \leq \mathbb{E}[\mathbb{V}_{o|s}^{-1}]^{-1} = \mathbb{H}[W_s^2],$$

$$\text{and } \mathbb{V}[\bar{o}] = \mathbb{E}[\mathbb{V}[\bar{o}|s_{1:N}]] \leq \frac{\mathbb{H}[\mathbb{V}_{o|s}]}{N} + \left(\frac{\mathbb{H}[\mathbb{V}_{o|s}]}{N}\right)^2 + O(N^{-3}).$$

Thus, $N=\varepsilon^{-2}\mathbb{H}[\mathbb{V}_{o|s}](1+O(\varepsilon^2))$ shots may suffice to ensure a statistical error $\sqrt{\mathbb{V}[\bar{o}]}\leq\varepsilon$. In other words, the shot sampling overhead of Algorithm 5 may, to a very good approximation, be given by $$\mathbb{H}[W_s^2].$$

The normalization of O may imply $\varepsilon\leq 1$. A statistical inaccuracy $\varepsilon<<1$ may be required for most applications. The $O(\varepsilon^2)$ correction may therefore be negligible.

Hereinabove, it was assumed that each o|s may be unbiased, such that: $\mathbb{E}[\bar{o}|s]=\langle O\rangle_{ideal}$ and $\mathbb{V}[\bar{o}]=\mathbb{E}[\mathbb{V}[\bar{o}|s_{1:N}]]$. In the presence of a bias $|\mathbb{E}[o|s]-\langle O\rangle_{ideal}|\leq b$, the object of interest may be the mean-squared-error (MSE), $\mathbb{MSE}[\bar{o}]=\mathbb{E}[(\bar{o}-\langle O\rangle_{ideal})^2]$, as opposed to the variance $\mathbb{V}[\bar{o}]$. It can be shown that $\mathbb{MSE}[\bar{o}]\leq\mathbb{E}[\mathbb{V}[\bar{o}|s_{1:N}]]+b^2$. The above analysis then proves the following:

Theorem 6 (shot sampling overhead of SA-LEM with inverse-variance weights): Let $\bar{o}$ be the output of N-shot SA-LEM based on variance bounds $\mathbb{V}[o|s]\leq\mathbb{V}_{o|s}$ (Algorithm 5), and assume that single-shot SA-LEM has a bias $|\mathbb{E}[o|s]-\langle O\rangle_{ideal}|\leq b$. Then:

a) $N=\varepsilon^{-2}\mathbb{H}[\mathbb{V}_{o|s}](1+O(\varepsilon^2))$ shots may suffice to ensure a mean-squared-error $\mathbb{MSE}[\bar{o}]\leq\varepsilon^2+b^2$. In the un-biased case (b=0), the same number of shots may suffice to ensure a statistical error $\sqrt{\mathbb{V}[\bar{o}]}\leq\varepsilon$.

b) Given the variance bounds $\mathbb{V}_{o|s}$, replacing the 'inverse-variance' weights $$w_i \propto \mathbb{V}_{o|s}^{-1}$$

in Algorithm 5 by any other choice of weights may only increase the above bound on N.

Corollary 3: Incorporating syndrome rejection into SA-LEM may only increase the shot overhead, but may reduce the QPU time overhead.

Proof: In terms of the shot overhead, syndrome rejection may correspond to assigning weights $w_i=0$ to certain shots. These weights may differ from the optimal inverse-variance weights (i.e., they may only increase the bound that can be stated on N in terms of $\mathbb{V}_{o|s}$). The QPU time overhead may be reduced by syndrome rejection, if rejected shots may be aborted once a rejected syndrome may be measured. In the case of abortion, rejected shots may have a reduced QPU time (in expectation) compared to accepted shots.

Rejected syndromes need not be decoded or mitigated, implying that syndrome rejection can simplify software and hardware implementations.

To obtain an expression for the shot overhead of SA-LEM with a rejected subset $S_{rej}$, syndrome rejection may be viewed as a limiting case of inverse-variance weighting, where $\mathbb{V}_{o|s}\rightarrow\infty$ for $s\in S_{rej}$. Thus, syndrome rejection may only increase the shot overhead $\Gamma_{SA\text{-}LEM}=\mathbb{H}[\mathbb{V}_{o|s}]$. For brevity, the $O(\epsilon^2)$ is omitted from equations from here onwards. Taking the limit (i.e., $\mathbb{V}_{o|s}\rightarrow\infty$) may give the shot overhead of SA-LEM with syndrome rejection:

$$\Gamma_{SA\text{-}LEM}^{rej} = \lim_{\forall s\in s_{rej}:\mathbb{V}_{o|s}\rightarrow\infty} \mathbb{H}[\mathbb{V}_{o|s}] = \mathbb{P}(s\notin S_{rej})^{-1}\mathbb{H}[\mathbb{V}_{o|s} \mid s\notin S_{rej}] = \mathbb{P}_{acc}^{-1}\mathbb{H}[\mathbb{V}_{o|s} \mid acc],$$

where 'acc' may be a shorthand for 'accept'.

The sampling overhead of SA-LEM may be compared to the sampling overhead of ExtLEM (i.e., the 'naïve', syndrome-forgetful mitigation of logical errors). To make the comparison, a functional relation of the form $\mathbb{V}=f(\epsilon_L)$ may be assumed, between the infidelity $\epsilon_L$ to be mitigated, and a corresponding bound $\mathbb{V}$ on the single-shot variance of the EM protocol method.

Theorem 7 (Advantage of SA-LEM over ExtLEM in shot overhead): Let $\Gamma_{ExtLEM}=f(\epsilon_L)$ be a bound, as a function of the infidelity $\epsilon_L$ of a mitigated error channel $\Lambda_L$, on the shot overhead of ExtLEM with a given characterization-based EM protocol $EM(\Lambda_L)$. Assume that f may be monotonically increasing and convex. An embodiment of SA-LEM, with the same characterization-based EM protocol may be considered. The embodiment may be such that $EM_s=EM(\Lambda_{L|s})$, with inverse-variance weights $w_i\propto\mathbb{V}_{o|s_i}=f(\epsilon_{L|s_i})$ (e.g., Algorithm 5). The shot overhead of SA-LEM may only be lower than that of ExtLEM, due to a 'generalized mean inequality':

$$\Gamma_{SA\text{-}LEM} = \mathbb{H}[\mathbb{V}_{o|s}] \leq (f\circ\mathbb{E}\circ f^{(-1)})[\mathbb{V}_{o|s}] = \Gamma_{ExtLEM}$$

where equality may be if the conditioned infidelity $\epsilon_{L|s}$ may be uniform, i.e., $\epsilon_{L|s}=\epsilon_L$. This may lead to a uniform $\mathbb{V}_{o|s}$. Assuming f(x) does not happen to be of the form a/(b−x), an equality $\Gamma_{ExtLEM}=\Gamma_{ExtLEM}$ may occur only if $\epsilon_{L|s}$ is uniform.

Proof: The syndrome-conditioned variance bounds in SA-LEM may be given by $\mathbb{V}_{o|s}=f(\epsilon_{L|s})$, and therefore may lead to a shot overhead $\Gamma_{SA\text{-}LEM}=\mathbb{H}[\mathbb{V}_{o|s}]=\mathbb{H}[f(\epsilon_{L|s})]$. The shot overhead in ExtLEM may be given by, $\Gamma_{ExtLEM}=f(\epsilon_L)=f(\mathbb{E}[\epsilon_{L|s}])$. To compare these two expressions, the notations: $g(x)=x^{-1}$, and $f^{(-1)}$ being the inverse function of f (such that $(f^{(-1)}\circ f)(x)=x$), may be used. With this notation:

$$f^{(-1)}(\Gamma_{SA\text{-}LEM}) = f^{(-1)}(\mathbb{H}[f(\epsilon_{L|s})]) = (f^{(-1)}\circ g)(\mathbb{E}[(g^{(-1)}\circ f)(\epsilon_{L|s})])$$

and $f^{(-1)}(\Gamma_{ExtLEM})=\mathbb{E}[\epsilon_{L|s}]$. Since f may be convex and increasing, $f^{(-1)}$ may be concave. Together with the fact that g is convex and decreasing, this implies that $f^{(-1)}\circ g$ is convex. Using Jensen's inequality, it follows that:

$$\begin{aligned} f^{(-1)}(\Gamma_{SA-LEM}) &= (f^{(-1)}\circ g)(\mathbb{E}[(g^{(-1)}\circ f)(\epsilon_{L|s})]) \le \mathbb{E}[(f^{(-1)}\circ g)\circ(g^{(-1)}\circ f)(\epsilon_{L|s})] \\ &= \mathbb{E}[\epsilon_{L|s}] \\ &= f^{(-1)}(\Gamma_{ExtLEM}). \end{aligned}$$

Applying f to both sides of the inequality:

$$\mathbb{H}[\mathbb{V}_{o|s}] = \Gamma_{SA-LEM} \le \Gamma_{ExtLEM} = (f\circ\mathbb{E}\circ f^{(-1)})[\mathbb{V}_{o|s}]$$

Thus, SA-LEM may only reduce the shot overhead relative to ExtLEM. The inequality may reduce to an equality if the conditioned infidelity $\epsilon_{L|s}=\epsilon_L$ may be independent of the syndrome vector s, and $\Gamma_{SA\text{-}LEM}=\Gamma_{ExtLEM}=f(\epsilon_L)$. If $\epsilon_{L|s}$ is not uniform, Jensen's inequality may be reduced to an equality only if $f^{(-1)}\circ g$ is affine, so f(x)=a/(b−x) for some constants a, b.

Example: A simplified but representative expression for the shot overhead in EM protocols may be given by $f(\epsilon_L)=e^{\lambda V\epsilon_L}$, where V may be the circuit volume and λ may be an order-1 coefficient that may be referred to as the 'blowup rate'. λ may be significant in determining the efficiency of EM methods. As an example, EM based QP distributions may be described as having λ=4 (an accurate expression is provided hereinbelow). TEM has been argued to have λ=2. Lower bounds on the shot overhead of EM protocols are usually of this exponential form. $f(\epsilon_L)=e^{\lambda V\epsilon_L}$ is monotonically increasing and convex. Thus:

$$\Gamma_{ExtLEM} = (f\circ\mathbb{E}\circ f^{(-1)})[\mathbb{V}_{o|s}] = \exp(\mathbb{E}[\log\mathbb{V}_{o|s}]) = \mathbb{G}[\mathbb{V}_{o|s}]$$

where $\mathbb{G}$ may denote the 'geometric expectation'. The GM-HM inequality then shows that:

$$\Gamma_{SA-LEM} = \mathbb{H}[f(\epsilon_{L|s})] \le \mathbb{G}[f(\epsilon_{L|s})] = \Gamma_{ExtLEM}$$

in accordance with Theorem 7.

As demonstrated below, the conditioned infidelity $\epsilon_{L|s}$ may generically be highly non-uniform, leading to a significantly reduced shot overhead in SA-LEM.

In the proof of Theorem 7, it was assumed that SA-LEM may assign a different mitigation protocol $EM_s=EM(\Lambda_{L|s})$ to each syndrome vector. The extension to any partition of syndromes into subsets is straight forward. Every syndrome vector can be written in terms of its entries, $s=(s^\alpha)_{\alpha\in A}$, where each $s^\alpha$ may be the syndrome of a different logical operation in the circuit. Given a partition $$\{S_k^\alpha\}_{k=1}^{K^\alpha}$$

of the set of syndromes of each logical operation (such that each $$S_k^\alpha$$

is a subset of syndrome), $k=(k^\alpha)_{\alpha\in A}$ may denote a multi-index corresponding to the subset of syndrome vectors $$S_k = \{s \mid s^\alpha \in S_{k^\alpha}^\alpha\ \forall\ \alpha\}.$$

The shot sampling overhead of SA-LEM, given the partition $\{S_k\}$, may be given by $$\Gamma_{SA-LEM}^{\{s_k\}} = \mathbb{H}[\mathbb{V}_{o|k}],$$

where $\mathbb{V}_{o|k}=\mathbb{V}_{o|S_k}$. This expression, along with Theorem 7, shows that in terms of the shot overhead, it may always be better to completely partition syndromes to singletons, such that $S_k=\{s\}$. As:

$$\mathbb{V}_{o|k} = f(\epsilon_{L|k}) = f(\mathbb{E}[\epsilon_{L|s}|k]) = f(\mathbb{E}[f^{(-1)}(\mathbb{V}_{o|s})|k]) \ge \mathbb{H}[\mathbb{V}_{o|s}|k]$$

then:

$$\Gamma_{SA-LEM}^{\{S_k\}} = \mathbb{H}[\mathbb{V}_{o|k}] \ge \mathbb{H}[\mathbb{H}[\mathbb{V}_{o|s} \mid k]] = \mathbb{H}[\mathbb{V}_{o|s}] = \Gamma_{SA-LEM}.$$

It may be useful to work with coarser partitions, as discussed hereinabove.

For a general partition $\{S_k\}$ including a rejected subset, the following equality may hold:

$$\Gamma_{SA-LEM}^{\{S_k\},rej} = \mathbb{P}_{acc}^{-1}\mathbb{H}[\mathbb{V}_{o|k} \mid acc].$$

Blowup-Rate of SA-LEM with OP Distributions

To demonstrate that the reduction in shot overhead due to SA-LEM is generically significant, SA-LEM with QP distributions (Algorithm 5') may be used as a representative example. In this case $$\Gamma_{SA-LEM} = \mathbb{H}[\mathbb{V}_{o|s}] = \mathbb{H}[W_s^2]\cdot W_s^2 = \prod_{j=1,\ldots D}\left(W_{s_{j;1}}^{(j)}\right)^2$$

may be a product of QP norms that may correspond to different circuit layers. Attention may be restricted, without loss of generality, to the case where the mitigated error channel $$\Lambda^{(j)}_{L|s_{j:1}} = \Lambda^{(j)}_{L|s_j}$$

for the jth layer may be conditioned only on the syndromes $s_j$ measured in that layer (for all j). The QP norms $$W^{(j)}_{s_{j:1}} = W^{(j)}_{s_j}$$

may become independent random variables, and:

$$\Gamma_{SA\text{-}LEM} = \mathbb{H}[W_s^2] = \prod_{j=1}^{D} \mathbb{H}\left[\left(W^{(j)}_{s_j}\right)^2\right]$$

With a specific QP distribution described hereinbelow as an example, the following equality may hold:

$$(W_s^{(j)}j)^2 = \left(1 - 2\epsilon^{(j)}_{L|s_j}\right)^{-2}.$$

The sampling overhead of ExtLEM may similarly be given by:

$$\Gamma_{ExtLEM} = W^2 = \prod_{j=1}^{D} (W^{(j)})^2,$$

with $$(W^{(j)})^2 = (1 - 2\epsilon_L^{(j)})^{-2}.$$

To compare the two expressions, the following equality is noted:

$$(W^{(j)})^2 = \left(1 - 2\mathbb{E}\left[\epsilon_{L|s_j}\right]\right)^{-2} = \mathbb{E}_{-1/2}\left[\left(W^{(j)}_{s_j}\right)^2\right],$$

where 'power expectation' may be defined as: $\mathbb{E}_a[x] = \mathbb{E}[x^a]^{1/a}$, parametrized by $a \in \mathbb{R}$. The harmonic, geometric and arithmetic expectations may be obtained for $a=-1,0,1$, respectively. I.e., $\mathbb{H} = \mathbb{E}_{-1}$, $\mathbb{G} = \mathbb{E}_0$, $\mathbb{E} = \mathbb{E}_1$. A power expectation inequality $\mathbb{E}_a[X] \leq \mathbb{E}_b[X]$ may hold for all $a \leq b$, which may generalize the AM-GM-HM inequality. Therefore:

$$\Gamma_{SA\text{-}LEM} = \prod_{j=1}^{D} \mathbb{E}_{-1}\left[\left(W^{(j)}_{s_j}\right)^2\right] \leq \prod_{j=1}^{D} \mathbb{E}_{-1/2}\left[\left(W^{(j)}_{s_j}\right)^2\right] = \Gamma_{ExtLEM}.$$

Thus, Theorem 7 is confirmed again. Also demonstrated explicitly is that the ratio between $\Gamma_{SA\text{-}LEM}$ and $\Gamma_{ExtLEM}$ may be exponential in the circuit depth D (and more accurately, in the causal volume V of the measured observable). Assuming, for simplicity, that the circuit layers may have equal QP norms $$W^{(j)}_{s_j} = W_s,$$

the following equality may hold:

$$\frac{\Gamma_{SA\text{-}LEM}}{\Gamma_{ExtLEM}} = \left(\frac{\mathbb{E}_{-1}[W_s^2]}{\mathbb{E}_{-1/2}[W_s^2]}\right)^D.$$

Any non-uniformity in $\epsilon_{L|s}$, and consequently, in $$W_s^2,$$

may translate to a ratio $\mathbb{E}_{-1}/\mathbb{E}_{-1/2} < 1$, which may be suppressed exponentially with D. To quantify this effect, the blowup rate of SA-LEM may be:

$$\lambda_{SA\text{-}LEM} := (\epsilon_L D)^{-1} \log \Gamma_{SA\text{-}LEM} = \epsilon_L^{-1} \log \mathbb{H}[W_s^2]$$

where the blowup rate of ExtLEM may be:

$$\lambda_{ExtLEM} = (\epsilon_L D)^{-1} \log \Gamma_{ExtLEM} = \epsilon_L^{-1} \log\left[(1 - 2\epsilon_L)^{-2}\right] = 4 + O(\epsilon_L)$$

Case Study: Binary SA-LEM with QP Distributions

To analytically compute an exemplary blowup-rate $\lambda_{SA\text{-}LEM}$, a binary partition of the syndromes in each layer may be considered. That is, the syndromes may be partitioned into only two syndrome subsets $S_0$ and $S_1$. Each subset may have a corresponding EM protocols $EM_0 = EM(\Lambda_{L|0})$, $EM_1 = EM(\Lambda_{L|1})$. The corresponding EM protocols may be given by QP distributions $$QP_0 \approx \Lambda^{-1}_{L|0}, \text{ and } QP_1 \approx \Lambda^{-1}_{L|1}.$$

Assuming a t-FT EC scheme, the set $S_0$ may include all syndromes which can be obtained due to a fault path with weight $\leq t$, and $$S_1 = S_0^c$$

to be the complementary subset. The probability for measuring a syndrome in $S_1$ is $p_1 = \mathbb{P}(s \in S_1) = O(\epsilon^{t+1})$, where $\epsilon$ may be the physical infidelity. The assumption of t-FT implies $\epsilon_L = O(\epsilon^{t+1})$. Assuming that $\epsilon_L = \Theta(\epsilon^{t+1})$ implies $p_1 = O(\epsilon_L)$, and $p_0 = 1 - O(\epsilon_L)$. It follows that $\epsilon_{L|0} = \mathbb{P}(\text{error}|s \in S_0) \leq \epsilon_L / p_0 = O(\epsilon_L)$. However, $\epsilon_{L|1} = \mathbb{P}(\text{error}|s \in S_1) \leq \epsilon_L / p_1$ may not be small, and may take any value in [0,1]. Generically $\epsilon_{L|1}$ may not be small, since the leading contribution to $S_1$ may come from weight-(t+1) fault-paths, and these fault-paths may not be guaranteed to have a unique (with high probability) recovery operation.

$\lambda_{SA\text{-}LEM}$ may be parameterized as a function of $\epsilon_{L|1}$ and $p_{1|L} = \mathbb{P}(s \in S_1|\text{error})$, which may be the fraction of logical errors contained in $S_1$. The following equalities may hold: $p_1 = \epsilon_L p_{1|L} / \epsilon_{L|1}$ (Bayes' theorem), and $\epsilon_L = p_0 \epsilon_{L|0} + p_1 \epsilon_{L|1}$. Thus:

$$\lambda_{SA\text{-}LEM} = \epsilon_L^{-1}\log \mathbb{H}[W_k^2] = -\epsilon_L^{-1}\log E[W_k^{-2}] = -\epsilon_L^{-1}\log(p_0 W_0^{-2} + p_1 W_1^{-2})$$

Defining $$W_k^{-2} = W^{-2}(\epsilon_{L|k}),$$

and assuming a power series $$\begin{aligned} W^{-2}(x) = \sum_{m=0}^{\infty} c_m x^m = 1 - 4x + \sum_{m=2}^{\infty} c_m x^m:\ p_0 W_0^{-2} + p_1 W_1^{-2} &= \sum_{m=0}^{\infty} c_m(p_0\epsilon_{L|0}^m + p_1\epsilon_{L|1}^m) \\ &= 1 - 4\epsilon_L + \sum_{m=2}^{\infty} c_m(p_0\epsilon_{L|0}^m + p_1\epsilon_{L|1}^m) \\ &= 1 - 4\epsilon_L + p_1\sum_{m=2}^{\infty} c_m\epsilon_{L|1}^m + O(\epsilon_L^2) \\ &= 1 - 4\epsilon_L + p_1[W^{-2}(\epsilon_{L|1}) - 1 + 4\epsilon_{L|1}] + O(\epsilon_L^2) \\ &= 1 - \epsilon_L\left[4 - p_{1|L}\frac{W^{-2}(\epsilon_{L|1}) - (1 - 4\epsilon_{L|1})}{\epsilon_{L|1}}\right] + O(\epsilon_L^2), \end{aligned}$$

and so $$\lambda_{SA\text{-}LEM} = -\epsilon_L^{-1}\log(p_0 W_0^{-2} + p_1 W_1^{-2}) = 4 - p_{1|L}\frac{W^{-2}(\epsilon_{L|1}) - 1 + 4\epsilon_{L|1}}{\epsilon_{L|1}} + O(\epsilon_L).$$

For $W(x)=(1-2x)^{-1}$ a very simple expression may be obtained:

$$\lambda_{SA\text{-}LEM} = 4 - 4p_{1|L}\epsilon_{L|1} + O(\epsilon_L)$$

Since $\epsilon_{L|1}$ may not generically be small, the blowup rate of $\lambda_{SA\text{-}LEM}$ may be significantly reduced relative to $\lambda_{ExtLEM}=4+O(\epsilon_L)$, as long as the set $S_1$ may carry a significant fraction $p_{1|z}$ of logical errors.

For large $\epsilon_{L|1}$ it may be reasonable to reject the set $S_1$ instead of mitigating it with $EM_1$. In this case the blow-up rate may be:

$$\begin{aligned} \lambda_{SA\text{-}LEM}^{rej} &= \epsilon_L^{-1}\log(\mathbb{P}_{acc}^{-1}\mathbb{H}[\mathbb{V}_{o|s}|acc]) \\ &= \epsilon_L^{-1}\log(p_0^1 W_0^2). \\ &= \epsilon_L^{-1}[-\log(1-p_1) + \log W_0^2] \\ &= \epsilon_L^{-1}[p_1 + 4\epsilon_{L|0}] + O(\epsilon_L) \\ &= p_{1|L}\epsilon_{L|1}^{-1} + 4p_{0|L}p_0^{-1} + O(\epsilon_L) \\ &= \epsilon_{L|1}^{-1}p_{1|L} + 4(1 - p_{1|L}) + O(\epsilon_L) \\ &= 4 - p_{1|L}(4 - \epsilon_{L|1}^{-1}) + O(\epsilon_L). \end{aligned}$$

As long as $\epsilon_L>1/4$, this simpler version of SA-LEM may also improve the blow-up rate relative to ExtLEM, but, as expected, the improvement may always be larger when using $EM_1$ as opposed to rejecting $S_1$.

In this example, these two cases may give the same blow-up rate for $\epsilon_{L|1}=1/2$, where (ignoring $O(\epsilon_L)$ corrections)

$$\lambda_{SA\text{-}LEM}^{rej} = \lambda_{SA\text{-}LEM} = 4 - 2p_{1|L}.$$

This may happen because, in this example, $W(1/2)=\infty$, such that inverse variance weighting reduces to rejection of $S_1$.

The squared QP norm $W^2(\epsilon_{L|1})=(1-2\epsilon_{L|1})^{-2}$ may be obtained from a series expansion which can be used to invert any channel $\Lambda_{L|1}$ with $\epsilon_{L|1}<1/2$. For $\epsilon_{L|1}>1/2$ the expansion may not converge. However, the expression $W^2(\epsilon_{L|1})=(1-2\epsilon_{L|1})^{-2}$ may be valid for all $\epsilon_{L|1}\neq 1/2$ if $\Lambda_{L|1}=(1-\epsilon_{L|1})I+\epsilon_{L|1}\sigma$ may be a Pauli channel with a single Pauli error $\sigma$, since:

$$QP_1 = \Lambda_{L|1}^{-1} = |1 - 2\epsilon_{L|1}|\,\mathrm{sgn}(1 - 2\epsilon_{L|1})((1 - \epsilon_{L|1})I - \epsilon_{L|1}\sigma)$$

Figure 10A:
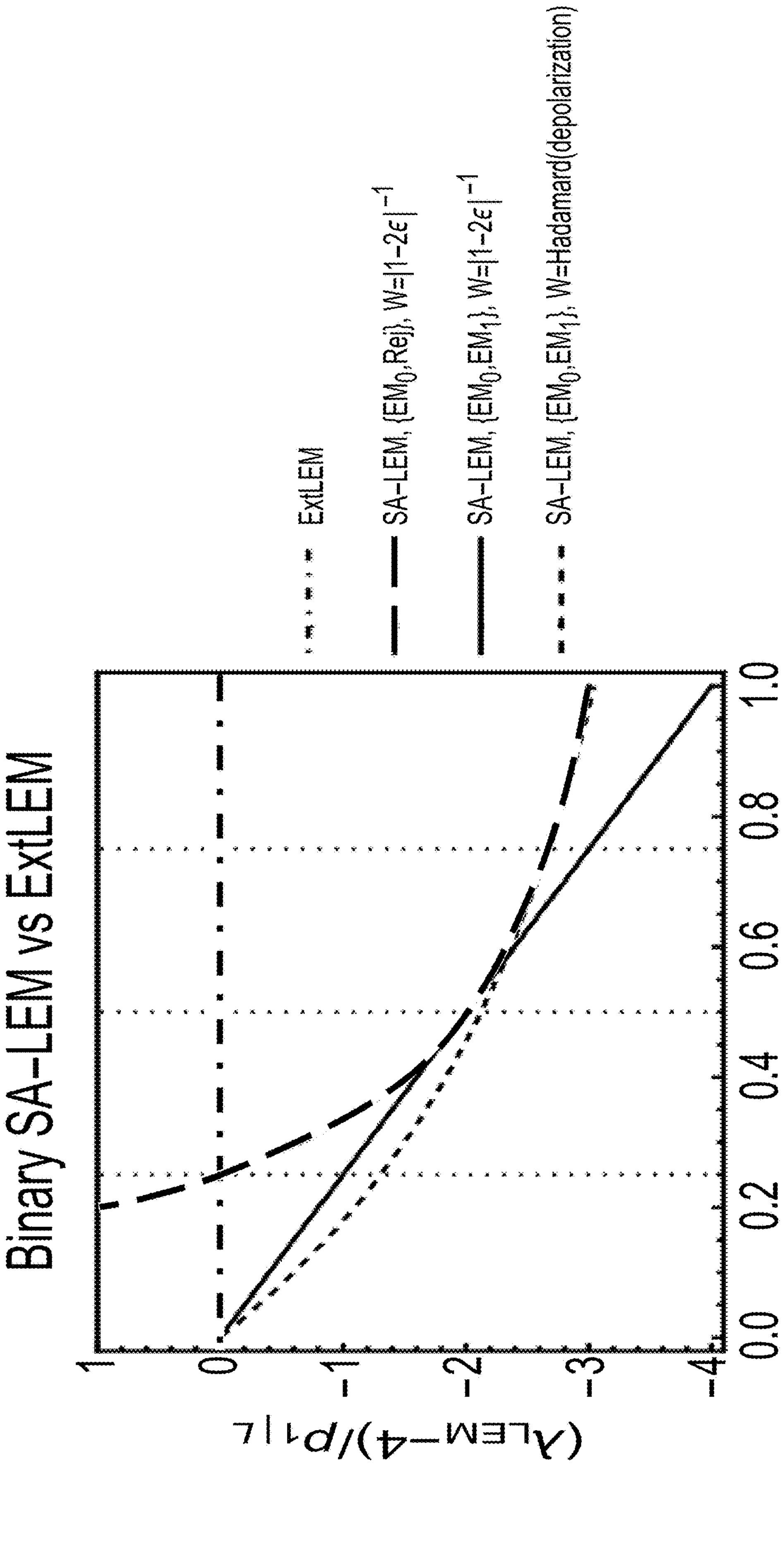
FIG. 10A-10C shows graphs illustrating a comparison of methods according to the present disclosure to methods known in the art.

For $\epsilon_{L|1}>1/2$ this example may correspond to a 'decoding error', since, assuming maximum-likelihood decoding, the identity operator may require to have the highest probability in the logical error channel $\Lambda_{L|1}$. Accordingly, the QP norm may be decreasing in the range $1/2<\epsilon_{L|1}\leq 1$, and may reduce to a deterministic decoding correction $$QP_1 = \Lambda_{L|1}^{-1} = \sigma$$

at $\epsilon_{L|1}=1$, with $W_1=1$. This example demonstrates an important property of SA-LEM: SA-LEM can correct decoding errors. FIG. 10A illustrates the blow-up rates for ExtLEM and some embodiments of SA-LEM discussed herein in this example.

Generically, a large $\epsilon_{L|1}$ may not correspond to a decoding error, and the QP norm may generically be large in this regime. FIG. 10A illustrates such a generic example based on a 'Hadamard QP distribution' (described below) of a depolarizing channel.

In more detail, FIG. 10A shows a line-graph, illustrating blowup rate $\lambda_{LEM}$ of a few versions of binary SA-LEM, compared to that of ExtLEM. The dataset of ExtLEM is drawn by a dot-dashed line. The binary SA-LEM is defined here by two complementary subsets of syndromes, $S_0$, $S_1$, defined such that $p_1=\mathbb{P}(S_1)=O(\epsilon_L)$. The blowup rate is parameterized with $\epsilon_{L|1}=\mathbb{P}(\text{error}|S_1)$ and $p_{1|L}=\mathbb{P}(S_1|\text{error})$.

In a first embodiment of SA-LEM, the subset $S_0$ is mitigated using a QP distribution with norm $W(\epsilon_{L|0})=|1-2\epsilon_{L|0}|^{-1}$, while the subset $S_1$ is rejected. Improvement over ExtLEM is obtained for $\epsilon_{L|1}>1/4$. The dataset of this embodiment of SA-LEM is drawn by a coarsely-dashed line.

In a second embodiment of SA-LEM, the subset $S_1$ is now mitigated using a QP distribution with norm $W(\epsilon_{L|1})=|1-2\epsilon_{L|1}|^{-1}$. The region $\epsilon_{L|1}<1/2$ corresponds to generic error channels $\Lambda_{L|1}$ with infidelity $\epsilon_{L|1}$. At $\epsilon_{L|1}=1/2$, $W(\epsilon_{L|1})=\infty$, reducing $EM_1$ to 'Reject'. The region $\epsilon_{L|1}>1/2$ describes a single-Pauli error channel, which is an idealized model for a decoding error. The dataset of this embodiment of SA-LEM is drawn by a solid line.

A third embodiment of SA-LEM is provided to illustrate a more generic example for the behavior at large $\epsilon_{L|1}$. Such behavior may be obtained by considering the 'Hadamard QP distribution' of the depolarizing channel on a single logical qubit. At $\epsilon_{L|1}=3/4$, $W(\epsilon_{L|1})=\infty$, reducing $EM_1$ to 'Reject,' and the region $\epsilon_{L|1}>3/4$ describes a more generic model for a decoding error. The dataset of this embodiment of SA-LEM is drawn by a finely-dashed line.

A Lower Fault-Tolerance Threshold

When using ExtLEM, the sampling overhead $\Gamma_{ExtLEM}=e^{\lambda\epsilon_L}$ may be identical to that of error mitigation without EC, $\Gamma_{EM}=e^{\lambda\epsilon}$, apart from the replacement of the physical infidelity $\epsilon$ by the logical infidelity $\epsilon_L$. As a result, the sampling overhead of ExtLEM becomes lower than that of EM when $\epsilon_L<\epsilon$. This condition defines the standard EC threshold (also referred to as the 'fault-tolerance threshold', or 'fault-tolerance pseudo-threshold'), which is the physical error below which EC becomes useful relative to noisy quantum computation.

Thus, the 'ExtLEM threshold', which may be defined as the physical error $\epsilon$ where $\Gamma_{ExtLEM}=\Gamma_{PhysEM}$, is identical to the standard EC threshold, where $\epsilon_L=\epsilon$. As described hereinabove, SA-LEM may have a lower sampling overhead $\Gamma_{IntLEM}=e^{\lambda'\epsilon_L}\leq\Gamma_{ExtLEM}$, which may be lower than $\Gamma_{EM}$ already when $\epsilon_L<(\lambda/\lambda')\epsilon$. Since $\lambda/\lambda'>1$, the 'SA-LEM threshold', which may be defined as the physical error E where $\Gamma_{IntLEM}=\Gamma_{EM}$, may be significantly higher than the standard EC threshold. Thus, as opposed to standard lore I the art, EC may become useful at error rates significantly above the standard EC threshold.

Figure 10B:
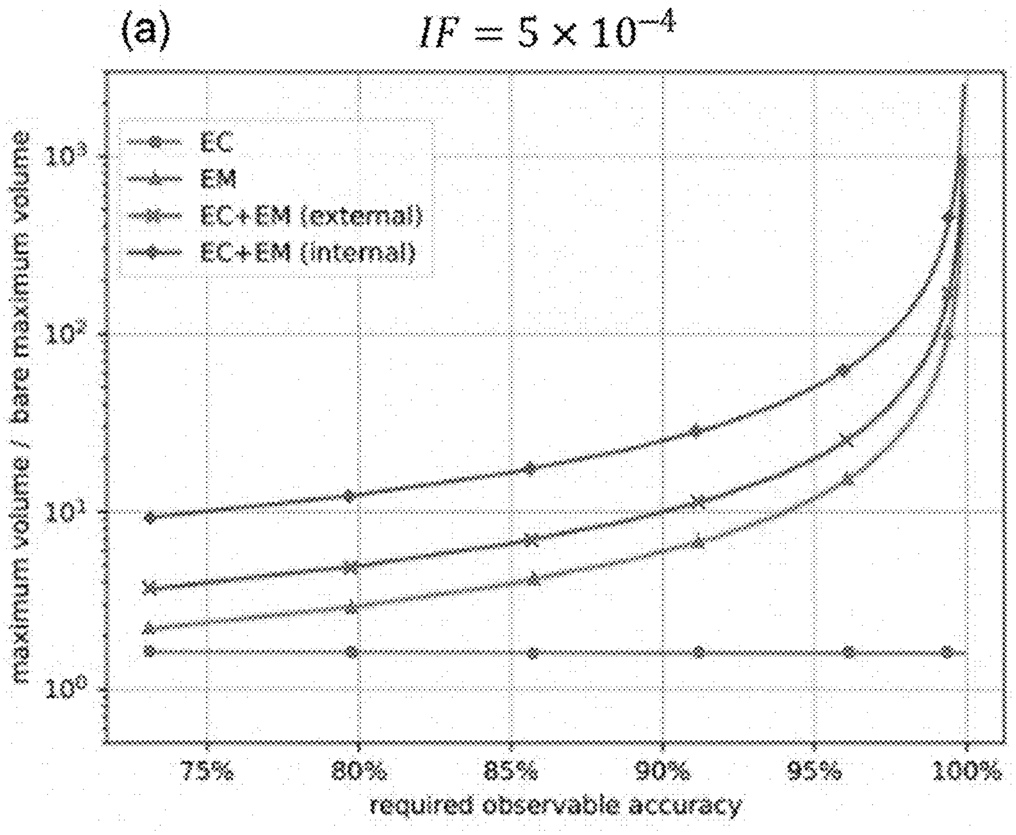
Figure 10B:
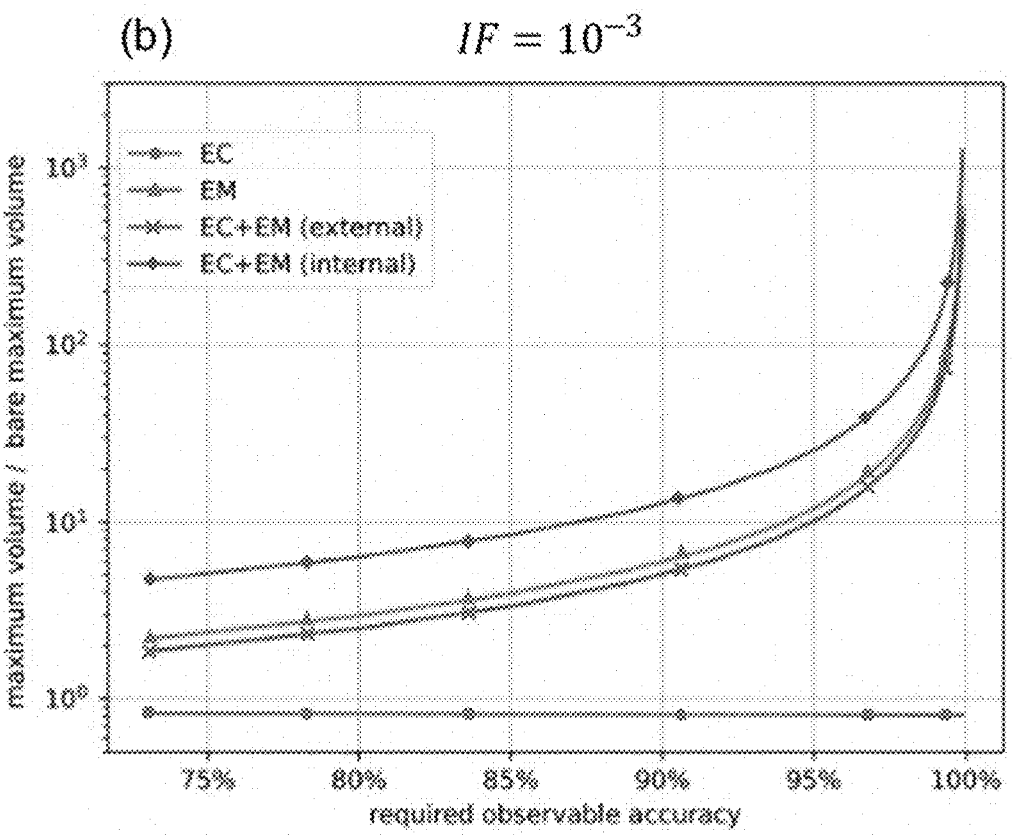

FIG. 10B illustrates an example of this effect. In more detail, FIG. 10B illustrates a comparison of the circuit volume (CV) boost due to EC, EM, for ExtLEM, and exemplary embodiment of SA-LEM. Numerical simulations of repeated EC cycles (a logical memory circuit), with the well-known Steane code (a 7-qubit color code, c.f. FIG. 3C and description associated thereof hereinabove).

The datasets are marked as follows:

- The dataset associated with performing only error-correction is marked with circular markers.
- The dataset associated with performing only un-biased error-mitigation is marked with triangular markers.
- The dataset associated with performing ExtLEM is marked with x markers.
- The dataset associated with performing SA-LEM is marked with diamond markers.

SA-LEM is performed with two syndrome subsets. A first subset is a rejected subset $S_{rej}$, containing all syndromes which do not admit a unique lowest weight recovery operation. A second subset is the (i.e., complementary to the first subset). An EM protocol is applied based on QP distributions. Each physical two-qubit gate carries a physical infidelity $\epsilon$, due to a tensor product of two single-qubit depolarizing channels after the gate.

Both SA-LEM and ExtLEM are based on error models produced by P2LC. The dataset labeled EC+PS corresponds to performing post-selection based on the same rejected subset $S_{rej}$.

Panel (a) shows the following. The maximal circuit volume possible with each method, is computed as a function of: the required output accuracy, relative to the volume possible with bare execution (while maintaining the same accuracy). Each method is allowed the same small sampling overhead $\Gamma=2$, such that $\Gamma\varepsilon^{-2}$ shots are allowed at accuracy $1-\varepsilon$. For an infidelity of $\epsilon=5\times10^{-4}$, slightly below the Steane code's threshold, logical errors are slightly smaller than physical errors, and EC provides a small volume boost compared to bare (i.e., no EC, no EM). This volume boost does not improve with required accuracy, because EC suffers a significant bias due to logical errors. Un-biased EM, applied directly to physical qubits, and improved on EC in this case.

ExtLEM, where EM is applied to logical qubits, enjoys the benefits of both EC and EM, and provides a larger CV boost than EM. SA-LEM exploits syndrome data to perform a more efficient mitigation of logical errors, significantly boosting available CVs relative to EM alone, EC alone and ExtLEM. In particular, CVs are boosted by orders of magnitude relative to EC.

EC+PS provides a significant advantage over EC, and at low accuracies even beats ExtLEM, but always underperforms relative to SA-LEM, in particular at high accuracy. This is due to the residual logical error $\epsilon_{l|acc}$, which is un-mitigated.

Panel (b) shows the following. SA-LEM provides a significant advantage over all competing strategies, even above the Steane code threshold, at an infidelity $\epsilon=10^{-3}$, that has already been demonstrated experimentally herein. Above the threshold, logical errors are larger than physical errors, and EC only reduces the available CV relative to the bare QPU. Accordingly, ExtLEM underperforms relative to EM, and EC appears to be useless. However, SA-LEM still provides a significant advantage over EM (as well as over ExtLEM and EC), making EC useful even above the EC threshold. The infidelity at which EM underperforms relative to SA-LEM marks a significantly higher new kind of 'EC threshold. {already sent to cl. up to here}

Optimal Rejection

Hereinabove it was shown that $$\lambda_{SA-LEM}^{rej}=\lambda(1-p_{1|L})+\epsilon_{L|1}^{-1}p_{1|L}+O(\epsilon_L).$$

This may be an average of the 'bare' blowup rate $\lambda=4+O(\epsilon_L)$ for mitigating $S_0$ with a QP distribution, and of $$\epsilon_{L|1}^{-1},$$

which may be the blowup rate for the rejection of $S_1$. A reduction of the blowup rate relative to $\lambda_{ExtLEM}=\lambda$ may be obtained if $\epsilon_{L|1}\geq\lambda^{-1}$. This motivates the rejection of syndromes s in which the most likely recovery operation has probability $p_{ML|s}\leq1-\lambda^{-1}$. As an example, if $\lambda=4$, syndromes with $p_{ML|s}\leq3/4$ may be rejected. Motivated by this observation, construction of an optimal set of rejected syndromes may be performed iteratively. Starting with the syndrome that may have the smallest $p_{ML|s}$, and then adding in each iteration the remaining syndrome with smallest $p_{ML|s}$. As a function of these iterations, $\epsilon_{L|1}$ may be monotonically decreasing, while $p_{1|L}$ may be monotonically increasing. The blowup rate $$\lambda_{SA-LEM}^{rej}$$

may, generally, monotonically decrease to a minimum, and then may monotonically increase. The minimum may signal the stopping condition for iterations, and may define the optimal rejected set $S_1$ of rejected syndromes.

The above strategy can be used more generally in SA-LEM to optimize the shot overhead $$\Gamma_{SA-LEM}^{\{S_k\},rej}=\mathbb{P}_{acc}^{-1}\mathbb{H}[\mathbb{V}_{0|k}|acc],$$

or the QPU time overhead, over the rejected subset $S_{rej}$. For the shot overhead, a non-empty $S_{rej}$ can only be obtained if accepted syndromes are not partitioned (e.g., binary SA-LEM with rejection, discussed hereinabove). For the QPU time overhead, a non-empty $S_{rej}$ can be obtained, even if accepted syndromes are fully partitioned to singletons, due to the possible reduction in the duration of rejected shots.

QP Distributions for $\Lambda_L$

Since P2LC (in embodiments that may combine SA-LEM with P2LC) may output an estimate for the probability vector $p_\sigma$ corresponding $$\Lambda_l = \Lambda^{(j)}_{l|k} = \sum\nolimits_\sigma p_\sigma \sigma,$$

it may be convenient to work with a QP distribution that can be efficiently computed and sampled from a given $p_\sigma$. This may be significant in cases where $\Lambda_l$ may be defined on a large number N>>1 of logical qubits, in which case $p_\sigma$ may be a sparse vector, with O(N) non-zero entries out of a total of $4^N$ entries (e.g., assuming a local EC scheme). Given $p_\sigma$, such a QP distribution may be obtained for $$\Lambda_l^{-1}$$

by expanding:

$$\begin{aligned}\Lambda_l^{-1} &= \left[I + \sum_{\sigma\neq I} p_\sigma(\sigma - I)\right]^{-1} \\ &= \sum_{k\in\mathbb{N}_0}\left[\sum_{\sigma\neq I} p_\sigma(I-\sigma)\right]^k \\ &= \sum_{k\in\mathbb{N}_0}\left[\sum_{\sigma}(-1)^{1+\delta_{\sigma,I}} a_\sigma \sigma\right]^k \\ &= \sum_{k\in\mathbb{N}_0}\left[\sum_{\sigma_1,\ldots,\sigma_k}(-1)^{\#\sigma\neq I} a_{\sigma_1}\cdots a_{\sigma_k}\sigma_1\cdots\sigma_k\right]^k,\end{aligned}$$

Where the following definition may hold: $a_I = \Sigma_{\sigma\neq I} p_\sigma$, and $a_\sigma = p_\sigma$ for $\sigma\neq I$.

$\Sigma_\sigma a_\sigma = 2\Sigma_{\sigma\neq I} p_\sigma = 2\epsilon$ may be twice the error probability $\epsilon$, which may be equal to the infidelity. The notation $\#\sigma\neq I$ may be a shorthand for the number of Paulis among $\sigma_1 \ldots \sigma_k$ which may differ from the identity. To sample from this QP distribution, sampling $k\in N_0$ with probability $(1-2\epsilon)(2\epsilon)^k$ may be performed. Then k Pauli operators $\sigma_i$ may be sampled, each with probability $a_{\sigma_i}/2\epsilon$. These Pauli operators may then be multiplied to give a Pauli operation $\sigma=\Pi\sigma_i$, which may be inserted to the circuit (where error-mitigation is desired) at the position of $\Lambda_l$. This an example for the 'circuit modification' part of EM protocols. The final part of the QP sampling procedure may be done by multiplying the modified circuit outcome by the sign $(-1)^{\#\sigma\neq I}$ and QP norm $W=(1-2\epsilon)^{-1}$, which is an example for the 'post-processing' part of EM protocols.

The above QP norm is near-optimal for small E, in the sense that $W=1+2\epsilon+O(\epsilon^2)$, which can be shown to match, at leading order, a rigorous lower bound on QP norms. At $\epsilon=\frac{1}{2}$ the QP norm explodes, signalling the convergence radius of the above series expansion, which may be valid for $\epsilon<\frac{1}{2}$.

In the context of SA-LEM, $$\epsilon = \epsilon^{(j)}_{l|k} = \mathbb{P}(\text{logical err} \,\&\, k)/\mathbb{P}(k)$$

may be a conditioned logical infidelity, and can therefore be large (as discussed in more detail hereinbelow), and in particular above ½, even though the logical infidelity $\epsilon_l = \mathbb{P}(\text{logical err})$ may be small. Accordingly, a QP distribution which may be valid for every $\epsilon\in[0,1]$ may be useful. Such a distribution can be constructed by mapping from the Choi basis in which $\Lambda=\Sigma_\sigma p_\sigma \sigma$ is written, to the Pauli bases, where $\Lambda$ is diagonal, inverting $\Lambda$, and returning to the Choi basis. These basis changes may correspond to a Hadamard transform and its inverse, over $\mathbb{Z}_{2N}$. The diagonal entries in the Pauli basis ('Pauli fidelities') may be given by $f_\sigma=\Sigma_{\sigma,\sigma'} p_{\sigma'}(-1)^{\sigma'\cdot\sigma}$, where $(-1)^{\sigma'\cdot\sigma}=\pm1$ if $\sigma\sigma'=\pm\sigma'\sigma$. Parameterizing $\sigma=X^iZ^j$ where $i, j\in\{0,1\}^n$, leads to $(-1)^{\sigma'\cdot\sigma}=(-1)^{i\cdot j'-i'\cdot j}=(-1)^{(i,j)\cdot(j',i')}$, which shows that $f=H[p]$ is the Hadamard transform of p over $\mathbb{Z}_{2N}$, that maps $(i, j)\mapsto(j', i')$. Therefore $$\Lambda^{-1} = \sum\nolimits_\sigma p_\sigma^{(-1)}\sigma,$$

with $$\begin{aligned}p_\sigma^{(-1)} &= 4^{-N}\sum_{\sigma'} f_{\sigma'}^{-1}(-1)^{\sigma'\cdot\sigma} \\ &= 4^{-N}\sum_{\sigma'}\frac{1}{\sum_{\sigma''}p_{\sigma''}(-1)^{\sigma''\cdot\sigma'}}(-1)^{\sigma'\cdot\sigma}.\end{aligned}$$

The QP norm may be:

$$W = 4^{-N}\sum\nolimits_\sigma\left|p_\sigma^{(-1)}\right| = \sum\nolimits_\sigma\left|\sum\nolimits_{\sigma'}\frac{1}{\sum_{\sigma''}p_{\sigma'}(-1)^{\sigma''\cdot\sigma'}}(-1)^{\sigma'\cdot\sigma}\right|$$

which may only diverge when one of the Pauli fidelities vanishes, and A may not be invertible (a pseudo-inverse may be used in this case). The coefficients in this 'Hadamard QP decomposition' may not (at least naively) be computed for a large number N of logical qubits. However, if EC may be done independently in k-qubit blocks, the leading-order mitigation of logical errors may be done independently for each block.

OP Distribution for $\Lambda_e$

A QP distribution for $$\Lambda_e^{-1} = \Lambda_{in}\Lambda_{out}^{-1}$$

may be constructed directly from $$\Lambda_{out} = \Lambda_{out}^{(j)} \text{ and } \Lambda_{in} = \Lambda_{in}^{(j+1)},$$

with an approximately-minimal QP norm. This may be done via:

$$\begin{aligned}\Lambda_e^{-1} &= \Lambda_{out}^{-1}\Lambda_{in} \\ &= I + \Lambda_{out}^{-1}(\Lambda_{in} - \Lambda_{out}) \\ &= I + [I + (\Lambda_{out} - I)]^{-1}(\Lambda_{in} - \Lambda_{out}) \quad . \\ &= I + (\Lambda_{in} - \Lambda_{out})\sum_{k=0}^{\infty}(-1)^k(\Lambda_{out} - I)^k\end{aligned}$$

Defining $\Lambda_{out}=I+\Sigma_\sigma a_\sigma\sigma$ (where $a_\sigma>0$ for $\sigma\neq I$ and $a_I=-\Sigma_{\sigma\neq I} a_\sigma>-1$) and $\Lambda_{in}=I+\Sigma_\sigma b_\sigma\sigma$ (with similar constraints):

$$\begin{aligned}\Lambda_e^{-1} &= I + \left[\sum_\sigma (a_\sigma - b_\sigma)\sigma\right] \\ &\quad \left[\sum_{k=0}^{\infty}(-1)^k \sum_{\sigma_1,\dots,\sigma_k} a_{\sigma_1}\dots a_{\sigma_k}\sigma_1\dots\sigma_k\right] \\ &= I + \left[2\epsilon_{nc}\sum_\sigma(-1)^{\sigma\notin nc}q_\sigma\sigma\right] \\ &\quad \left[W_{out}\sum_{k=0}^{\infty}(-1)^k p_k \sum_{\sigma_1,\dots,\sigma_k}\right. \\ &\quad \left.(-1)^{\#\sigma=1}p_{\sigma_1}\dots p_{\sigma_k}\sigma_1\dots\sigma_k\right] \\ &= W_e\left\{IW_e^{-1} + 2\epsilon_{nc}W_e^{-1}W_{out}\right. \\ &\quad \sum_\sigma(-1)^{\sigma\notin nc}q_\sigma\sigma\sum_{k=0}^{\infty}p_k \\ &\quad \sum_{\sigma_1,\dots,\sigma_k}(-1)^{\#\sigma\neq 1} \\ &\quad \left.p_{\sigma_1}\dots p_{\sigma_k}\sigma_1\dots\sigma_k\right\}\end{aligned}$$

Here, the objects:

$$W_{out} = (1-2\epsilon_{out})^{-1}$$

$$P_k = (2\epsilon_{out})^k(1-2\epsilon_{out})$$

$$p_\sigma = |a_\sigma|/2\epsilon_{out}$$

may define a QP distribution for $$\Lambda_{out}^{-1},$$

as described hereinabove for $$\Lambda_l^{-1}.$$

The following may also hold:

$$\sum_\sigma |a_\sigma - b_\sigma| = 2\sum_\sigma (a_\sigma - b_\sigma)_+ = 2\sum_{\sigma\in nc} a_\sigma = 2\epsilon_{nc}$$

where $q_\sigma=|a_\sigma-b_\sigma|/2\epsilon_{nc}$

Here, nc may be the set of Pauli errors that may be included in $\Lambda_{out}$ but may not be included in $\Lambda_{in}$, which, for $h\geq t+1$, may correspond to non-correctable errors. Finally, $$W_e = 1 + 2\epsilon_{nc}W_{out} = 1 + 2\epsilon_{nc}(1-2\epsilon_{out})^{-1} = 1 + 2\epsilon_{nc} + O\left(\epsilon^{t+2}\right)$$

may be the total QP norm, which may approximately be minimal, given the infidelity $\epsilon_{nc}$ to be mitigated.

Approximate OP Distribution for $\Lambda_l$ and Unified Sampling

When working with $\Lambda_l$, an $O(\epsilon^{t+2})$ approximation may already be used, so it may suffice to work with a leading order approximation for $$\Lambda_l^{-1} = \left[(1-\epsilon_l)I + \epsilon_l\sum\nolimits_l\right]^{-1}.$$

particular, the QP distribution $$QP = \frac{1}{1-2\epsilon_l}\left[(1-\epsilon_l)I - \epsilon_l\sum\nolimits_l\right]$$

may be used, which may satisfy:

$$QP\cdot\Lambda_l = I + O\left(\epsilon_l^2\right) = I + O\left(\epsilon^{2t+2}\right).$$

This representation may be useful, since it may allow to easily sample mitigation circuits directly from physical error models. In other words, it may enable unifying the sampling of mitigation circuits in SA-LEM with the sampling of fault-paths in P2LC. The following may hold: $\Lambda_l=(1-\epsilon_l)I+\epsilon_l\Sigma_l=\Sigma_f p_f\sigma_f=\mathbb{E}[\sigma]$, where the expectation may run over fault-paths f, each with probability pr, and a resulting output logical Pauli $\sigma_f$ (as computed in P2LC). Thus:

$$QP = \frac{(1-\epsilon_l)I - \epsilon_l\sum_l}{1-2\epsilon_l} = \frac{\sum_f p_f\,\mathrm{sgn}_f\sigma_f}{\sum_f p_f\,\mathrm{sgn}_f} = \frac{\mathbb{E}[\mathrm{sgn}\cdot\sigma]}{\mathbb{E}[\mathrm{sgn}]}$$

where the sign may indicate a logical error ($\mathrm{sgn}_f=-$ for $\sigma_f\neq I$), and the relation:

$$1-2\epsilon_l = 1 - 2\mathbb{P}(\mathrm{sgn}=-) = \mathbb{P}(\mathrm{sgn}=+) - \mathbb{P}(\mathrm{sgn}=-) = \mathbb{E}[\mathrm{sgn}]$$

was used.

Inserting such QP distributions into a given error corrected circuit may give:

$$\langle O\rangle_{ideal} \approx \langle\langle O|QP^{(D)}G_D\dots QP^{(1)}G_1|c\rangle\rangle = \frac{1}{\mathbb{E}[s_D\dots s_1]}\mathbb{E}\left[\mathrm{sgn}_D\dots\mathrm{sgn}_1\langle\langle O|\sigma^{(D)}G_D\dots\sigma^{(1)}G_1|c\rangle\rangle\right.$$

where $W=1/\mathbb{E}[\mathrm{sgn}_D\dots\mathrm{sgn}_1]$ may be the total QP norm.

Based on this equation, an estimator for $\langle O\rangle_{ideal}$ can be obtained as follows: for each operation $G_j$, N fault-paths $$\{f_i^{(j)}\}_{i=1}^N$$

may be sampled. A corresponding set of N logical Pauli operations $$\{\sigma_i^{(j)}\}_{i=1}^N$$

and signs $$\{\text{sgn}_i^{(j)}\}_{i=1}^N$$

may be obtained (e.g., as in P2LC). N circuits $$C_i = \sigma_i^{(D)} G_D \ldots \sigma_i^{(1)} G_1$$

may be run to obtain N measurement outcomes $o_i$. The output may be:

$$\bar{o} = \frac{N^{-1}\sum_{i=1}^N \text{sgn}_i o_i}{N^{-1}\sum_{i=1}^N \text{sgn}_i},$$

where $$\text{sgn}_i = \prod_{j=1}^D \text{sgn}_i^{(j)}.$$

LEM Bias Due to Characterization Errors

Proposition 2 (LEM bias is bounded by the relative characterization accuracy): let $\Lambda_j=\Sigma\, p_{j,\sigma}\sigma$ and $\tilde{\Lambda}_j=\Sigma\tilde{p}_{j,\sigma}\sigma$ denote the true and characterized mitigation channels, respectively, for the layer $G_j$. A bound $\|\tilde{p}_j-p_j\|_1\le\epsilon$ on the 1-norm of characterization errors for each layer, and a bound $$\epsilon_L^{(j)} = 1 - p_I^{(j)} \le \epsilon_L$$

on the infidelity of each layer, are assumed. The relative 1-norm characterization error may be defined as $\delta_{rel}=\delta/\epsilon_L$. Then LEM bias b due to characterization errors as can be bounded as $$b = O(\delta_{rel}).$$

Proof: The diamond norm reduces to the 1-norm for Pauli channels, $\|\Lambda_j-\tilde{\Lambda}_j\|_\diamond=\|p_j-\tilde{p}_j\|_1\le\delta$. This can be stated in terms of the diamond distance and TVD by adding a factor of ½ to both sides. The diamond norm may be a worst-case metric between quantum channels, that can be used to bound the mitigation bias, over all input states, and over all measured observables with spectrum $\in[0,1]$. It may be assumed that EM is done via QP distributions, such that, in expectation, $$\tilde{\Lambda}_j^{-1}$$

may be inserted atter $G_j$, in an attempt to invert $\Lambda_j$. Thus:

$$\begin{aligned}
b &\le \left\|\prod_{j=1}^{D}\left(\tilde{\Lambda}_j^{-1}G_j\right)-\prod_{j=1}^{D}g_j\right\|_\diamond \\
&= \left\|\prod_{j=1}^{D}\left(\tilde{\Lambda}_j^{-1}\Lambda_j g_j\right)-\prod_{j=1}^{D}g_j\right\|_\diamond \\
&= \left\|\Lambda_D\tilde{\Lambda}_D^{-1}g_D\prod_{j=1}^{D-1}\left(\Lambda_j\tilde{\Lambda}_j^{-1}g_j\right)-g_D\prod_{j=1}^{D-1}g_j\right\|_\diamond \\
&= \left\|\Lambda_D\tilde{\Lambda}_D^{-1}g_D\left[\prod_{j=1}^{D-1}\left(\Lambda_j\tilde{\Lambda}_j^{-1}g_j\right)-\prod_{j=1}^{D-1}g_j\right]+\right. \\
&\qquad \left.\left(\Lambda_D\tilde{\Lambda}_D^{-1}-I\right)g_D\prod_{j=1}^{D-1}g_j\right\|_\diamond \\
&\le \left\|\Lambda_D\tilde{\Lambda}_D^{-1}\right\|_\diamond\left\|\prod_{j=1}^{D-1}\left(\Lambda_j\tilde{\Lambda}_j^{-1}g_j\right)-\prod_{j=1}^{D-1}g_j\right\|_\diamond+ \\
&\qquad \left\|\Lambda_D\tilde{\Lambda}_D^{-1}-I\right\|_\diamond \\
&\le \ldots \le \sum_{j=1}^{D}\left(\prod_{i=1}^{j-1}\left\|\Lambda_i\tilde{\Lambda}_i^{-1}\right\|_\diamond\right)\left\|\Lambda_j\tilde{\Lambda}_j^{-1}-I\right\|_\diamond \\
&\le \sum_{j=1}^{D}\left(\prod_{i=1}^{j-1}\left[1+\left\|\Lambda_i\tilde{\Lambda}_i^{-1}-I\right\|_\diamond\right]\right)\left\|\Lambda_j\tilde{\Lambda}_j^{-1}-I\right\|_\diamond.
\end{aligned}$$

Now:

$$\left\|\Lambda_j\tilde{\Lambda}_j^{-1}-I\right\|_\diamond=\left\|(\Lambda_j-\tilde{\Lambda}_j)\tilde{\Lambda}_j^{-1}\right\|_\diamond\le\left\|\Lambda_j-\tilde{\Lambda}_j\right\|_\diamond\left\|\tilde{\Lambda}_j^{-1}\right\|_\diamond\le\delta W.$$

Here, $\|\Lambda_j-\tilde{\Lambda}_j\|_\diamond\le\delta$, and $$\left\|\tilde{\Lambda}_j^{-1}\right\|_\diamond\le W_j\le W$$

were used, where $W_j$ is the QP norm for the jth layer, and W is a bound for $W_j$ over all layers.

To see that $$\left\|\tilde{\Lambda}_j^{-1}\right\|_\diamond\le W_j,\ \tilde{\Lambda}^{-1}=\sum a_\sigma\sigma,$$

such that $\|\tilde{\Lambda}^{-1}\|_\diamond=\|a\|_1$ may be defined. Any QP decomposition $\tilde{\Lambda}^{-1}=\Sigma_i\, b_i\sigma_i$ (where $\sigma_i$ isn't necessarily different from $\sigma_j$ for i≠j) may satisfy $W=\|b\|_1\ge\|a\|_1$. Therefore:

$$b\le\sum_{j=1}^{D}(1+W\delta)^{j-1}W\delta=(1+W\delta)^D-1=O(WD\delta)=O(\delta/\epsilon_L).$$

Two relations were used. The first relation is that for near-optimal QP decompositions $W=e^{O(\epsilon_L)}=O(1)$. This is a bound on the QP norm for each layer, but not over the total QP norm $$W_{tot}=\prod_{j=1}^{D}W_j\le W^D=e^{O(D\epsilon_L)},$$

which can be large. The second relation is that for EM to be useful, restriction of the circuit volume to $$D = O(\epsilon_L^{-1}),$$

may be required to prevent $W_{tot}$ from being too large.

Figure 10C:
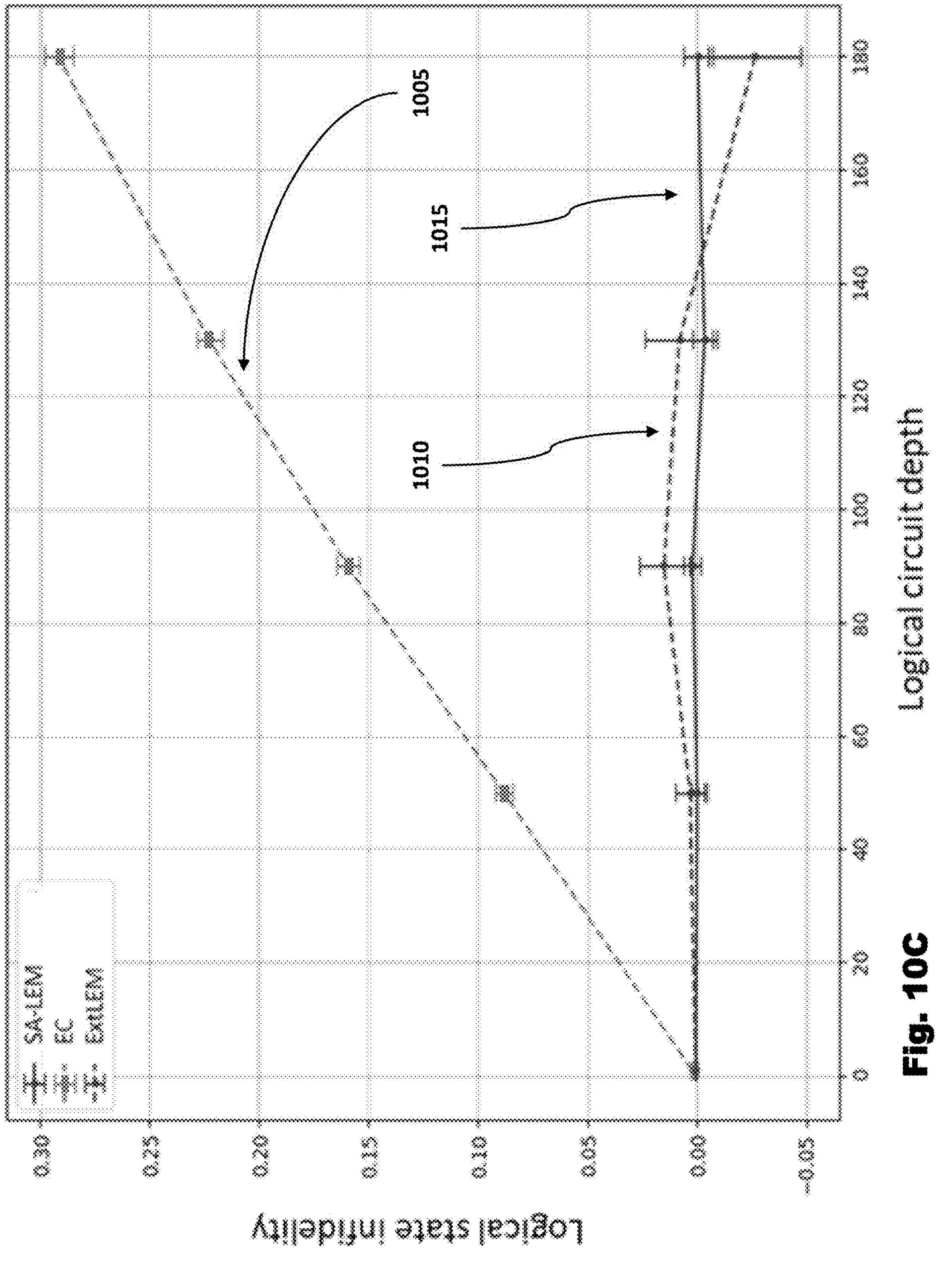

FIG. 10C shows a graph illustrating simulated logical output state infidelity, as a function of logical circuit depth. The error-corrected logical circuit is given by $(CX)^{depth}$, where CX is based on the Steane code (c.f. FIG. 3C and description associated thereof hereinabove). To note, a 'correlated decoding' of syndromes, in both syndrome-measurement blocks, was used. The physical infidelity is set to $\epsilon=10^{-3}$, and the physical error channel is as in the examples illustrated in FIG. 10B. All error reduction methods are given a shot 'budget' N=5000 for each circuit depth. SA-LEM and ExtLEM are performed as described in the examples illustrated in FIG. 10B. EC alone (dashed line, dataset 1005) suffers significant bias, leading to a large inaccuracy at very small circuit depth. ExtLEM (dashed line, dataset 1010) eliminates this bias, but with a statistical error bar that quickly grows exponentially with depth. The error bar for SA-LEM (solid line, dataset 1015) also grows exponentially, but with a significantly reduced blow-up rate.

Figure 11:
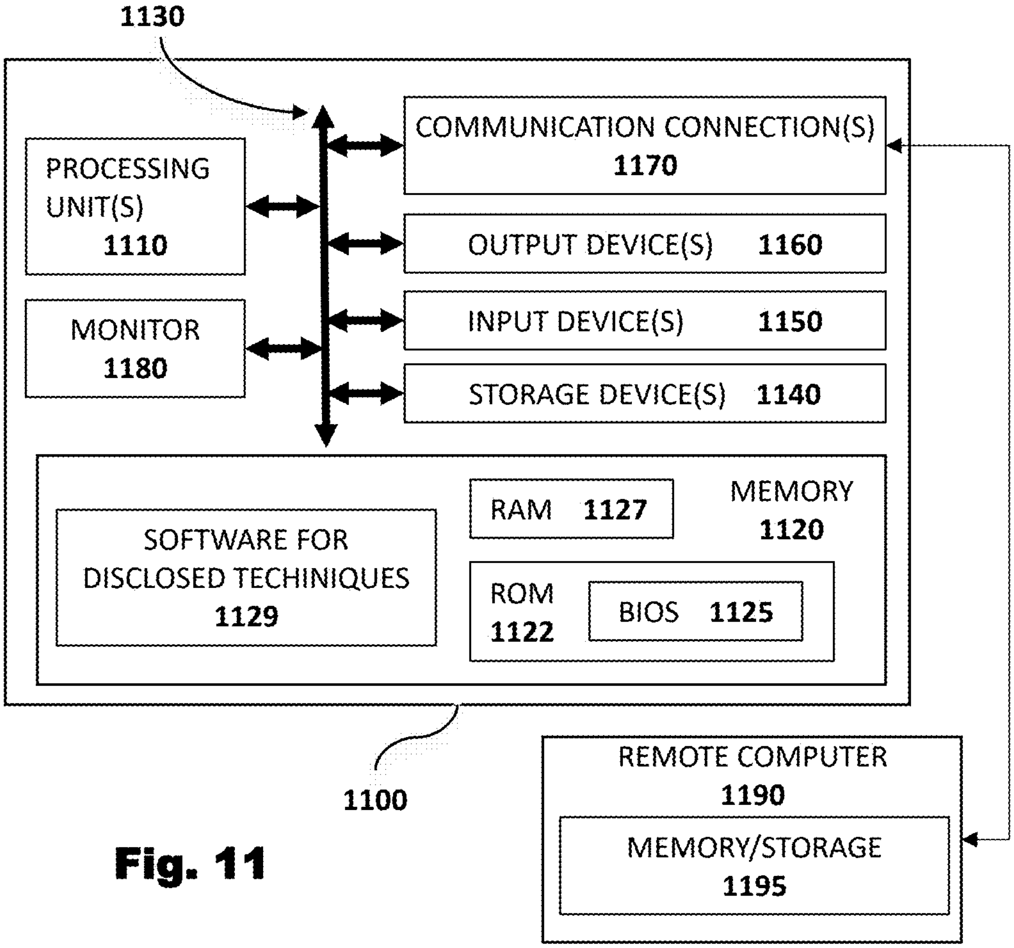
FIG. 11 schematically illustrates a computer implementing methods according to embodiments of the present disclosure.

FIG. 11 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including handheld devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, an exemplary system for implementing the disclosed technology includes a general purpose (classical) computing device in the form of an exemplary conventional PC 1100, including one or more processing units 1110, a system memory 1120, and a system bus 1130 that couples various system components including the system memory 1120 to the one or more processing units 1110. The system bus 1130 may be any of several types of bus structures including a memory bus or memory controller, a peripheral bus, and/or a local bus using any of a variety of bus architectures. The exemplary system memory 1120 includes read only memory (ROM) 1122 and random-access memory (RAM) 1127. A basic input/output system (BIOS) 1125, containing the basic routines that help with the transfer of information between elements within the PC 1100, is stored in ROM 1122. As shown in FIG. 11, the system memory 1120 may store computer-executable instructions for performing any of the disclosed techniques (e.g., sending instructions to quantum computer for applying characterization gate sequences and neighboring gate sequences to a subset of qubits, measuring outcomes, collecting frequencies, computing model parameters) in respective memory portions (shown generally as executable software 1129 for performing any embodiment of the disclosed synthesis techniques).

The exemplary PC 1100 further includes one or more storage devices 1140, such as a hard disk drive for reading from and writing to a hard disk, a magnetic disk drive for reading from or writing to a removable magnetic disk, and/or an optical disk drive for reading from or writing to a removable optical disk (such as a CD-ROM or other optical media). Such storage devices can be connected to the system bus 1130 by a hard disk drive interface, a magnetic disk drive interface, and/or an optical drive interface, respectively. The drives and their associated computer readable media provide nonvolatile storage of computer-readable instructions, data structures, program modules, and other data for the PC 1100. Other types of computer-readable media which can store data that is accessible by a PC, such as magnetic cassettes, flash memory, digital video disks, CDs, DVDs, RAMS, NVRAMs, ROMs, and the like, may also be used in the exemplary operating environment. As used herein, the terms storage, memory, and computer-readable media may not include or encompass propagating carrier waves or signals per se.

A number of program modules may be stored in the storage devices 1140, including an operating system, one or more application programs, other program modules, and program data. Storage of results of quantum measurements and instructions for obtaining such measurements (and/or instructions for performing any embodiment of the disclosed technology) can be stored in the storage devices 1140. A user may enter commands and information into the PC 1100 through one or more input devices 1150 such as a keyboard and a pointing device such as a mouse. Other input devices may include a digital camera, microphone, joystick, game pad, satellite dish, scanner, or the like. These and other input devices are often connected to the one or more processing units 1110 through a serial port interface that is coupled to the system bus 1130, but may be connected by other interfaces such as a parallel port, game port, or universal serial bus (USB). A monitor 1180 or other type of display device is also connected to the system bus 1130 via an interface, such as a video adapter. Other peripheral output devices 1160, such as speakers and printers (not shown), may be included. In some cases, a user interface is displayed so that a user can input a circuit for synthesis, and verify successful synthesis.

The PC 1100 may operate in a networked environment using logical connections to one or more remote computers, such as a remote computer 1190. In some examples, one or more network or communication connections 1170 are included. The remote computer 1190 may be another PC, a server, a router, a network PC, or a peer device or other common network node, and typically includes many or all of the elements described above relative to the PC 1100, although only a memory storage device 1195 has been illustrated in FIG. 11. The personal computer 1100 and/or the remote computer 1190 can be connected to a local area network (LAN) and a wide area network (WAN). Such networking environments are commonplace in offices, enterprise-wide computer networks, intranets, and the Internet.

When used in a LAN networking environment, the PC 1100 is connected to the LAN through a network interface. When used in a WAN networking environment, the PC 1100 typically includes a modem or other means for establishing communications over the WAN, such as the Internet. In a networked environment, program modules depicted relative to the personal computer 1100, or portions thereof, may be stored in the remote memory storage device or other locations on the LAN or WAN. The network connections shown are exemplary, and other means of establishing a communications link between the computers may be used.

Figure 12:
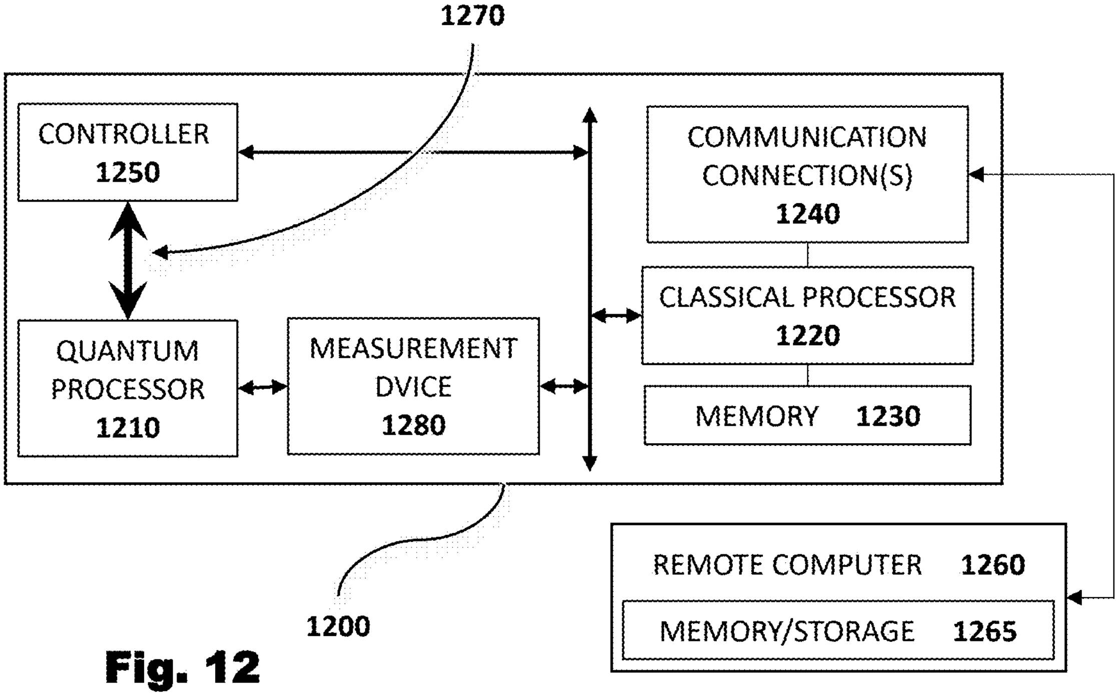
FIG. 12 schematically illustrates a system implementing methods according to embodiments of the present disclosure.

With reference to FIG. 12, an exemplary system for implementing the disclosed technology includes computing environment 1200, The environment includes one or more quantum processing unit(s) 1210 including one or more monitoring/measuring device(s). The quantum processing unit(s) execute quantum circuits that are provided by a classical processing unit 1220. The quantum circuits are downloaded into or used to program or configure the quantum processing unit(s) 1210 (e.g., via control lines (quantum bus) 1270). Procedures according to any of the disclosed embodiments (e.g., a high-level description of the set of quantum circuits to be applied to a qubit patch and neighboring qubits) may be stored in a memory 1230.

With reference to FIG. 12, the high-level description of a quantum software may be translated into quantum circuits (e.g., sequences of quantum gates, or layers of gates acting in parallel on different qubits). Such high-level descriptions may be stored, as the case may be, on one or more external computers 1260 outside the computing environment 1200 utilizing one or more memory and/or storage device(s) 1265, then downloaded as necessary into the computing environment 1200 via one or more communication connection(s) 1240. Quantum circuits (according to any of the disclosed embodiments) are coupled to the quantum processor 1210.

The quantum processing unit(s) can be one or more of, but are not limited to: (a) a superconducting quantum computer; (b) an ion trap quantum computer; (c) a topological quantum computer using e.g., Majorana zero modes; (d) a photonic quantum computer; or (c) a neutral atom quantum computer. The sets of gates (e.g., using any of the disclosed embodiments) can be sent into (or otherwise applied to) the quantum processing unit(s) via control lines 1270 at a controller 1250. In the illustrated example, the desired quantum computing process is implemented with the aid of one or more controllers 1250 that are specially adapted to control a corresponding one of the quantum processor(s) 1210. The classical processor 1220 can further interact with measuring/monitoring devices (e.g., readout devices) 1280 to help control and implement the desired quantum computing process (e.g., by reading or measuring out data results from the quantum processing units once available, etc.)

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention. For instance, technologies from any example can be combined with the technologies described in any one or more of the other examples.

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention. For instance, technologies from any example can be combined with the technologies described in any one or more of the other examples.

Therefore, casting into a language of clauses, the present disclosure provides methods, systems and circuits according to, but not limited to, the following clauses:

Clause 1: A quantum-computer implemented method for mitigating errors in a quantum circuit C including at least one error-corrected quantum logic operation G, the method comprises:

(a) providing a set of quantum error mitigation protocols {EM} including at least two quantum error mitigation protocols configured for mitigating errors in said quantum circuit C;

(b) executing a plurality of shots, so as to obtain a plurality of mitigated circuit outcomes {o}, wherein:

i) for at least one shot, the method includes executing said at least one error-corrected quantum logic operation G and measuring an associated at least one syndrome thereof, so as to obtain a syndrome measurement results vector $\vec{s}$;

ii) at least one shot is executed according to at least one quantum error mitigation protocol EM selected from said set of quantum error mitigation protocols {EM} based on said vector of syndrome measurement results $\vec{s}$;

(c) combining said mitigated circuit outcomes {o} so as to obtain an estimate $\bar{o}$ of an outcome of an ideal version $C_0$ of said quantum circuit C.

Clause 2: The method according to clause 1, wherein executing shots according to a quantum error mitigation protocol includes any one of:

(a) executing said quantum circuit C with at least one additional quantum logic operation;

(b) executing said quantum circuit C with at least one removed quantum logic operation;

(c) postprocessing a measurement result of said quantum circuit C; and (d) executing a quantum circuit having a structure distinct from said quantum circuit C.

(e) executing a quantum circuit having a structure distinct from said quantum circuit C; and (f) postprocessing a measurement result of at least one shot of said quantum circuit C.

Clause 3: The method according to clause 2, wherein executing shots according to a quantum error mitigation protocol includes any one of: mid-shot processing of a syndrome measurement result of said quantum circuit C, and mid-shot modification of said quantum circuit C.

Clause 4: The method according to any one of clauses 1 to 3, wherein non-overlapping sets of syndrome measurement results vectors $\vec{S}_i$ are associated with distinct quantum error mitigation protocols $EM_i$ included in said set of quantum error mitigation protocols {EM}.

Clause 5: The method according to clause 4, wherein a union set of said non-overlapping sets of syndrome measurement results vectors $\vec{S}_i$ includes all possible syndromes of said at least one quantum logic operation G.

Clause 6: The method according to any one of clauses 4 to 5, wherein each of said quantum error mitigation protocol $EM_i$ is configured to mitigate errors associated with a set of syndrome measurement results vector $\vec{S}_i$.

Clause 7: The method according to any one of the preceding clauses, wherein said set of quantum error mitigation protocols {EM} includes at least two quantum error mitigation protocols $EM_{1,2}$ configured for mitigating errors in said at least one error-corrected quantum logic operation G.

Clause 8: The method according to clause 7, comprising applying to said at least one error-corrected quantum logic operation G at least one quantum error mitigation protocol selected from said at least two quantum error mitigation protocols $EM_{1,2}$ according to said associated at least one syndrome thereof.

Clause 9: The method according to any one of the preceding clauses, comprising executing at least two quantum error mitigation protocols included in said set of quantum error mitigation protocols {EM}.

Clause 10: The method according to any one of the preceding clauses, wherein said combining is performed according to said vector of syndrome measurement results $\vec{s}$.

Clause 11: The method according to clause 10, wherein combining mitigated circuit outcomes comprises computing a weighted average $\bar{o}=w_{S_1}o_1+\ldots+w_{S_N}o_N$ of said mitigated circuit outcomes {o}, wherein each weight $w_k$ is associated with a set of syndrome measurement results vector $\vec{S}_k$, wherein N is the number of shots.

Clause 12: The method according to clause 11, wherein each of said weights $w_{S_k}$ is proportional to $$\mathbb{V}_{o|k}^{-1},$$

wherein $\mathbb{V}_{o|k}$ being an estimate for a variance of a probability distribution of mitigated circuit outcome o, said distribution being conditioned according to a set of syndrome measurement results vector $\vec{S}_k$.

Clause 13: The method according to clause 12, comprising computing said estimate for variance $\mathbb{V}_{o|k}$.

Clause 14: The method according to any one of the preceding clauses, wherein said at least two quantum error mitigation protocols are configured to mitigate an error channel $\Lambda_{\vec{s}}$ associated with said syndrome measurement results vector $\vec{s}$.

Clause 15: The method according to clause 14, wherein said error channel $\Lambda_{\vec{s}}$ is a logical error channel $\Lambda_{L|\vec{s}}\Lambda_{L|\vec{S}_i}$, wherein $\vec{s}\in\vec{S}_i$.

Clause 16: The method according to any one of clauses 14 to 15, comprising estimating said error channel $\Lambda_{\vec{s}}$.

Clause 17: The method according to any one of the preceding clauses, wherein said combining measurement results comprises computing a non-linear function of said mitigated circuit outcomes {o}.

Clause 18: The method according to any one of the preceding clauses, wherein said set of quantum error mitigation protocols {EM} includes any two of: quasi-probability decomposition, zero-noise extrapolation, and tensor network error mitigation.

Clause 19: The method according to clause 18 as dependent on any one of clauses 15 to 17, wherein said set of quantum error mitigation protocols {EM} includes quasi-probability decomposition, the method comprises sampling quantum circuits according to a distribution based on said error channel $\Lambda_{\vec{s}}$.

Clause 20: The method according to clause 19, wherein said quasi-probability decomposition approximates said ideal version $C_0$ of said quantum circuit C.

Clause 21: The method according to clause 19, wherein said quasi-probability decomposition approximates an execution of said quantum circuit C being subject to an amplified error channel $$\Lambda_{\vec{s}}^{\lambda}$$

being said error channel $\Lambda_{\vec{s}}$ raised to a power $\lambda\neq\pm1$.

Clause 22: The method according to any one of clauses 19 to 21 as dependent on any one of clauses 10 to 11, wherein a square of a quasi-probability norm $W^2$ of said quasi-probability decomposition equals said estimate for variance $\mathbb{V}_{o|\vec{s}}$ associated with said error channel $\Lambda_{\vec{s}}$.

Clause 23: The method according to any one of clauses 19 to 22, wherein sampling quantum circuits is performed concurrently to an execution of at least one shot.

Clause 24: The method according to any one of the preceding clauses, comprising rejection of at least one shot based on a set of rejection syndromes $\vec{S}_{rej}$.

Clause 25: The method according to clause 24, as dependent on any one of clauses 4 to 22, wherein said set of rejection syndromes $\vec{S}_{rej}$ being non-overlapping with any set of syndrome measurement results vectors $\vec{S}_i$ associated with a quantum error mitigation protocol $EM_i$.

Clause 26: The method according to any one of clauses 24 to 25, wherein said set of rejection syndromes $\{\vec{S}\}_{rej}$ is selected so as to minimize at least one of: a total runtime, and a number of shots N.

Clause 27: The method according to any one of clauses 24 to 26, as dependent on any one of clauses 6 to 7, comprising rejection of at least one shot based on said associated at least one syndrome thereof.

Clause 28: The method according to any one of clauses 24 to 27, wherein said rejection comprises abortion of said at least one shot.

Clause 29: The method according to any one of clauses 24 to 28, wherein said at least one error-corrected quantum logic operation G is encoded according to an odd distance error correcting code.

Clause 30: The method according to any one of clauses 24 to 29, comprising processing said vector of syndrome measurement results $\vec{s}$ corresponding to a rejected shot.

Clause 31: The method according to any one of the preceding clauses, wherein said quantum circuit C includes at least two quantum logic operations $G_{1,2}$ acting on overlapping sets of qubits.

Clause 32: The method according to any one of the preceding clauses, wherein said quantum circuit C includes at least two quantum logic operations $G_{1,2}$ acting sequentially.

Clause 33: The method according to any one of the preceding clauses, wherein at least one mitigated circuit outcome is associated with at least two syndrome measurement results vectors.

Clause 34: The method according to any one of the preceding clauses, wherein at least one syndrome measurement results vector is associated with at least two mitigated circuit outcomes.

Clause 35: The method according to any one of the preceding clauses, wherein said at least one quantum error mitigation protocol EM is selected from said set of quantum error mitigation protocols {EM} based on a plurality of vectors of syndrome measurement results.

Clause 36: The method according to any one of the preceding clauses, wherein a plurality of shots are executed according to said at least one quantum error mitigation protocol EM.

Clause 37: The method according to any one of the preceding clauses, wherein said at least one shot is selected based on a plurality of vectors of syndrome measurement results.

Clause 38: The method according to any one of the preceding clauses, wherein said quantum circuit C comprises a plurality of error-corrected quantum logic operations $G^{(\alpha)}$, and wherein at least one syndrome measurement results vector is associated with at least two error-corrected quantum logic operations $G^{(1,2)}$.

Clause 39: The method according to clause 38, wherein said at least two error-corrected quantum logic operations $G^{(1,2)}$ are distinct quantum logic operations.

Clause 40: A computer implemented method for simulating a quantum computation, the method comprises simulating a quantum-computer implemented method according to any one of the preceding clauses on a classical computer.

Clause 41: A non-transitory computer readable storage medium tangibly embodying a program of instructions that, when executed by a computer, cause the computer to perform a method according to any one of clauses 1 to 40.

Clause 42: A computer implemented method for computing mitigatable errors of an error-corrected logical quantum operation, the method comprising:

(a) characterizing physical errors of at least one physical quantum gate included in said logical quantum operation, so as to obtain physical characterization data;

(b) simulating said logical quantum operation according to said characterization data so as to obtain simulated output errors and syndromes, so as to obtain said mitigatable errors.

Clause 43: The method according to clause 42, wherein characterizing physical errors comprises:

(a) applying at least one characterization sequence to a set of qubits included in a quantum processor;

(b) measuring said set of qubits using a measurement apparatus of said quantum processor, thereby obtaining a set of measurement values; and (c) computing said physical characterization data, by fitting a model to said set of measurement values.

Clause 44: The method according to any one of clauses 42 to 43, wherein simulating said logical quantum operation comprises computing a distribution of any of correctable output errors and non-correctable output errors, according to said simulated output errors and syndromes.

Clause 45: The method according to clause 44, wherein simulating output errors comprises computation of logical output errors.

Clause 46: The method according to clause 45, wherein computation of logical output errors is performed according to a fault tolerance level t being a number of faults correctable by an ideal error correction cycle.

Clause 47: The method according to clause 46, comprising computation of correctable errors comprising at least t+1 faults.

Clause 48: The method according to any one of clauses 45 to 47 wherein simulating said logical quantum operation comprises:

(a) providing said logical quantum operation with input channel having no errors, so as to obtain said output error channel; and (b) applying an ideal error correction cycle on said output error channel, so as to obtain a correctable part $\Lambda^*$ of said output error channel and a logical error part $\Lambda_l$ of said output error channel.

Clause 49: A computer implemented method for characterizing an output error channel in a sequence of error-corrected logical quantum operations $G_k \ldots G_1$, the method comprising performing the method according to any one of clauses 45 to 47 for each quantum operation $G_n$ included in a subsequence of error-corrected logical quantum operations $G_1, \ldots, G_n$ and wherein the method comprising for each said quantum operation $G_n$:

(a) providing said quantum operation $G_n$ with input channel having errors being a correctable part $$\Lambda^*_{n-1}$$

of an output error channel of a preceding quantum operation $G_{n-1}$, so as to obtain an output error channel $\Lambda_n$ of said quantum operation $G_n$, wherein a first input channel $\Lambda_0$ provided for a first quantum operation $G_1$ is having no errors;

(b) applying an ideal error correction cycle version of a succeeding quantum operation $G_{n+1}$ on said output error channel $\Lambda_n$ of said quantum operation $G_n$, so as to obtain a correctable part of said output error channel $\Lambda_n^*$, of said quantum operation $G_n$.

Clause 50: A computer implemented method for characterizing an output error channel in a subcircuit of error-corrected logical quantum operations $G_D \ldots G_1$, the method comprising performing the method according to clause 49 for each sequence $G_A \ldots G_H$ wherein H=max(1, A−h) wherein h being n history parameter.

Clause 51: The method according to clause 50, wherein h equals said fault tolerance level t or t+1.

Clause 52: The method according to any one of clauses 42 to 51, wherein characterizing physical errors is performed so a ratio of relative accuracy of logical errors $\Delta\epsilon_L/\epsilon_L$ to a relative accuracy of physical errors $\Delta\epsilon/\epsilon$ is approximately (t+1).

Clause 53: The method according to any of clauses 42 to 52, wherein simulating said logical quantum operation comprises performing a simulation using any of a Clifford simulator or a state-vector simulator.

Clause 54: A computer implemented method for mitigating logical errors in an error-corrected logical quantum operation, the method comprising:

(a) characterizing a logical quantum operation by a method according to any one of clauses 42 to 53, thereby obtaining characterization of an output error channel;

(b) mitigating errors according to said characterization of the output error channel by a method according to any one of clauses 1 to 39.

Clause 55: A non-transitory computer readable storage medium tangibly embodying a program of instructions that, when executed by a computer, cause the computer to perform a method according to any one of clauses 42 to 54.

Clause 56: A computer system comprising at least one processing circuitry, configured to execute a computer implemented method for computing mitigatable errors of an error-corrected logical quantum operation according to any one of clauses 42 to 54.

Clause 57: A computer system comprising at least one processing circuitry, configured to execute a computer implemented method for mitigating logical errors in a quantum circuit comprising an error-corrected logical quantum operation according to any one of clauses 1 to 39, and 54.

Clause 58: The computer system according to any one of clauses 56 to 57, comprising a quantum processing unit.

Clause 59: A computer implemented method, the method includes simulating the method according to any one of clauses 42 to 54.

Clause 60: A non-transitory computer readable storage medium tangibly embodying a program of instructions that, when executed by a computer, cause the computer to perform a method according to clause 59.

Further examples may include the following examples:

1. A method ('syndrome-aware logical error mitigation') for mitigating logical errors in a given error-corrected quantum circuit, including error-corrected logical operations $\{G_\alpha\}_{\alpha\in A}$ implemented on a quantum processor, the method comprising:
   a) For each error-corrected logical operation $G_\alpha$, specifying a partition of the corresponding set of syndromes into $K^\alpha$ non-overlapping subsets $$\{S_k^\alpha\}_{k=1}^{K^\alpha};$$

b) Specifying a k-dependent error mitigation protocol $EM_k$ corresponding to said subsets of syndromes, with the syndrome data vector $k=(k^\alpha)_{\alpha\in A}$, $k^\alpha=1, \ldots, K^\alpha$.
   c) Executing said given quantum circuit on said quantum processor, while applying the error mitigation protocol $EM_k$ if syndromes $$s^\alpha \in S_{k^\alpha}^\alpha,\ \alpha \in A,$$

are measured, to obtain a single-shot mitigated circuit outcome o, and a syndrome data vector k.
   d) Repeating step (c) N times, and combining the N single-shot mitigated circuit outcomes, $o_1, \ldots, o_N$, and the N measured syndrome data vectors, $k_1, \ldots, k_N$, into an N-shot mitigated circuit outcome $\bar{o}$, and a corresponding statistical error bar.
2. The method according to example 1, where each error mitigation protocol $EM_k$ may involve
   a) Modifications of said quantum circuit, wherein k-independent circuit modifications may be performed in pre-processing, and $k^\alpha$-dependent circuit modifications are performed during circuit execution and after the operation $G_\alpha$ is executed.
   b) Post-processing of the outcome of the modified circuit to obtain a single-shot mitigated circuit outcome.
3. The method according to examples 1-2, where said combination of single-shot mitigated circuit outcomes and syndrome subset indices into an N-shot mitigated circuit outcome involves a weighted average $\bar{o}=w_1o_1+\ldots+w_No_N$.
4. The method according to example 3, where some of the weights in said weighted average are inverse-variance weights, $$w_i \propto \mathbb{V}_{o|k_i}^{-1},$$

where $\mathbb{V}_{o|k}$ is an estimate for the variance of the single-shot mitigated outcome o conditioned on k.
5. The method according to examples 1-4, where a possibly-empty subset $$S_{rej}^\alpha \subset \{S_k^\alpha\}_{k=1}^{K^\alpha}$$

corresponds to rejected syndromes, such that $w_k=0$ if $$S_{k^\alpha}^\alpha = S_{rej}^\alpha$$

for some α, and, possibly, the EM protocol $EM_k$ corresponds to aborting circuit execution once a rejected syndrome $$s^\alpha \in S_{rej}^\alpha$$

is measured.
6. The method according to example 5, where the choice of accepted subsets $$S_k^\alpha \neq S_{rej}^\alpha$$

and the corresponding protocols $EM_k$, as a function of $$S_{rej}^\alpha,$$

is fixed, and the sets $$S_{rej}^\alpha$$

are chosen by minimizing either the total runtime, or total shot number N, required to meet a maximal allowed statistical error and systematic error.
7. The method according to example 6, where said choice of accepted subsets $$S_k^\alpha \neq S_{rej}^\alpha$$

as a function of $$S_{rej}^\alpha$$

corresponds to the one of the following, for each α:
   a) A single subset $$S_{acc}^\alpha$$

includes all accepted syndromes $$s \notin S_{rej}^\alpha.$$

b) A distinct subset {s} for each accepted syndrome $$s \notin S^{\alpha}_{rej}.$$

8. The method according to any of examples 1-7, where said k-dependent error mitigation protocol $EM_k$ is configured to mitigate conditioned error channels $\Lambda_{L|k}$, corresponding to logical errors conditioned on $S_k$.
9. The method according to example 8, where said k-dependent error mitigation protocol $EM_k$ involves sampling from a k-dependent quasi-probability distribution $QP_k$ of circuit modifications, constructed based on $\Lambda_{L|k}$.
10. The method according to example 9, where said quasi-probability distributions $QP_k$ approximate the logical-error-free version C(I) of the given circuit $C=C(\Lambda_{L|k})$, where the quantum channel C(•) represents the given circuit as a function of the conditioned error channel.
11. The method according to examples 4 and 10, where said variance estimates used for inverse-variance weighting are obtained by squaring the quasi-probability norms $W_k$ of $QP_k$, i.e., $$\mathbb{V}_{o|k} = W_k^2.$$

12. The method according to example 8, where said error mitigation protocols $EM_k$ involve the amplification or reduction of $\Lambda_{L|k}$, and a subsequent extrapolation to the zero-logical-error ($\Lambda_{L|k}=I$) value of the given circuit outcome.
13. The method according to examples 9 and 12, where said amplification or reduction of $\Lambda_{L|k}$ involves sampling from quasi-probability distributions $QP_{k,\lambda}$ approximating $$C(\Lambda^{\lambda}_{L|k})$$

—the given circuit with $\Lambda_{L|k}$ replaced by $$\Lambda^{\lambda}_{L|k}$$

—for powers $\lambda \neq \pm 1$.
14. The method according to example 8, where said error mitigation protocols $EM_k$ implement a final measurement of the given circuit in one or more measurement bases, and the subsequent application of a classical description of the global conditioned error channel $\hat{\Lambda}_{L|k}=C^{-1}(\Lambda_{L|k})C(I)$.
15. A system implementing the method according to any of the preceding examples, including a classical processor, a quantum processor, and a classical control system for said quantum processor, wherein the classical processor may implement the pre-processing and post-processing included in the error mitigation protocols $EM_k$, the classical control system may implement syndrome decoding as part of error-correction, as well as any k-dependent circuit modifications included in $EM_k$, and the quantum processor implements the corresponding modified quantum circuits.
16. The method according to any of examples 8-16, wherein the conditioned error channels $\Lambda_{L|k}$ are obtained by applying error characterization protocols on said quantum processor.
17. The method according to example 17, where said characterization protocols are applied to physical operations comprising said error-corrected quantum circuit C.
18. A method for characterizing input, output, and logical errors in a layer $L_j$ of error corrected logical operations, included in an error-corrected quantum circuit $C=L_D \ldots L_1$, constructed from physical operations of a quantum processor, the method including:
   a) Obtaining models for physical errors in said physical operations by applying characterization protocols to said physical operations on said quantum processor.
   b) Mapping said physical error models to a model for input, output and logical errors for said layer of error-corrected logical operations, said mapping includes an iterative procedure of classical simulation and elimination of non-correctable errors, involving $L_j$ and its h≥1 preceding circuit layers, $L_{i_0}, \ldots, L_{j-1}$, $i_0=\max(1, j-h)$.
19. The method according to example 18, where said characterization protocols applied to physical operations involves:
   a) The application of quantum circuits and final measurements which are sensitive to the parameters of said physical error model, on said quantum processor.
   b) The fitting of said model parameters to the outcomes of said final measurements, to obtain the values of said model parameters.
20. The method according to examples 18-19, where said iterative procedure is performed by:
   a) Declaring that $G_{i_0}$ has no input errors: $\Lambda_{in,i_0}=I$.
   b) Computing the output error channel for each layer $L_i$ via a classical simulation of $L_i$, given its input error channel $\Lambda_{in,i}$, said model for errors in physical operations comprising $L_i$, and the ideal logical operation $L_{ideal,i}$ corresponding to $L_i$: $\Lambda_{out,i}L_{ideal,i}=L_i\Lambda_{in,i}$.
   c) Computing the input to each layer $L_i$ ($i \neq i_0$) as the correctable part of the output error channel of the previous layer, said correctable part corresponding to errors that will be corrected by subsequent operations with high probability: $\Lambda_{in,i}=\mathrm{Corr}(\Lambda_{out,i-1})$.
   d) Outputting:
      i) Input error channel to $L_j$:

$$\Lambda^{(j)}_{in} = \Lambda_{in,j}.$$

ii) Output error channel of $L_j$:

$$\Lambda^{(j)}_{out} = \Lambda_{out,j}.$$

iii) Logical error channel of $L_j$, obtained from $$\Lambda^{(j)}_{out}: \Lambda^{(j)}_{l}.$$

21. The method according to examples 18-20, applied to both $L_j$ and $L_{j+1}$, and the ratio $$\Lambda_e^{(j)} = \left(\Lambda_{in}^{(j+1)}\right)^{-1}\Lambda_{out}^{(j)}$$

is computed.

22. The method according to examples 18-21, where the circuit C has fault-tolerance level t, and h=t.

23. The method according to examples 18-22, where a set of fault paths, each fault path being a set of physical errors in the subcircuit $L_j \ldots L_{i_0}$, is sampled from said physical error models, and said iterative procedure is applied separately to each fault path.

24. The method according to example 23, involving:

a) For some error-corrected logical operations $\{G_\alpha\}_{\alpha\in A}$, in the subcircuit $L_j \ldots L_{i_0}$, specifying a partition of the corresponding set of syndromes into $K^\alpha$ non-overlapping subsets $$\{S_k^\alpha\}_{k=1}^{K\alpha};$$

b) Recording for each simulated fault-path a corresponding syndrome data vector $k=(k^\alpha)_{\alpha\in A}$, according to the syndromes $$s^\alpha \in S_{k^\alpha}^\alpha$$

obtained during the simulation of $G^\alpha$.

c) Averaging over the input, output and logical errors obtained for fault paths where a specified syndrome data vector k was obtained, to obtain conditioned input, output and logical error channels, $$\Lambda_{in|k}^{(j)},\ \Lambda_{out|k}^{(j)},\ \text{and}\ \Lambda_{l|k}^{(j)},$$

as well as the probability for said syndrome data vector $$p_k^{(j)}.$$

25. The method according to example 24, where said operations $G_\alpha$ are contained only in the final simulated layer $L_j$.

26. The method according to examples 23-25, where said sampling of fault paths from physical error models is performed via importance sampling, based on a set of constraints that must be satisfied by fault paths in order to generate a logical error.

27. The logical error mitigation method according to example 17, where said conditioned error channel $\Lambda_{L|k}$ is estimated using the characterization method according to examples 19-27, wherein:

a) A subset of layers $\{L_j\}_{j\in J}$ in the given circuit C is specified.

b) An error channel $$\Lambda_{e|k_{j-h:j}}^{(j)}\ \text{or}\ \Lambda_{l|k_{j-h:j}}^{(j)}$$

is estimated for each layer, where $k_{j-h:j}$ is the part of the syndrome data vector k measured between layers j−h and j.

c) The conditioned error channel $\Lambda_{L|k}$ is given by $$\left\{\Lambda_{e|k_{j-h:j}}^{(j)}\right\}_{j\in J}\ \text{or}\ \left\{\Lambda_{l|k_{j-h:j}}^{(j)}\right\}_{j\in J},$$

such that sampling an error from $\Lambda_{L|k}$ is done by independently sampling an error after each layer $L_j$ from the corresponding channel $$\Lambda_{e|k_{j-h:j}}^{(j)}\ \text{or}\ \Lambda_{l|k_{j-h:j}}^{(j)}.$$

28. The method according to examples 17 and 23-26, where said sampling from quasi-probability distributions $QP_k$ is combined with said sampling of fault-paths, such that the EM protocol $EM_k$ samples elements from $QP_k$ by directly sampling a fault-paths from said physical error models.

The invention claimed is:

1. A quantum-computer implemented method for mitigating errors in a quantum circuit C including at least one error-corrected quantum logic operation G, the quantum-computer implemented method comprising:

(a) providing a set of quantum error mitigation protocols {EM} including at least two quantum error mitigation protocols configured for mitigating errors in said quantum circuit C;

(b) executing a plurality of shots, so as to obtain a plurality of mitigated circuit outcomes {o}, wherein:

i) for at least one shot, the method includes executing said at least one error-corrected quantum logic operation G and measuring an associated at least one syndrome thereof, so as to obtain a syndrome measurement results vector $\vec{s}$;

ii) at least one shot is executed according to at least one quantum error mitigation protocol EM selected from said set of quantum error mitigation protocols {EM} based on said vector of syndrome measurement results $\vec{s}$;

(c) combining said mitigated circuit outcomes {o} so as to obtain an estimate $\bar{o}$ of an outcome of an ideal version $C_0$ of said quantum circuit C.

2. The quantum-computer implemented method according to claim 1, wherein executing shots according to a quantum error mitigation protocol includes any one of:

(a) executing said quantum circuit C with at least one additional quantum logic operation;

(b) executing said quantum circuit C with at least one removed quantum logic operation;

(c) executing a quantum circuit having a structure distinct from said quantum circuit C; and (d) postprocessing a measurement result of at least one shot of said quantum circuit G;

and wherein, executing shots according to a quantum error mitigation protocol includes any one of: mid-shot processing of a syndrome measurement result of said quantum circuit C, and mid-shot modification of said quantum circuit C.

3. The quantum-computer implemented method according to claim 1, wherein:

(a) non-overlapping sets of syndrome measurement results vectors $\vec{S}_i$ are associated with distinct quantum error mitigation protocols $EM_i$ included in said set of quantum error mitigation protocols {EM};

(b) a union set of said non-overlapping sets of syndrome measurement results vectors $\vec{S}_i$ includes all possible syndromes of said at least one quantum logic operation G; and, (c) each of said quantum error mitigation protocol $EM_i$ is configured to mitigate errors associated with a set of syndrome measurement results vector $\vec{S}_i$.

4. The quantum-computer implemented method according to claim 3, comprising rejection of at least one shot based on a set of rejection syndromes $\vec{S}_{rej}$; and, wherein:

(a) said set of rejection syndromes $\vec{S}_{rej}$ being non-overlapping with any set of syndrome measurement results vectors $\vec{S}_i$ associated with a quantum error mitigation protocol $EM_i$;

(b) said set of rejection syndromes $\{\vec{S}\}_{rej}$ is selected so as to minimize at least one of: a total runtime, and a number of shots N (c) the method comprises rejection of at least one shot based on said associated at least one syndrome thereof, wherein said rejection comprises abortion of said at least one shot; and, (d) the method comprises processing said vector of syndrome measurement results $\vec{s}$ corresponding to a rejected shot.

5. The quantum-computer implemented method according to claim 1, wherein said set of quantum error mitigation protocols {EM} includes at least two quantum error mitigation protocols $EM_{1,2}$ configured for mitigating errors in said at least one error-corrected quantum logic operation G; and, the method comprises applying to said at least one error-corrected quantum logic operation G at least one quantum error mitigation protocol selected from said at least two quantum error mitigation protocols $EM_{1,2}$ according to said associated at least one syndrome thereof.

6. The quantum-computer implemented method according to claim 1, comprising executing at least two quantum error mitigation protocols included in said set of quantum error mitigation protocols {EM}.

7. The quantum-computer implemented method according to claim 1, wherein said combining is performed according to said vector of syndrome measurement results $\vec{s}$.

8. The quantum-computer implemented method according to claim 7, wherein:

(a) combining mitigated circuit outcomes comprises computing a weighted average $\bar{o}=w_{s_1}o_1+\ldots+w_{s_N}o_N$ of said mitigated circuit outcomes {o}, wherein each weight $w_k$ is associated with a set of syndrome measurement results vector $\vec{S}_k$, wherein N is the number of shots;

(b) each of said weights $w_{S_k}$ is proportional to $$\mathbb{V}_{o|k}^{-1},$$

wherein $\mathbb{V}_{o|k}$ being an estimate for a variance of a probability distribution of mitigated circuit outcome o, said distribution being conditioned according to a set of syndrome measurement results vector $\vec{S}_k$; and, (c) the method comprises computing said estimate for variance $\mathbb{V}_{o|k}$.

9. The quantum-computer implemented method according to claim 1, wherein said at least two quantum error mitigation protocols are configured to mitigate an error channel $\Lambda_{\vec{s}}$ associated with said syndrome measurement results vector $\vec{s}$; wherein said error channel $\Lambda_{\vec{s}}$ is a logical error channel $\Lambda_{L|\vec{S}_i}$, wherein $\vec{s}\in\vec{S}_i$; and, the method comprises estimating said error channel $\Lambda_{\vec{s}}$.

10. The quantum-computer implemented method according to claim 1, wherein said combining measurement results comprises computing a non-linear function of said mitigated circuit outcomes {o}.

11. The quantum-computer implemented method according to claim 1, wherein said set of quantum error mitigation protocols {EM} includes any two of: quasi-probability decomposition, zero-noise extrapolation, and tensor network error mitigation.

12. The quantum-computer implemented method according to claim 11, wherein said set of quantum error mitigation protocols {EM} includes quasi-probability decomposition, the method comprises sampling quantum circuits according to a distribution based on said error channel $\Lambda_{\vec{s}}$.

13. The quantum-computer implemented method according to claim 12, wherein:

(a) said quasi-probability decomposition approximates any one of: said ideal version $C_\theta$ of said quantum circuit C, and an execution of said quantum circuit C being subject to an amplified error channel $$\Lambda_{\vec{s}}^{\lambda}$$

being said error channel $\Lambda_{\vec{s}}$ raised to a power $\lambda\neq\pm1$;

(b) a square of a quasi-probability norm $W^2$ of said quasi-probability decomposition equals said estimate for variance $\mathbb{V}_{o|\vec{s}}$ associated with said error channel $\Lambda_{\vec{s}}$.

14. The quantum-computer implemented method according to claim 12, wherein sampling quantum circuits is performed concurrently to an execution of at least one shot.

15. The quantum-computer implemented method according to claim 1, where said quantum circuit C includes at least two quantum logic operations $G_{1,2}$ acting sequentially on overlapping sets of qubits.

16. The quantum-computer implemented method according to claim 1, wherein any one of the following:

(a) at least one mitigated circuit outcome is associated with at least two syndrome measurement results vectors; or, (b) at least one syndrome measurement results vector is associated with at least two mitigated circuit outcomes.

17. The quantum-computer implemented method according to claim 1, wherein any one of:

(a) said at least one quantum error mitigation protocol EM, or (b) said at least one shot, is selected from said set of quantum error mitigation protocols {EM} based on a plurality of vectors of syndrome measurement results.

18. The quantum-computer implemented method according to claim 1, wherein a plurality of shots are executed according to said at least one quantum error mitigation protocol EM.

19. The quantum-computer implemented method according to claim 1, wherein said quantum circuit C comprises a plurality of error-corrected quantum logic operations $G^{(\alpha)}$, and wherein at least one syndrome measurement results vector is associated with at least two error-corrected quantum logic operations $G^{(1,2)}$, and wherein said at least two error-corrected quantum logic operations $G^{(1,2)}$ are distinct quantum logic operations.

20. A non-transitory computer readable storage medium tangibly embodying a program of instructions that, when executed by a computer, cause the computer to perform the quantum-computer implemented method according to claim 1.

* * * * *